(12) United States Patent
Parker et al.

(10) Patent No.: US 7,460,584 B2
(45) Date of Patent: *Dec. 2, 2008

(54) NETWORKING METHODS AND SYSTEMS

(75) Inventors: Jeffrey L. Parker, Jacksonville, FL (US); David F. Sorrells, Middleburg, FL (US)

(73) Assignee: ParkerVision, Inc., Jacksonville, FL (US)

( * ) Notice: Subject to any disclaimer, the term of this patent is extended or adjusted under 35 U.S.C. 154(b) by 538 days.

This patent is subject to a terminal disclaimer.

(21) Appl. No.: 10/197,255

(22) Filed: Jul. 18, 2002

(65) Prior Publication Data

US 2004/0013177 A1   Jan. 22, 2004

(51) Int. Cl.
*H04B 1/38* (2006.01)
*H04L 5/16* (2006.01)

(52) U.S. Cl. .................................. 375/219; 375/324

(58) Field of Classification Search ................ 375/219, 375/316, 324
See application file for complete search history.

(56) References Cited

U.S. PATENT DOCUMENTS

| | | | |
|---|---|---|---|
| 2,057,613 A | 10/1936 | Gardner |
| 2,241,078 A | 5/1941 | Vreeland |
| 2,270,385 A | 1/1942 | Skillman |
| 2,283,575 A | 5/1942 | Roberts |
| 2,358,152 A | 9/1944 | Earp |
| 2,410,350 A | 10/1946 | Labin et al. |
| 2,451,430 A | 10/1948 | Barone |
| 2,462,069 A | 2/1949 | Chatterjea et al. |
| 2,462,181 A | 2/1949 | Grosselfinger |
| 2,472,798 A | 6/1949 | Fredendall |
| 2,497,859 A | 2/1950 | Boughtwood et al. |
| 2,499,279 A | 2/1950 | Peterson |
| 2,530,824 A | 11/1950 | Klng |
| 2,802,208 A | 8/1957 | Hobbs |
| 2,985,875 A | 5/1961 | Grisdale et al. |
| 3,023,309 A | 2/1962 | Foulkes |
| 3,069,679 A | 12/1962 | Sweeney et al. |
| 3,104,393 A | 9/1963 | Vogelman |
| 3,114,106 A | 12/1963 | McManus |
| 3,118,117 A | 1/1964 | King et al. |
| 3,226,643 A | 12/1965 | McNair |
| 3,246,084 A | 4/1966 | Kryter |
| 3,258,694 A | 6/1966 | Shepherd |

(Continued)

FOREIGN PATENT DOCUMENTS

DE   1936252   1/1971

(Continued)

OTHER PUBLICATIONS

English Translation of German Patent Publication No. DE 196 48 915 A1, 10 pages.

(Continued)

*Primary Examiner*—Chieh M. Fan
*Assistant Examiner*—Freshteh N. Aghdam
(74) *Attorney, Agent, or Firm*—Sterne Kessler Goldstein & Fox, p.l.l.c.

(57) ABSTRACT

A network system includes integrated radio transceivers and digitizers, integrated baseband processors and device controllers, digital interfaces there between, and architectures and partitions for same. Licensing methodologies are provided for implementing the features described herein, and for other products and services.

36 Claims, 20 Drawing Sheets

U.S. PATENT DOCUMENTS

| | | |
|---|---|---|
| 3,383,598 A | 5/1968 | Sanders |
| 3,384,822 A | 5/1968 | Miyagi |
| 3,454,718 A | 7/1969 | Perreault |
| 3,523,291 A | 8/1970 | Pierret |
| 3,548,342 A | 12/1970 | Maxey |
| 3,555,428 A | 1/1971 | Perreault |
| 3,614,627 A | 10/1971 | Runyan et al. |
| 3,614,630 A | 10/1971 | Rorden |
| 3,617,892 A | 11/1971 | Hawley et al. |
| 3,617,898 A | 11/1971 | Janning, Jr. |
| 3,621,402 A | 11/1971 | Gardner |
| 3,622,885 A | 11/1971 | Oberdorf et al. |
| 3,623,160 A | 11/1971 | Giles et al. |
| 3,626,417 A | 12/1971 | Gilbert |
| 3,629,696 A | 12/1971 | Bartelink |
| 3,641,442 A | 2/1972 | Boucher |
| 3,643,168 A | 2/1972 | Manicki |
| 3,662,268 A | 5/1972 | Gans et al. |
| 3,689,841 A | 9/1972 | Bello et al. |
| 3,694,754 A | 9/1972 | Baltzer |
| 3,702,440 A | 11/1972 | Moore |
| 3,714,577 A | 1/1973 | Hayes |
| 3,716,730 A | 2/1973 | Cerny, Jr. |
| 3,717,844 A | 2/1973 | Barret et al. |
| 3,719,903 A | 3/1973 | Goodson |
| 3,735,048 A | 5/1973 | Tomsa et al. |
| 3,736,513 A | 5/1973 | Wilson |
| 3,737,778 A | 6/1973 | Van Gerwen et al. |
| 3,739,282 A | 6/1973 | Bruch et al. |
| 3,764,921 A | 10/1973 | Huard |
| 3,767,984 A | 10/1973 | Shinoda et al. |
| 3,806,811 A | 4/1974 | Thompson |
| 3,852,530 A | 12/1974 | Shen |
| 3,868,601 A | 2/1975 | MacAfee |
| 3,940,697 A | 2/1976 | Morgan |
| 3,949,300 A | 4/1976 | Sadler |
| 3,967,202 A | 6/1976 | Batz |
| 3,980,945 A | 9/1976 | Bickford |
| 3,987,280 A | 10/1976 | Bauer |
| 3,991,277 A | 11/1976 | Hirata |
| 4,003,002 A | 1/1977 | Snijders et al. |
| 4,013,966 A | 3/1977 | Campbell |
| 4,016,366 A | 4/1977 | Kurata |
| 4,017,798 A | 4/1977 | Gordy et al. |
| 4,019,140 A | 4/1977 | Swerdlow |
| 4,032,847 A | 6/1977 | Unkauf |
| 4,035,732 A | 7/1977 | Lohrmann |
| 4,045,740 A | 8/1977 | Baker |
| 4,047,121 A | 9/1977 | Campbell |
| 4,048,598 A | 9/1977 | Knight |
| 4,051,475 A | 9/1977 | Campbell |
| 4,066,841 A | 1/1978 | Young |
| 4,066,919 A | 1/1978 | Huntington |
| 4,080,573 A | 3/1978 | Howell |
| 4,081,748 A | 3/1978 | Batz |
| 4,115,737 A | 9/1978 | Hongu et al. |
| 4,130,765 A | 12/1978 | Arakelian et al. |
| 4,130,806 A | 12/1978 | Van Gerwen et al. |
| 4,132,952 A | 1/1979 | Hongu et al. |
| 4,142,155 A | 2/1979 | Adachi |
| 4,143,322 A | 3/1979 | Shimamura |
| 4,145,659 A | 3/1979 | Wolfram |
| 4,158,149 A | 6/1979 | Otofuji |
| 4,170,764 A | 10/1979 | Salz et al. |
| 4,204,171 A | 5/1980 | Sutphin, Jr. |
| 4,210,872 A | 7/1980 | Gregorian |
| 4,220,977 A | 9/1980 | Yamanaka |
| 4,241,451 A | 12/1980 | Maixner et al. |
| 4,245,355 A | 1/1981 | Pascoe et al. |
| 4,250,458 A | 2/1981 | Richmond et al. |
| 4,253,066 A | 2/1981 | Fisher et al. |
| 4,253,067 A | 2/1981 | Caples et al. |
| 4,253,069 A | 2/1981 | Nossek |
| 4,286,283 A | 8/1981 | Clemens |
| 4,308,614 A | 12/1981 | Fisher et al. |
| 4,313,222 A | 1/1982 | Katthän |
| 4,320,361 A | 3/1982 | Kikkert |
| 4,320,536 A | 3/1982 | Dietrich |
| 4,334,324 A | 6/1982 | Hoover |
| 4,346,477 A | 8/1982 | Gordy |
| 4,355,401 A | 10/1982 | Ikoma et al. |
| 4,356,558 A | 10/1982 | Owen et al. |
| 4,360,867 A | 11/1982 | Gonda |
| 4,363,132 A | 12/1982 | Collin |
| 4,365,217 A | 12/1982 | Berger et al. |
| 4,369,522 A | 1/1983 | Cerny, Jr. et al. |
| 4,370,572 A | 1/1983 | Cosand et al. |
| 4,380,828 A | 4/1983 | Moon |
| 4,384,357 A | 5/1983 | deBuda et al. |
| 4,389,579 A | 6/1983 | Stein |
| 4,392,255 A | 7/1983 | Del Giudice |
| 4,393,395 A | 7/1983 | Hacke et al. |
| 4,430,629 A | 2/1984 | Betzl et al. |
| 4,439,787 A | 3/1984 | Mogi et al. |
| 4,441,080 A | 4/1984 | Saari |
| 4,446,438 A | 5/1984 | Chang et al. |
| 4,456,990 A | 6/1984 | Fisher et al. |
| 4,470,145 A | 9/1984 | Williams |
| 4,472,785 A | 9/1984 | Kasuga |
| 4,479,226 A | 10/1984 | Prabhu et al. |
| 4,481,490 A | 11/1984 | Huntley |
| 4,481,642 A | 11/1984 | Hanson |
| 4,483,017 A | 11/1984 | Hampel et al. |
| 4,484,143 A | 11/1984 | French et al. |
| 4,485,347 A | 11/1984 | Hirasawa et al. |
| 4,485,488 A | 11/1984 | Houdart |
| 4,488,119 A | 12/1984 | Marshall |
| 4,504,803 A | 3/1985 | Lee et al. |
| 4,510,467 A | 4/1985 | Chang et al. |
| 4,517,519 A | 5/1985 | Mukaiyama |
| 4,517,520 A | 5/1985 | Ogawa |
| 4,518,935 A | 5/1985 | van Roermund |
| 4,521,892 A | 6/1985 | Vance et al. |
| 4,562,414 A | 12/1985 | Linder et al. |
| 4,563,773 A | 1/1986 | Dixon, Jr. et al. |
| 4,577,157 A | 3/1986 | Reed |
| 4,583,239 A | 4/1986 | Vance |
| 4,591,736 A | 5/1986 | Hirao et al. |
| 4,591,930 A | 5/1986 | Baumeister |
| 4,602,220 A | 7/1986 | Kurihara |
| 4,603,300 A | 7/1986 | Welles, II et al. |
| 4,612,464 A | 9/1986 | Ishikawa et al. |
| 4,612,518 A | 9/1986 | Gans et al. |
| 4,616,191 A | 10/1986 | Galani et al. |
| 4,621,217 A | 11/1986 | Saxe et al. |
| 4,628,517 A | 12/1986 | Schwarz et al. |
| 4,633,510 A | 12/1986 | Suzuki et al. |
| 4,634,998 A | 1/1987 | Crawford |
| 4,648,021 A | 3/1987 | Alberkrack |
| 4,651,034 A | 3/1987 | Sato |
| 4,653,117 A | 3/1987 | Heck |
| 4,660,164 A | 4/1987 | Leibowitz |
| 4,663,744 A | 5/1987 | Russell et al. |
| 4,675,882 A | 6/1987 | Lillie et al. |
| 4,688,237 A | 8/1987 | Brault |
| 4,688,253 A | 8/1987 | Gumm |
| 4,716,376 A | 12/1987 | Daudelin |
| 4,716,388 A | 12/1987 | Jacobs |
| 4,718,113 A | 1/1988 | Rother et al. |
| 4,726,041 A | 2/1988 | Prohaska et al. |
| 4,733,403 A | 3/1988 | Simone |
| 4,734,591 A | 3/1988 | Ichitsubo |
| 4,737,969 A | 4/1988 | Steel et al. |
| 4,740,675 A | 4/1988 | Brosnan et al. |

| Patent No. | Date | Inventor |
|---|---|---|
| 4,740,792 A | 4/1988 | Sagey et al. |
| 4,743,858 A | 5/1988 | Everard |
| 4,745,463 A | 5/1988 | Lu |
| 4,751,468 A | 6/1988 | Agoston |
| 4,757,538 A | 7/1988 | Zink |
| 4,761,798 A | 8/1988 | Griswold, Jr. et al. |
| 4,768,187 A | 8/1988 | Marshall |
| 4,769,612 A | 9/1988 | Tamakoshi et al. |
| 4,771,265 A | 9/1988 | Okui et al. |
| 4,772,853 A | 9/1988 | Hart |
| 4,785,463 A | 11/1988 | Janc et al. |
| 4,789,837 A | 12/1988 | Ridgers |
| 4,791,584 A | 12/1988 | Greivenkamp, Jr. |
| 4,801,823 A | 1/1989 | Yokoyama |
| 4,806,790 A | 2/1989 | Sone |
| 4,810,904 A | 3/1989 | Crawford |
| 4,810,976 A | 3/1989 | Cowley et al. |
| 4,811,362 A | 3/1989 | Yester, Jr. et al. |
| 4,811,422 A | 3/1989 | Kahn |
| 4,814,649 A | 3/1989 | Young |
| 4,816,704 A | 3/1989 | Fiori, Jr. |
| 4,819,252 A | 4/1989 | Christopher |
| 4,833,445 A | 5/1989 | Buchele |
| 4,841,265 A | 6/1989 | Watanabe et al. |
| 4,845,389 A | 7/1989 | Pyndiah et al. |
| 4,855,894 A | 8/1989 | Asahi et al. |
| 4,857,928 A | 8/1989 | Gailus et al. |
| 4,862,121 A | 8/1989 | Hochschild et al. |
| 4,866,441 A | 9/1989 | Conway et al. |
| 4,868,654 A | 9/1989 | Juri et al. |
| 4,870,659 A | 9/1989 | Oishi et al. |
| 4,871,987 A | 10/1989 | Kawase |
| 4,873,492 A | 10/1989 | Myer |
| 4,885,587 A | 12/1989 | Wiegand et al. |
| 4,885,671 A | 12/1989 | Peil |
| 4,885,756 A | 12/1989 | Fontanes et al. |
| 4,888,557 A | 12/1989 | Puckette, IV et al. |
| 4,890,302 A | 12/1989 | Muilwijk |
| 4,893,316 A | 1/1990 | Janc et al. |
| 4,893,341 A | 1/1990 | Gehring |
| 4,894,766 A | 1/1990 | De Agro |
| 4,896,152 A | 1/1990 | Tiemann |
| 4,902,979 A | 2/1990 | Puckette, IV |
| 4,908,579 A | 3/1990 | Tawfik et al. |
| 4,910,752 A | 3/1990 | Yester, Jr. et al. |
| 4,914,405 A | 4/1990 | Wells |
| 4,920,510 A | 4/1990 | Senderowicz et al. |
| 4,922,452 A | 5/1990 | Larsen et al. |
| 4,931,716 A | 6/1990 | Jovanovic et al. |
| 4,931,921 A | 6/1990 | Anderson |
| 4,943,974 A | 7/1990 | Motamedi |
| 4,944,025 A | 7/1990 | Gehring et al. |
| 4,955,079 A | 9/1990 | Connerney et al. |
| 4,965,467 A | 10/1990 | Bilterijst |
| 4,967,160 A | 10/1990 | Quievy et al. |
| 4,970,703 A | 11/1990 | Hariharan et al. |
| 4,972,436 A | 11/1990 | Halim et al. |
| 4,982,353 A | 1/1991 | Jacob et al. |
| 4,984,077 A | 1/1991 | Uchida |
| 4,995,055 A | 2/1991 | Weinberger et al. |
| 5,003,621 A | 3/1991 | Gailus |
| 5,005,169 A | 4/1991 | Bronder et al. |
| 5,006,810 A | 4/1991 | Popescu |
| 5,006,854 A | 4/1991 | White et al. |
| 5,010,585 A | 4/1991 | Garcia |
| 5,012,245 A | 4/1991 | Scott et al. |
| 5,014,304 A | 5/1991 | Nicollini et al. |
| 5,015,963 A | 5/1991 | Sutton |
| 5,016,242 A | 5/1991 | Tang |
| 5,017,924 A | 5/1991 | Guiberteau et al. |
| 5,020,149 A | 5/1991 | Hemmie |
| 5,020,154 A | 5/1991 | Zierhut |
| 5,052,050 A | 9/1991 | Collier et al. |
| 5,058,107 A | 10/1991 | Stone et al. |
| 5,063,387 A | 11/1991 | Mower |
| 5,065,409 A | 11/1991 | Hughes et al. |
| 5,083,050 A | 1/1992 | Vasile |
| 5,091,921 A | 2/1992 | Minami |
| 5,095,533 A | 3/1992 | Loper et al. |
| 5,095,536 A | 3/1992 | Loper |
| 5,111,152 A | 5/1992 | Makino |
| 5,113,094 A | 5/1992 | Grace et al. |
| 5,113,129 A | 5/1992 | Hughes |
| 5,115,409 A | 5/1992 | Stepp |
| 5,122,765 A | 6/1992 | Pataut |
| 5,124,592 A | 6/1992 | Hagino |
| 5,126,682 A | 6/1992 | Weinberg et al. |
| 5,131,014 A | 7/1992 | White |
| 5,136,267 A | 8/1992 | Cabot |
| 5,140,699 A | 8/1992 | Kozak |
| 5,140,705 A | 8/1992 | Kosuga |
| 5,150,124 A | 9/1992 | Moore et al. |
| 5,151,661 A | 9/1992 | Caldwell et al. |
| 5,157,687 A | 10/1992 | Tymes |
| 5,159,710 A | 10/1992 | Cusdin |
| 5,164,985 A | 11/1992 | Nysen et al. |
| 5,170,414 A | 12/1992 | Silvian |
| 5,172,019 A | 12/1992 | Naylor et al. |
| 5,172,070 A | 12/1992 | Hiraiwa et al. |
| 5,179,731 A | 1/1993 | Tränkle et al. |
| 5,191,459 A | 3/1993 | Thompson et al. |
| 5,196,806 A | 3/1993 | Ichihara |
| 5,204,642 A | 4/1993 | Asghar et al. |
| 5,212,827 A | 5/1993 | Meszko et al. |
| 5,214,787 A | 5/1993 | Karkota, Jr. |
| 5,218,562 A | 6/1993 | Basehore et al. |
| 5,220,583 A | 6/1993 | Solomon |
| 5,220,680 A | 6/1993 | Lee |
| 5,222,144 A | 6/1993 | Whikehart |
| 5,230,097 A | 7/1993 | Currie et al. |
| 5,239,496 A | 8/1993 | Vancraeynest |
| 5,239,686 A | 8/1993 | Downey |
| 5,239,687 A | 8/1993 | Chen |
| 5,241,561 A | 8/1993 | Barnard |
| 5,249,203 A | 9/1993 | Loper |
| 5,251,218 A | 10/1993 | Stone et al. |
| 5,251,232 A | 10/1993 | Nonami |
| 5,260,970 A | 11/1993 | Henry et al. |
| 5,260,973 A | 11/1993 | Watanabe |
| 5,263,194 A | 11/1993 | Ragan |
| 5,263,196 A | 11/1993 | Jasper |
| 5,263,198 A | 11/1993 | Geddes et al. |
| 5,267,023 A | 11/1993 | Kawasaki |
| 5,278,826 A | 1/1994 | Murphy et al. |
| 5,282,023 A | 1/1994 | Scarpa |
| 5,282,222 A | 1/1994 | Fattouche et al. |
| 5,287,516 A | 2/1994 | Schaub |
| 5,293,398 A | 3/1994 | Hamao et al. |
| 5,303,417 A | 4/1994 | Laws |
| 5,307,517 A | 4/1994 | Rich |
| 5,315,583 A | 5/1994 | Murphy et al. |
| 5,319,799 A | 6/1994 | Morita |
| 5,321,852 A | 6/1994 | Seong |
| 5,325,204 A | 6/1994 | Scarpa |
| 5,337,014 A | 8/1994 | Najle et al. |
| 5,339,054 A | 8/1994 | Taguchi |
| 5,339,395 A * | 8/1994 | Pickett et al. ............... 710/305 |
| 5,339,459 A | 8/1994 | Schiltz et al. |
| 5,345,239 A | 9/1994 | Madni et al. |
| 5,353,306 A | 10/1994 | Yamamoto |
| 5,355,114 A | 10/1994 | Sutterlin et al. |
| 5,361,408 A | 11/1994 | Watanabe et al. |
| 5,369,404 A | 11/1994 | Galton |
| 5,369,789 A | 11/1994 | Kosugi et al. |
| 5,369,800 A | 11/1994 | Takagi et al. |
| 5,375,146 A | 12/1994 | Chalmers |

| | | | | | |
|---|---|---|---|---|---|
| 5,379,040 A | 1/1995 | Mizomoto et al. | 5,559,809 A | 9/1996 | Jeon et al. |
| 5,379,141 A | 1/1995 | Thompson et al. | 5,563,550 A | 10/1996 | Toth |
| 5,388,063 A | 2/1995 | Takatori et al. | 5,564,097 A | 10/1996 | Swanke |
| 5,389,839 A | 2/1995 | Heck | 5,574,755 A | 11/1996 | Persico |
| 5,390,364 A | 2/1995 | Webster et al. | 5,579,341 A | 11/1996 | Smith et al. |
| 5,400,084 A | 3/1995 | Scarpa | 5,579,347 A | 11/1996 | Lindquist et al. |
| 5,404,127 A | 4/1995 | Lee et al. | 5,584,068 A | 12/1996 | Mohindra |
| 5,410,195 A | 4/1995 | Ichihara | 5,589,793 A | 12/1996 | Kassapian |
| 5,410,270 A | 4/1995 | Rybicki et al. | 5,592,131 A | 1/1997 | Labreche et al. |
| 5,410,541 A | 4/1995 | Hotto | 5,600,680 A | 2/1997 | Mishima et al. |
| 5,410,743 A | 4/1995 | Seely et al. | 5,602,847 A | 2/1997 | Pagano et al. |
| 5,412,352 A | 5/1995 | Graham | 5,602,868 A | 2/1997 | Wilson |
| 5,416,449 A | 5/1995 | Joshi | 5,604,592 A | 2/1997 | Kotidis et al. |
| 5,416,803 A | 5/1995 | Janer | 5,604,732 A | 2/1997 | Kim et al. |
| 5,422,909 A | 6/1995 | Love et al. | 5,606,731 A | 2/1997 | Pace et al. |
| 5,422,913 A | 6/1995 | Wilkinson | 5,608,531 A | 3/1997 | Honda et al. |
| 5,423,082 A | 6/1995 | Cygan et al. | 5,610,946 A | 3/1997 | Tanaka et al. |
| 5,428,638 A | 6/1995 | Cioffi et al. | RE35,494 E | 4/1997 | Nicollini |
| 5,428,640 A | 6/1995 | Townley | 5,617,451 A | 4/1997 | Mimura et al. |
| 5,434,546 A | 7/1995 | Palmer | 5,619,538 A | 4/1997 | Sempel et al. |
| 5,438,329 A | 8/1995 | Gastouniotis et al. | 5,621,455 A | 4/1997 | Rogers et al. |
| 5,438,692 A | 8/1995 | Mohindra | 5,628,055 A | 5/1997 | Stein |
| 5,440,311 A | 8/1995 | Gallagher et al. | 5,630,227 A | 5/1997 | Bella et al. |
| 5,444,415 A | 8/1995 | Dent et al. | 5,633,610 A | 5/1997 | Maekawa et al. |
| 5,444,416 A | 8/1995 | Ishikawa et al. | 5,633,815 A | 5/1997 | Young |
| 5,444,865 A | 8/1995 | Heck et al. | 5,634,207 A | 5/1997 | Yamaji et al. |
| 5,446,421 A | 8/1995 | Kechkaylo | 5,636,140 A | 6/1997 | Lee et al. |
| 5,446,422 A | 8/1995 | Mattila et al. | 5,638,396 A | 6/1997 | Klimek |
| 5,448,602 A | 9/1995 | Ohmori et al. | 5,640,415 A | 6/1997 | Pandula |
| 5,451,899 A | 9/1995 | Lawton | 5,640,424 A | 6/1997 | Banavong et al. |
| 5,454,007 A | 9/1995 | Dutta | 5,640,428 A | 6/1997 | Abe et al. |
| 5,454,009 A | 9/1995 | Fruit et al. | 5,640,698 A | 6/1997 | Shen et al. |
| 5,461,646 A | 10/1995 | Anvari | 5,642,071 A | 6/1997 | Sevenhans et al. |
| 5,463,356 A | 10/1995 | Palmer | 5,648,985 A | 7/1997 | Bjerede et al. |
| 5,463,357 A | 10/1995 | Hobden | 5,650,785 A | 7/1997 | Rodal |
| 5,465,071 A | 11/1995 | Kobayashi et al. | 5,661,424 A | 8/1997 | Tang |
| 5,465,410 A | 11/1995 | Hiben et al. | 5,663,878 A | 9/1997 | Walker |
| 5,465,415 A | 11/1995 | Bien | 5,663,986 A | 9/1997 | Striffler |
| 5,465,418 A | 11/1995 | Zhou et al. | 5,668,836 A | 9/1997 | Smith et al. |
| 5,471,162 A | 11/1995 | McEwan | 5,675,392 A | 10/1997 | Nayebi et al. |
| 5,471,665 A | 11/1995 | Pace et al. | 5,678,220 A | 10/1997 | Fournier |
| 5,479,120 A | 12/1995 | McEwan | 5,678,226 A | 10/1997 | Li et al. |
| 5,479,447 A | 12/1995 | Chow et al. | 5,680,078 A | 10/1997 | Ariie |
| 5,481,570 A | 1/1996 | Winters | 5,680,418 A | 10/1997 | Croft et al. |
| 5,483,193 A | 1/1996 | Kennedy et al. | 5,682,099 A | 10/1997 | Thompson et al. |
| 5,483,245 A | 1/1996 | Ruinet | 5,689,413 A | 11/1997 | Jaramillo et al. |
| 5,483,549 A | 1/1996 | Weinberg et al. | 5,694,096 A | 12/1997 | Ushiroku et al. |
| 5,483,600 A | 1/1996 | Werrbach | 5,697,074 A | 12/1997 | Makikallio et al. |
| 5,483,691 A | 1/1996 | Heck et al. | 5,699,006 A | 12/1997 | Zele et al. |
| 5,483,695 A | 1/1996 | Pardoen | 5,703,584 A * | 12/1997 | Hill ............................ 341/141 |
| 5,490,173 A | 2/1996 | Whikehart et al. | 5,705,949 A | 1/1998 | Alelyunas et al. |
| 5,490,176 A | 2/1996 | Peltier | 5,705,955 A | 1/1998 | Freeburg et al. |
| 5,493,581 A | 2/1996 | Young et al. | 5,710,992 A | 1/1998 | Sawada et al. |
| 5,493,721 A | 2/1996 | Reis | 5,710,998 A | 1/1998 | Opas |
| 5,495,200 A | 2/1996 | Kwan et al. | 5,714,910 A | 2/1998 | Skoczen et al. |
| 5,495,202 A | 2/1996 | Hsu | 5,715,281 A | 2/1998 | Bly et al. |
| 5,495,500 A | 2/1996 | Jovanovich et al. | 5,721,514 A | 2/1998 | Crockett et al. |
| 5,499,267 A | 3/1996 | Ohe et al. | 5,724,002 A | 3/1998 | Hulick |
| 5,500,758 A | 3/1996 | Thompson et al. | 5,724,041 A | 3/1998 | Inoue et al. |
| 5,513,389 A | 4/1996 | Reeser et al. | 5,724,653 A | 3/1998 | Baker et al. |
| 5,515,014 A | 5/1996 | Troutman | 5,729,577 A | 3/1998 | Chen |
| 5,517,688 A | 5/1996 | Fajen et al. | 5,729,829 A | 3/1998 | Talwar et al. |
| 5,519,890 A | 5/1996 | Pinckley | 5,732,333 A | 3/1998 | Cox et al. |
| 5,523,719 A | 6/1996 | Longo et al. | 5,734,683 A | 3/1998 | Hulkko et al. |
| 5,523,726 A | 6/1996 | Kroeger et al. | 5,736,895 A | 4/1998 | Yu et al. |
| 5,523,760 A | 6/1996 | McEwan | 5,737,035 A | 4/1998 | Rotzoll |
| 5,535,402 A | 7/1996 | Leibowitz et al. | 5,742,189 A | 4/1998 | Yoshida et al. |
| 5,539,770 A | 7/1996 | Ishigaki | 5,745,846 A | 4/1998 | Myer et al. |
| 5,551,076 A | 8/1996 | Bonn | 5,748,683 A | 5/1998 | Smith et al. |
| 5,552,789 A | 9/1996 | Schuermann | 5,751,154 A | 5/1998 | Tsugai |
| 5,555,453 A | 9/1996 | Kajimoto et al. | 5,757,858 A | 5/1998 | Black et al. |
| 5,557,641 A | 9/1996 | Weinberg | 5,757,870 A | 5/1998 | Miya et al. |
| 5,557,642 A | 9/1996 | Williams | RE35,829 E | 6/1998 | Sanderford, Jr. |

| | | | | | |
|---|---|---|---|---|---|
| 5,760,629 A | 6/1998 | Urabe et al. | 5,914,622 A | 6/1999 | Inoue |
| 5,760,632 A | 6/1998 | Kawakami et al. | 5,915,278 A | 6/1999 | Mallick |
| 5,760,645 A | 6/1998 | Comte et al. | 5,918,167 A | 6/1999 | Tiller et al. |
| 5,764,087 A | 6/1998 | Clark | 5,920,199 A | 7/1999 | Sauer |
| 5,767,726 A | 6/1998 | Wang | 5,926,065 A | 7/1999 | Wakai et al. |
| 5,768,118 A | 6/1998 | Faulk et al. | 5,926,513 A | 7/1999 | Suominen et al. |
| 5,768,323 A | 6/1998 | Kroeger et al. | 5,933,467 A | 8/1999 | Sehier et al. |
| 5,770,985 A | 6/1998 | Ushiroku et al. | 5,937,013 A | 8/1999 | Lam et al. |
| 5,771,442 A | 6/1998 | Wang et al. | 5,943,370 A | 8/1999 | Smith |
| 5,777,692 A | 7/1998 | Ghosh | 5,945,660 A | 8/1999 | Nakasuji et al. |
| 5,777,771 A | 7/1998 | Smith | 5,949,827 A | 9/1999 | DeLuca et al. |
| 5,778,022 A | 7/1998 | Walley | 5,952,895 A | 9/1999 | McCune, Jr. et al. |
| 5,784,689 A | 7/1998 | Kobayashi | 5,953,642 A | 9/1999 | Feldtkeller et al. |
| 5,786,844 A | 7/1998 | Rogers et al. | 5,955,992 A | 9/1999 | Shattil |
| 5,790,587 A | 8/1998 | Smith et al. | 5,959,850 A | 9/1999 | Lim |
| 5,793,801 A | 8/1998 | Fertner | 5,960,033 A | 9/1999 | Shibano et al. |
| 5,793,817 A | 8/1998 | Wilson | 5,970,053 A | 10/1999 | Schick et al. |
| 5,793,818 A | 8/1998 | Claydon et al. | 5,982,315 A | 11/1999 | Bazarjani et al. |
| 5,801,654 A | 9/1998 | Traylor | 5,982,329 A | 11/1999 | Pittman et al. |
| 5,802,463 A | 9/1998 | Zuckerman | 5,986,600 A | 11/1999 | McEwan |
| 5,809,060 A | 9/1998 | Cafarella et al. | 5,994,689 A | 11/1999 | Charrier |
| 5,812,546 A | 9/1998 | Zhou et al. | 5,995,030 A | 11/1999 | Cabler |
| 5,818,582 A | 10/1998 | Fernandez et al. | 5,999,561 A | 12/1999 | Naden et al. |
| 5,818,869 A | 10/1998 | Miya et al. | 6,005,506 A | 12/1999 | Bazarjani et al. |
| 5,825,254 A | 10/1998 | Lee | 6,005,903 A | 12/1999 | Mendelovicz |
| 5,825,257 A | 10/1998 | Klymyshyn et al. | 6,011,435 A | 1/2000 | Takeyabu et al. |
| 5,834,979 A | 11/1998 | Yatsuka | 6,014,176 A | 1/2000 | Nayebi et al. |
| 5,834,985 A | 11/1998 | Sundegård | 6,014,551 A | 1/2000 | Pesola et al. |
| 5,834,987 A | 11/1998 | Dent | 6,018,262 A | 1/2000 | Noro et al. |
| 5,841,324 A | 11/1998 | Williams | 6,018,553 A | 1/2000 | Sanielevici et al. |
| 5,841,811 A | 11/1998 | Song | 6,026,286 A | 2/2000 | Long |
| 5,844,449 A | 12/1998 | Abeno et al. | 6,028,887 A | 2/2000 | Harrison et al. |
| 5,844,868 A | 12/1998 | Takahashi et al. | 6,031,217 A | 2/2000 | Aswell et al. |
| 5,847,594 A | 12/1998 | Mizuno | 6,034,566 A | 3/2000 | Ohe |
| 5,859,878 A | 1/1999 | Phillips et al. | 6,038,265 A | 3/2000 | Pan et al. |
| 5,864,754 A | 1/1999 | Hotto | 6,041,073 A | 3/2000 | Davidovici et al. |
| 5,870,670 A | 2/1999 | Ripley et al. | 6,047,026 A | 4/2000 | Chao et al. |
| 5,872,446 A | 2/1999 | Cranford, Jr. et al. | 6,049,573 A | 4/2000 | Song |
| 5,881,375 A | 3/1999 | Bonds | 6,049,706 A | 4/2000 | Cook et al. |
| 5,883,548 A | 3/1999 | Assard et al. | 6,054,889 A | 4/2000 | Kobayashi |
| 5,884,154 A | 3/1999 | Sano et al. | 6,057,714 A | 5/2000 | Andrys et al. |
| 5,887,001 A * | 3/1999 | Russell ............. 714/726 | 6,061,551 A | 5/2000 | Sorrells et al. |
| 5,892,380 A | 4/1999 | Quist | 6,061,555 A | 5/2000 | Bultman et al. |
| 5,894,239 A | 4/1999 | Bonaccio et al. | 6,064,054 A | 5/2000 | Waczynski et al. |
| 5,894,496 A | 4/1999 | Jones | 6,067,329 A | 5/2000 | Kato et al. |
| 5,896,304 A | 4/1999 | Tiemann et al. | 6,072,996 A | 6/2000 | Smith |
| 5,896,347 A | 4/1999 | Tomita et al. | 6,073,001 A | 6/2000 | Sokoler |
| 5,896,562 A | 4/1999 | Heinonen | 6,076,015 A | 6/2000 | Hartley et al. |
| 5,898,912 A | 4/1999 | Heck et al. | 6,078,630 A | 6/2000 | Prasanna |
| 5,900,746 A * | 5/1999 | Sheahan ............. 326/73 | 6,081,691 A | 6/2000 | Renard et al. |
| 5,900,747 A | 5/1999 | Brauns | 6,084,465 A | 7/2000 | Dasgupta |
| 5,901,054 A | 5/1999 | Leu et al. | 6,084,922 A | 7/2000 | Zhou et al. |
| 5,901,187 A | 5/1999 | Iinuma | 6,085,073 A | 7/2000 | Palermo et al. |
| 5,901,344 A | 5/1999 | Opas | 6,088,348 A | 7/2000 | Bell, III et al. |
| 5,901,347 A | 5/1999 | Chambers et al. | 6,091,289 A | 7/2000 | Song et al. |
| 5,901,348 A | 5/1999 | Bang et al. | 6,091,939 A | 7/2000 | Banh |
| 5,901,349 A | 5/1999 | Guegnaud et al. | 6,091,940 A | 7/2000 | Sorrells et al. |
| 5,903,178 A | 5/1999 | Miyatsuji et al. | 6,091,941 A | 7/2000 | Moriyama et al. |
| 5,903,187 A | 5/1999 | Claverie et al. | 6,094,084 A | 7/2000 | Abou-Allam et al. |
| 5,903,196 A | 5/1999 | Salvi et al. | 6,098,046 A | 8/2000 | Cooper et al. |
| 5,903,421 A | 5/1999 | Furutani et al. | 6,098,886 A | 8/2000 | Swift et al. |
| 5,903,553 A | 5/1999 | Sakamoto et al. | 6,112,061 A | 8/2000 | Rapeli |
| 5,903,595 A | 5/1999 | Suzuki | 6,121,819 A | 9/2000 | Traylor |
| 5,903,609 A | 5/1999 | Kool et al. | 6,125,271 A | 9/2000 | Rowland et al. |
| 5,903,827 A | 5/1999 | Kennan et al. | 6,128,746 A * | 10/2000 | Clark et al. ............. 713/324 |
| 5,903,854 A | 5/1999 | Abe et al. | 6,144,236 A | 11/2000 | Vice et al. |
| 5,905,433 A | 5/1999 | Wortham | 6,144,331 A | 11/2000 | Jiang |
| 5,905,449 A | 5/1999 | Tsubouchi et al. | 6,144,846 A | 11/2000 | Durec |
| 5,907,149 A | 5/1999 | Marckini | 6,147,340 A | 11/2000 | Levy |
| 5,907,197 A | 5/1999 | Faulk | 6,147,763 A | 11/2000 | Steinlechner |
| 5,909,447 A | 6/1999 | Cox et al. | 6,150,890 A | 11/2000 | Damgaard et al. |
| 5,911,116 A | 6/1999 | Nosswitz | 6,151,354 A | 11/2000 | Abbey |
| 5,911,123 A | 6/1999 | Shaffer et al. | 6,160,280 A | 12/2000 | Bonn et al. |

| Patent No. | Date | Name |
|---|---|---|
| 6,169,733 B1 | 1/2001 | Lee |
| 6,175,728 B1 | 1/2001 | Mitama |
| 6,178,319 B1 | 1/2001 | Kashima |
| 6,198,941 B1 | 3/2001 | Aho et al. |
| 6,204,789 B1 | 3/2001 | Nagata |
| 6,208,636 B1 | 3/2001 | Tawil et al. |
| RE37,138 E | 4/2001 | Dent |
| 6,211,718 B1 | 4/2001 | Souetinov |
| 6,212,369 B1 | 4/2001 | Avasarala |
| 6,215,475 B1 | 4/2001 | Meyerson et al. |
| 6,225,848 B1 | 5/2001 | Tilley et al. |
| 6,230,000 B1 | 5/2001 | Tayloe |
| 6,246,695 B1 * | 6/2001 | Seazholtz et al. ............ 370/468 |
| 6,259,293 B1 | 7/2001 | Hayase et al. |
| 6,266,518 B1 | 7/2001 | Sorrells et al. |
| 6,298,065 B1 * | 10/2001 | Dombkowski et al. ....... 370/420 |
| 6,307,894 B2 | 10/2001 | Eidson et al. |
| 6,308,058 B1 | 10/2001 | Souetinov et al. |
| 6,313,685 B1 | 11/2001 | Rabii |
| 6,313,700 B1 | 11/2001 | Nishijima et al. |
| 6,314,279 B1 | 11/2001 | Mohindra |
| 6,317,589 B1 | 11/2001 | Nash |
| 6,321,073 B1 | 11/2001 | Luz et al. |
| 6,327,313 B1 | 12/2001 | Traylor et al. |
| 6,330,244 B1 | 12/2001 | Swartz et al. |
| 6,335,656 B1 | 1/2002 | Goldfarb et al. |
| 6,353,735 B1 | 3/2002 | Sorrells et al. |
| 6,363,262 B1 | 3/2002 | McNicol |
| 6,366,622 B1 | 4/2002 | Brown et al. |
| 6,370,371 B1 | 4/2002 | Sorrells et al. |
| 6,385,439 B1 | 5/2002 | Hellberg |
| 6,393,070 B1 | 5/2002 | Reber |
| 6,400,963 B1 | 6/2002 | Glöckler et al. |
| 6,404,758 B1 | 6/2002 | Wang |
| 6,404,823 B1 | 6/2002 | Grange et al. |
| 6,421,534 B1 | 7/2002 | Cook et al. |
| 6,437,639 B1 | 8/2002 | Nguyen et al. |
| 6,438,366 B1 | 8/2002 | Lindfors et al. |
| 6,441,659 B1 | 8/2002 | Demone |
| 6,441,694 B1 | 8/2002 | Turcotte et al. |
| 6,445,726 B1 | 9/2002 | Gharpurey |
| 6,459,721 B1 | 10/2002 | Mochizuki et al. |
| 6,509,777 B2 | 1/2003 | Razavi et al. |
| 6,512,544 B1 | 1/2003 | Merrill et al. |
| 6,512,785 B1 | 1/2003 | Zhou et al. |
| 6,512,798 B1 | 1/2003 | Akiyama et al. |
| 6,516,185 B1 | 2/2003 | MacNally |
| 6,531,979 B1 | 3/2003 | Hynes |
| 6,542,722 B1 | 4/2003 | Sorrells et al. |
| 6,560,301 B1 | 5/2003 | Cook et al. |
| 6,560,451 B1 | 5/2003 | Somayajula |
| 6,567,483 B1 | 5/2003 | Dent et al. |
| 6,580,902 B1 | 6/2003 | Sorrells et al. |
| 6,591,310 B1 * | 7/2003 | Johnson ........................ 710/3 |
| 6,597,240 B1 * | 7/2003 | Walburger et al. ............ 330/10 |
| 6,600,795 B1 | 7/2003 | Ohta et al. |
| 6,600,911 B1 | 7/2003 | Morishige et al. |
| 6,608,647 B1 | 8/2003 | King |
| 6,611,569 B1 | 8/2003 | Schier et al. |
| 6,618,579 B1 | 9/2003 | Smith et al. |
| 6,625,470 B1 | 9/2003 | Fourtet et al. |
| 6,628,328 B1 | 9/2003 | Yokouchi et al. |
| 6,633,194 B2 | 10/2003 | Arnborg et al. |
| 6,634,555 B1 | 10/2003 | Sorrells et al. |
| 6,647,250 B1 | 11/2003 | Bultman et al. |
| 6,647,270 B1 | 11/2003 | Himmelstein |
| 6,686,879 B2 | 2/2004 | Shattil |
| 6,687,493 B1 | 2/2004 | Sorrells et al. |
| 6,690,232 B2 | 2/2004 | Ueno et al. |
| 6,694,128 B1 | 2/2004 | Sorrells et al. |
| 6,697,603 B1 | 2/2004 | Lovinggood et al. |
| 6,704,549 B1 | 3/2004 | Sorrells et al. |
| 6,704,558 B1 | 3/2004 | Sorrells et al. |
| 6,741,139 B2 | 5/2004 | Pleasant et al. |
| 6,741,650 B2 | 5/2004 | Painchaud et al. |
| 6,775,684 B1 | 8/2004 | Toyoyama et al. |
| 6,798,351 B1 | 9/2004 | Sorrells et al. |
| 6,801,253 B1 | 10/2004 | Yonemoto et al. |
| 6,813,320 B1 | 11/2004 | Claxton et al. |
| 6,813,485 B2 | 11/2004 | Sorrells et al. |
| 6,823,178 B2 | 11/2004 | Pleasant et al. |
| 6,836,650 B2 | 12/2004 | Sorrells et al. |
| 6,850,742 B2 * | 2/2005 | Fayyaz ....................... 455/118 |
| 6,853,690 B1 | 2/2005 | Sorrells et al. |
| 6,865,399 B2 | 3/2005 | Fujioka et al. |
| 6,873,836 B1 | 3/2005 | Sorrells et al. |
| 6,876,846 B2 | 4/2005 | Tamaki et al. |
| 6,879,817 B1 | 4/2005 | Rawlins et al. |
| 6,892,057 B2 | 5/2005 | Nilsson |
| 6,894,988 B1 | 5/2005 | Zehavi |
| 6,909,739 B1 | 6/2005 | Eerola et al. |
| 6,910,015 B2 | 6/2005 | Kawai |
| 6,959,178 B2 | 10/2005 | Macedo et al. |
| 6,963,626 B1 * | 11/2005 | Shaeffer et al. ............. 375/346 |
| 6,963,734 B2 | 11/2005 | Sorrells et al. |
| 6,973,476 B1 | 12/2005 | Naden et al. |
| 6,975,848 B2 | 12/2005 | Rawlins et al. |
| 6,999,747 B2 | 2/2006 | Su |
| 7,006,805 B1 | 2/2006 | Sorrells et al. |
| 7,010,286 B2 | 3/2006 | Sorrells et al. |
| 7,010,559 B2 | 3/2006 | Rawlins et al. |
| 7,016,663 B2 | 3/2006 | Sorrells et al. |
| 7,027,786 B1 | 4/2006 | Smith et al. |
| 7,039,372 B1 | 5/2006 | Sorrells et al. |
| 7,050,508 B2 | 5/2006 | Sorrells et al. |
| 7,054,296 B1 | 5/2006 | Sorrells et al. |
| 7,065,162 B1 | 6/2006 | Sorrells et al. |
| 7,072,390 B1 | 7/2006 | Sorrells et al. |
| 7,072,427 B2 | 7/2006 | Rawlins et al. |
| 7,072,433 B2 | 7/2006 | Bell |
| 7,076,011 B2 | 7/2006 | Cook et al. |
| 7,082,171 B1 | 7/2006 | Johnson et al. |
| 7,085,335 B2 | 8/2006 | Rawlins et al. |
| 7,107,028 B2 | 9/2006 | Sorrells et al. |
| 7,110,435 B1 | 9/2006 | Sorrells et al. |
| 7,110,444 B1 | 9/2006 | Sorrells et al. |
| 7,190,941 B2 | 3/2007 | Sorrells et al. |
| 7,193,965 B1 | 3/2007 | Nevo et al. |
| 7,194,044 B2 | 3/2007 | Birkett et al. |
| 7,194,246 B2 | 3/2007 | Sorrells et al. |
| 7,197,081 B2 | 3/2007 | Saito |
| 7,209,725 B1 | 4/2007 | Sorrells et al. |
| 7,212,581 B2 | 5/2007 | Birkett et al. |
| 7,218,899 B2 | 5/2007 | Sorrells et al. |
| 7,218,907 B2 | 5/2007 | Sorrells et al. |
| 7,224,749 B2 | 5/2007 | Sorrells et al. |
| 7,233,969 B2 | 6/2007 | Rawlins et al. |
| 7,236,754 B2 | 6/2007 | Sorrells et al. |
| 7,245,886 B2 | 7/2007 | Sorrells et al. |
| 7,272,164 B2 | 9/2007 | Sorrells et al. |
| 7,292,835 B2 | 11/2007 | Sorrells et al. |
| 7,295,826 B1 | 11/2007 | Cook et al. |
| 7,308,242 B2 | 12/2007 | Sorrells et al. |
| 7,321,640 B2 | 1/2008 | Milne et al. |
| 7,321,735 B1 | 1/2008 | Smith et al. |
| 7,321,751 B2 | 1/2008 | Sorrells et al. |
| 7,376,410 B2 | 5/2008 | Sorrells et al. |
| 7,379,515 B2 | 5/2008 | Johnson et al. |
| 7,379,883 B2 | 5/2008 | Sorrells |
| 7,386,292 B2 | 6/2008 | Sorrells et al. |
| 7,389,100 B2 | 6/2008 | Sorrells et al. |
| 2001/0015673 A1 | 8/2001 | Yamashita et al. |
| 2001/0036818 A1 | 11/2001 | Dobrovolny |
| 2002/0021685 A1 * | 2/2002 | Sakusabe .................... 370/338 |
| 2002/0037706 A1 | 3/2002 | Ichihara |
| 2002/0080728 A1 * | 6/2002 | Sugar et al. ................. 370/252 |

| | | | | | | |
|---|---|---|---|---|---|---|
| 2002/0132642 | A1 | 9/2002 | Hines et al. | JP | 58-031622 | 2/1983 |
| 2002/0163921 | A1* | 11/2002 | Ethridge et al. ............. 370/401 | JP | 58-133004 | 8/1983 |
| 2003/0045263 | A1 | 3/2003 | Wakayama et al. | JP | 59-022438 | 2/1984 |
| 2003/0078011 | A1* | 4/2003 | Cheng et al. .................. 455/73 | JP | 59-123318 | 7/1984 |
| 2003/0081781 | A1 | 5/2003 | Jensen et al. | JP | 59-144249 | 8/1984 |
| 2003/0149579 | A1 | 8/2003 | Begemann et al. | JP | 60-58705 | 4/1985 |
| 2003/0193364 | A1 | 10/2003 | Liu et al. | JP | 60-130203 | 7/1985 |
| 2004/0125879 | A1 | 7/2004 | Jaussi et al. | JP | 61-30821 | 2/1986 |
| 2006/0002491 | A1 | 1/2006 | Darabi et al. | JP | 61-193521 | 8/1986 |
| 2006/0039449 | A1 | 2/2006 | Fontana et al. | JP | 61-245749 | 11/1986 |
| 2006/0209599 | A1* | 9/2006 | Kato et al. ............. 365/185.28 | JP | 62-12381 | 1/1987 |
| | | | | JP | 62-047214 | 2/1987 |

FOREIGN PATENT DOCUMENTS

| | | |
|---|---|---|
| DE | 35 41 031 A1 | 5/1986 |
| DE | 42 37 692 C1 | 3/1994 |
| DE | 196 27 640 A1 | 1/1997 |
| DE | 196 48 915 A1 | 6/1998 |
| DE | 197 35 798 C1 | 7/1998 |
| EP | 0 035 166 A1 | 9/1981 |
| EP | 0 087 336 A1 | 8/1983 |
| EP | 0 099 265 A1 | 1/1984 |
| EP | 0 087 336 B1 | 7/1986 |
| EP | 0 254 884 A2 | 2/1988 |
| EP | 0 276 130 A2 | 7/1988 |
| EP | 0 276 130 A3 | 7/1988 |
| EP | 0 193 899 B1 | 6/1990 |
| EP | 0 380 351 A2 | 8/1990 |
| EP | 0 380 351 A3 | 2/1991 |
| EP | 0 411 840 A2 | 2/1991 |
| EP | 0 423 718 A2 | 4/1991 |
| EP | 0 411 840 A3 | 7/1991 |
| EP | 0 486 095 A1 | 5/1992 |
| EP | 0 423 718 A3 | 8/1992 |
| EP | 0 512 748 A2 | 11/1992 |
| EP | 0 529 836 A1 | 3/1993 |
| EP | 0 548 542 A1 | 6/1993 |
| EP | 0 512 748 A3 | 7/1993 |
| EP | 0 560 228 A1 | 9/1993 |
| EP | 0 632 288 A2 | 1/1995 |
| EP | 0 632 577 A1 | 1/1995 |
| EP | 0 643 477 A2 | 3/1995 |
| EP | 0 643 477 A3 | 3/1995 |
| EP | 0 411 840 B1 | 10/1995 |
| EP | 0 696 854 A1 | 2/1996 |
| EP | 0 632 288 A3 | 7/1996 |
| EP | 0 732 803 A1 | 9/1996 |
| EP | 0 486 095 B1 | 2/1997 |
| EP | 0 782 275 A2 | 7/1997 |
| EP | 0 785 635 A1 | 7/1997 |
| EP | 0 789 449 A2 | 8/1997 |
| EP | 0 789 449 A3 | 8/1997 |
| EP | 0 795 955 A2 | 9/1997 |
| EP | 0 795 955 A3 | 9/1997 |
| EP | 0 795 978 A2 | 9/1997 |
| EP | 0 817 369 A2 | 1/1998 |
| EP | 0 817 369 A3 | 1/1998 |
| EP | 0 837 565 A1 | 4/1998 |
| EP | 0 862 274 A1 | 9/1998 |
| EP | 0 874 499 A2 | 10/1998 |
| EP | 0 512 748 B1 | 11/1998 |
| EP | 0 877 476 A1 | 11/1998 |
| EP | 0 977 351 A1 | 2/2000 |
| FR | 2 245 130 | 4/1975 |
| FR | 2 669 787 A1 | 5/1992 |
| FR | 2 743 231 A1 | 7/1997 |
| GB | 2 161 344 A | 1/1986 |
| GB | 2 215 945 A | 9/1989 |
| GB | 2 324 919 A | 11/1998 |
| JP | 47-2314 | 2/1972 |
| JP | 55-66057 | 5/1980 |
| JP | 56-114451 | 9/1981 |
| JP | 58-7903 | 1/1983 |
| JP | 63-54002 | 3/1988 |
| JP | 63-65587 | 3/1988 |
| JP | 63-153691 | 6/1988 |
| JP | 63-274214 | 11/1988 |
| JP | 64-048557 | 2/1989 |
| JP | 2-39632 | 2/1990 |
| JP | 2-131629 | 5/1990 |
| JP | 2-276351 | 11/1990 |
| JP | 4-123614 | 4/1992 |
| JP | 4-127601 | 4/1992 |
| JP | 4-154227 | 5/1992 |
| JP | 5-175730 | 7/1993 |
| JP | 5-175734 | 7/1993 |
| JP | 5-327356 | 12/1993 |
| JP | 6-237276 | 8/1994 |
| JP | 6-284038 | 10/1994 |
| JP | 7-154344 | 6/1995 |
| JP | 7-307620 | 11/1995 |
| JP | 8-23359 | 1/1996 |
| JP | 8-32556 | 2/1996 |
| JP | 8-139524 | 5/1996 |
| JP | 9-36664 | 2/1997 |
| JP | 9-171399 | 6/1997 |
| JP | 10-41860 | 2/1998 |
| JP | 10-96778 | 4/1998 |
| JP | 10-173563 | 6/1998 |
| JP | 11-98205 | 4/1999 |
| WO | WO 96/02977 A1 | 2/1966 |
| WO | WO 80/01633 A1 | 8/1980 |
| WO | WO 91/18445 A1 | 11/1991 |
| WO | WO 94/05087 A1 | 3/1994 |
| WO | WO 95/01006 A1 | 1/1995 |
| WO | WO 96/08078 A1 | 3/1996 |
| WO | WO 96/39750 A1 | 12/1996 |
| WO | WO 97/08839 A2 | 3/1997 |
| WO | WO 97/08839 A3 | 3/1997 |
| WO | WO 97/38490 A1 | 10/1997 |
| WO | WO 98/00953 A1 | 1/1998 |
| WO | WO 98/24201 A1 | 6/1998 |
| WO | WO 98/40968 A2 | 9/1998 |
| WO | WO 98/40968 A3 | 9/1998 |
| WO | WO 98/53556 A2 | 11/1998 |
| WO | WO 99/23755 A1 | 5/1999 |
| WO | WO 00/31659 A1 | 6/2000 |

OTHER PUBLICATIONS

Deboo, Gordon J., *Integrated Circuits and Semiconductor Devices*, 2$^{nd}$ Edition, McGraw-Hill, Inc., pp. 41-45 (1977).

Hellwarth, G.A. and Jones, G.D, "Automatic Conditioning of Speech Signals," *IEEE Transactions on Audio and Electroacoustics*, vol. AU-16, No. 2, pp. 169-179 (Jun. 1968).

Gaudiosi, J., "Retailers will bundle Microsoft's Xbox with games and peripherals," *Video Store Magazine*, vol. 23, Issue 36, p. 8, 2 pages (Sep. 2-8, 2001).

English translation of German Patent DE 1936252, 12 pages.

English-language Abstract of Japanese Patent Publication No. JP 62-12381, data supplied by the espacenet, 1 page (Jan. 21, 1987—Date of publication of application).

English-language Abstract of Japanese Patent Publication No. JP 4-154227, data supplied by the espacenet, 1 page (May 27, 1992—Date of publication of application).

English-language Abstract of Japanese Patent Publication No. JP 6-284038, data supplied by the espacenet, 1 page (Oct. 7, 1994—Date of publication of application).

English-language Abstract of Japanese Patent Publication No. JP 10-96778, data supplied by the espacenet, 1 page (Apr. 14, 1998—Date of publication of application).

English-language Abstract of Japanese Patent Publication No. JP 11-98205, data supplied by the espacenet, 1 page (Apr. 9, 1999—Date of publication of application).

English-language Abstract of Japanese Patent Publication No. JP 61-232706, data supplied by espacenet.com, 1 page (Oct. 17, 1986—Date of publication of application).

English-language Abstract of Japanese Patent Publication No. JP 9-171399, data supplied by espacenet.com, 1 page (Jun. 30, 1997—Date of publication of application).

English-language Abstract of Japanese Patent Publication No. JP 10-41860, data supplied by espacenet.com, 1 page (Feb. 13, 1998—Date of publication of application).

English-language Computer Translation of Japanese Patent Publication No. JP 10-173563, provided by the JPO, 10 pages (Jun. 26, 1998—Date of publication of application) and cited in U.S. Patent Application Ser. No. 10/305,299, directed to related subject matter.

*What is I/Q Data?*, printed Sep. 16, 2006, from http://zone.ni.com, 8 pages (Copyright 2003).

English-language Abstract of Japanese Patent Publication No. JP 58-031622, data supplied by ep.espacenet.com, 1 page (Feb. 24, 1983—Date of publication of application).

English-language Abstract of Japanese Patent Publication No. JP 61-245749, data supplied by ep.espacenet.com, 1 page (Nov. 1, 1986—Date of publication of application).

English-language Abstract of Japanese Patent Publication No. JP 64-048557, data supplied by ep.espacenet.com, 1 page (Feb. 23, 1989—Date of publication of application).

English-language Abstract of Japanese Patent Publication No. JP 59-022438, data supplied by ep.espacenet.com, 1 page (Feb. 4, 1984—Date of publication of application).

English-language Abstract of Japanese Patent Publication No. JP 59-123318, data supplied by ep.espacenet.com, 1 page (Jul. 17, 1984—Date of publication of application).

English-language Abstract of Japanese Patent Publication No. JP 61-193521, data supplied by ep.espacenet.com, 1 page (Aug. 28, 1986—Date of publication of application).

English-language Abstract of Japanese Patent Publication No. JP 62-047214, data supplied by ep.espacenet.com, 1 page (Feb. 28, 1987—Date of publication of application).

English-language Abstract of Japanese Patent Publication No. JP 63-274214, data supplied by ep.espacenet.com, 1 page (Nov. 11, 1988—Date of publication of application).

Aghvami, H. et al., "Land Mobile Satellites Using the Highly Elliptic Orbits—The UK T-SAT Mobile Payload," *Fourth International Conference on Satellite Systems for Mobile Communications and Navigation*, IEE, pp. 147-153 (Oct. 17-19, 1988).

Akers, N.P. et al., "RF Sampling Gates: a Brief Review," *IEE Proceedings*, IEE, vol. 133, Part A, No. 1, pp. 45-49 (Jan. 1986).

Al-Ahmad, H.A.M. et al., "Doppler Frequency Correction for a Non-Geostationary Communications Satellite. Techniques for CERS and T-SAT," *Electronics Division Colloquium on Low Noise Oscillators and Synthesizers*. IEE, pp. 4/1-4/5 (Jan. 23, 1986).

Ali, I. et al., "Doppler Characterization for LEO Satellites," *IEEE Transactions on Communications*, IEEE, vol. 46, No. 3, pp. 309-313 (Mar. 1998).

Allan, D.W., "Statistics of Atomic Frequency Standards," *Proceedings Of The IEEE Special Issue on Frequency Stability*, IEEE, pp. 221-230 (Feb. 1966).

Allstot, D.J. et al., "MOS Switched Capacitor Ladder Filters," *IEEE Journal of Solid-State Circuits*, IEEE, vol. SC-13, No. 6, pp. 806-814 (Dec. 1978).

Allstot, D.J. and Black Jr. W.C., "Technological Design Considerations for Monolithic MOS Switched-Capacitor Filtering Systems," *Proceedings of the IEEE*, IEEE, vol. 71, No. 8, pp. 967-986 (Aug. 1983).

Alouini, M. et al., "Channel Characterization and Modeling for Ka-Band Very Small Aperture Terminals," *Proceedings Of the IEEE*, IEEE, vol. 85, No. 6, pp. 981-997 (Jun. 1997).

Andreyev, G.A. and Ogarev, S.A., "Phase Distortions of Keyed Millimeter-Wave Signals in the Case of Propagation in a Turbulent Atmosphere," *Telecommunications and Radio Engineering*, Scripta Technica, vol. 43, No. 12, pp. 87-90 (Dec. 1988).

Antonetti, A. et al., "Optoelectronic Sampling in the Picosecond Range," *Optics Communications*, North-Holland Publishing Company, vol. 21, No. 2, pp. 211-214 (May 1977).

Austin, J. et al., "Doppler Correction of the Telecommunication Payload Oscillators in the UK T-SAT," 18th *European Microwave Conference*, Microwave Exhibitions and Publishers Ltd., pp. 851-857 (Sep. 12-15, 1988).

Auston, D.H., "Picosecond optoelectronic switching and gating in silicon," *Applied Physics Letters*, American Institute of Physics, vol. 26, No. 3, pp. 101-103 (Feb. 1, 1975).

Baher, H., "Transfer Functions for Switched-Capacitor and Wave Digital Filters," *IEEE Transactions on Circuits and Systems*, IEEE Circuits and Systems Society, vol. CAS-33, No. 11, pp. 1138-1142 (Nov. 1986).

Baines, R., "The DSP Bottleneck," *IEEE Communications Magazine*, IEEE Communications Society, pp. 46-54 (May 1995).

Banjo, O.P. and Vilar, E., "Binary Error Probabilities on Earth-Space Links Subject to Scintillation Fading," *Electronics Letters*, IEE, vol. 21, No. 7, pp. 296-297 (Mar. 28, 1985).

Banjo, O.P. and Vilar, E., "The Dependence of Slant Path Amplitude Scintillations on Various Meteorological Parameters," *Fifth International Conference on Antennas and Propagation (ICAP 87) Part 2: Propagation*, IEE, pp. 277-280 (Mar. 30-Apr. 2, 1987).

Banjo, O.P. and Vilar, E. "Measurement and Modeling of Amplitude Scintillations on Low-Elevation Earth-Space Paths and Impact on Communication Systems," *IEEE Transactions on Communications*, IEEE Communications Society, vol. COM-34, No. 8, pp. 774-780 (Aug. 1986).

Banjo, O.P. et al., "Tropospheric Amplitude Spectra Due to Absorption and Scattering in Earth-Space Paths," *Fourth International Conference on Antennas and Propagation (ICAP 85)*, IEE, pp. 77-82 (Apr. 16-19, 1985).

Basili, P. et al., "Case Study of Intense Scintillation Events on the OTS Path," *IEEE Transactions on Antennas and Propagation*, IEEE, vol. 38, No. 1, pp. 107-113 (Jan. 1990).

Basili, P. et al., "Observation of High $C^2$ and Turbulent Path Length on OTS Space-Earth Link," *Electronics Letters*, IEE, vol. 24, No. 17, pp. 1114-1116 (Aug. 18, 1988).

Blakey, J.R. et al., "Measurement of Atmospheric Millimetre-Wave Phase Scintillations in an Absorption Region," *Electronics Letters*, IEE, vol. 21, No. 11, pp. 486-487 (May 23, 1985).

Burgueño, A. et al., "Influence of rain gauge integration time on the rain rate statistics used in microwave communications," *annales des télècommunications*, International Union of Radio Science, pp. 522-527 (Sep./Oct. 1988).

Burgueño, A. et al., "Long-Term Joint Statistical Analysis of Duration and Intensity of Rainfall Rate with Application to Microwave Communications," *Fifth International Conference on Antennas and Propagation (ICAP 87) Part 2: Propagation*, IEE, pp. 198-201 (Mar. 30-Apr. 2, 1987).

Burgueño, A. et al., "Long Term Statistics of Precipitation Rate Return Periods in the Context of Microwave Communications," *Sixth International Conference on Antennas and Propagation (ICAP 89) Part 2: Propagation*, IEE, pp. 297-301 (Apr. 4 7, 1989).

Burgueño, A. et al., "Spectral Analysis of 49 Years of Rainfall Rate and Relation to Fade Dynamics," *IEEE Transactions on Communications*, IEEE Communications Society, vol. 38, No. 9, pp. 1359-1366 (Sep. 1990).

Catalan, C. and Vilar, E., "Approach for satellite slant path remote sensing," *Electronics Letters*, IEEE, vol. 34, No. 12, pp. 1238-1240 (Jun. 11, 1998).

Chan, P. et al., "A Highly Linear 1-GHz CMOS Downconversion Mixer," *European Solid State Circuits Conference*, IEEE Communication Society, pp. 210-213 (Sep. 22-24, 1993).

Declaration of Michael J. Bultman filed in U.S. Appl. No. 09/176,022, which is directed to related subject matter, 2 pages.

Declaration of Robert W. Cook filed in U.S. Appl. No. 09/176,022, which is directed to related subject matter, 2 pages.

Declaration of Alex Holtz filed in U.S. Appl. No. 09/176,022, which is directed to related subject matter, 3 pages.

Declaration of Richard C. Looke filed in U.S. Appl. No. 09/176,022, which is directed to related subject matter, 2 pages.

Declaration of Charley D. Moses, Jr. filed in U.S. Appl. No. 09/176,022, which is directed to related subject matter, 2 pages.

Declaration of Jeffrey L. Parker and David F. Sorrells, with attachment Exhibit 1, filed in U.S. Appl. No. 09/176,022, which is directed to related subject matter, 130 pages.

Dewey, R.J. and Collier, C.J., "Multi-Mode Radio Receiver," *Electronics Division Colloquium on Digitally Implemented Radios*, IEE, pp. 3/1-3/5 (Oct. 18, 1985).

Dialog file 347 (JAPIO) English Language Patent Abstract for JP 2-276351, 1 page (Nov. 13, 1990—Date of publication of application).

Dialog File 347 (JAPIO) English Language Patent Abstract for JP 2-131629, 1 page (May 21, 1990—Date of publication of application).

Dialog File 347 (JAPIO) English Language Patent Abstract for JP 2-39632. 1 page (Feb. 8, 1990—Date of publication of application).

Dialog File 348 (European Patents) English Language Patent Abstract for EP 0 785 635 A1, 3 pages (Dec. 26, 1996—Date of publication of application).

Dialog File 348 (European Patents) English Language Patent Abstract for EP 35166 A1, 2 pages (Feb. 18, 1981—Date of publication of application).

"DSO takes sampling rate to 1 Ghz," *Electronic Engineering*, Morgan Grampian Publishers, vol. 59, No. 723, pp. 77 and 79 (Mar. 1987).

Erdi, G. and Henneuse, P.R., "A Precision FET-Less Sample-and-Hold with High Charge-to-Droop Current Ratio," IEEE *Journal of Solid-State Circuits*, IEEE, vol. SC-13, No. 6, pp. 864-873 (Dec. 1978).

Faulkner, N.D. and Vilar, E., "Subharmonic Sampling for the Measurement of Short Term Stability of Microwave Oscillators," *IEEE Transactions on Instrumentation and Measurement*, IEEE, vol IM-32, No. 1, pp. 208-213 (Mar. 1983).

Faulkner, N.D. et al., "Sub-Harmonic Sampling for the Accurate Measurement of Frequency Stability of Microwave Oscillators." *CPEM 82 Digest: Conference on Precision Electromagnetic Measurements*, IEEE, pp. M-10 and M-11 (1982).

Faulkner, N.D. and Vilar, E., "Time Domain Analysis of Frequency Stability Using Non-Zero Dead-Time Counter Techniques," *CPEM 84 Digest Conference on Precision Electromagnetic Measurements*, IEEE, pp. 81-82 (1984).

Filip, M. and Vilar, E., "Optimum Utilization of the Channel Capacity of a Satellite Link in the Presence of Amplitude Scintillations and Rain Attenuation," *IEEE Transactions on Communications*, IEEE Communications Society, vol. 38, No. 11, pp. 1958-1965 (Nov. 1990).

Fukahori, K., "A CMOS Narrow-Band Signaling Filter with Q Reduction," *IEEE Journal of Solid-State Circuits*, IEEE, vol. SC-19, No. 6, pp. 926-932 (Dec. 1984).

Fukuchi, H. and Otsu, Y., "Available time statistics of rain attenuation on earth-space path." *IEE Proceedings-H: Microwaves, Antennas and Propagation*, IEE, vol. 135, Pt. H, No. 6, pp. 387-390 (Dec. 1988).

Gibbins, C.J. and Chadha, R., "Millimetre-wave propagation through hydrocarbon flame," *IEE Proceedings*, IEE, vol. 134, Pt. H, No. 2, pp. 169-173 (Apr. 1987).

Gilchrist, B. et al., "Sampling hikes performance of frequency synthesizers," *Microwaves & RF*, Hayden Publishing, vol. 23, No. 1, pp. 93-94 and 110 (Jan. 1984).

Gossard, E.E., "Clear weather meteorological effects on propagation at frequencies above 1 Ghz," *Radio Science*, American Geophysical Union, vol. 16, No. 5, pp. 589-608 (Sep.-Oct. 1981).

Gregorian, R. et al., "Switched-Capacitor Circuit Design," *Proceedings of the IEEE*, IEEE, vol. 71, No. 8, pp. 941-966 (Aug. 1983).

Groshong et al., "Undersampling Techniques Simplify Digital Radio," *Electronic Design*, Penton Publishing, pp. 67-68, 70, 73-75 and 78 (May 23, 1991).

Grove, W.M., "Sampling for Oscilloscopes and Other RF Systems: Dc through X-Band," *IEEE Transactions on Microwave Theory and Techniques*, IEEE, pp. 629-635 (Dec. 1966).

Haddon, J. et al., "Measurement of Microwave Scintillations on a Satellite Down-Link at X-Band," *Antennas and Propagation*, IEE, pp. 113-117 (1981).

Haddon, J. and Vilar, E., "Scattering Induced Microwave Scintillations from Clear Air and Rain on Earth Space Paths and the Influence of Antenna Apertue," *IEEE Transactions on Antennas and Propagation*, IEEE, vol. AP-34, No. 5, pp. 646-657 (May 1986).

Hafdallah, H. et al., "2-4 Ghz MESFET Sampler," *Electronics Letters*, IEE, vol. 24, No. 3, pp. 151-153 (Feb. 4, 1988).

Herben, M.H.A.J., "Amplitude and Phase Scintillation Measurements on 8-2 km Line-Of-Sight Path at 30 Ghz," *Electronics Letters*, IEE, vol. 18, No. 7, pp. 287-289 (Apr. 1, 1982).

Hewitt, A. et al., "An 18 Ghz Wideband LOS Multipath Experiment," *International Conference on Measurements for Telecommunication Transmission Systems—MTTS 85*, IEE, pp. 112-116 (Nov. 27-28, 1985).

Hewitt, A. et al., "An Autoregressive Approach to the Identification of Multipath Ray Parameters from Field Measurements," *IEEE Transactions on Communications*, IEEE Communications Society, vol. 37, No. 11, pp. 1136-1143 (Nov. 1989).

Hewitt, A. and Vilar, E., "Selective fading on LOS Microwave Links: Classical and Spread-Spectrum Measurement Techniques," *IEEE Transactions on Communications*, IEEE Communications Society, vol. 36, No. 7, pp. 789-796 (Jul. 1988).

Hospitalier, E., "Instruments for Recording and Observing Rapidly Varying Phenomena," *Science Abstracts*, IEE, vol. VII, pp. 22-23 (1904).

Howard, I.M. and Swansson, N.S., "Demodulating High Frequency Resonance Signals for Bearing Fault Detection," *The Institution of Engineers Australia Vibration and Noise Conference*, Institution of Engineers, Australia, pp. 115-121 (Sep. 18-20, 1990).

Hu. X., *A Switched-Current Sample-and-Hold Amplifier for FM Demodulation*, Thesis for Master of Applied Science, Dept. of Electrical and Computer Engineering, University of Toronto, UMI Dissertation Services, pp. 1-64 (1995).

Hung, H-L. A. et al., "Characterization of Microwave Integrated Circuits Using An Optical Phase-Locking and Sampling System," *IEEE MTT-S Digest*, IEEE, pp. 507-510 (1997).

Hurst, P.J., "Shifting the Frequency Response of Switched-Capacitor Filters by Nonuniform Sampling," *IEEE Transactions on Circuits and Systems*, IEEE Circuits and Systems Society, vol. 38, No. 1, pp. 12-19 (Jan. 1991).

Itakura, T., "Effects of the sampling pulse width on the frequency characteristics of a sample and hold circuit," *IEE Proceedings Circuits, Devices and Systems*, IEE, vol. 141, No. 4, pp. 328-336 (Aug. 1994).

Janssen, J.M.L., "An Experimental 'Stroboscopic' Oscilloscope for Frequencies up to about 50 Mc/s: I. Fundamentals," *Philips Technical Review*, Philips Research Laboratories, vol. 12, No. 2, pp. 52-59 (Aug. 1950).

Janssen, J.M.L. and Michels, A.J., "An Experimental 'Stroboscopic' Oscilloscope for Frequencies up to about 50 Mc/s: II. Electrical Build-Up," *Philips Technical Review*, Philips Research Laboratories, vol. 12, No. 3, pp. 73-82 (Sep. 1950).

Jondral, V.F. et al., "Doppler Profiles for Communication Satellites," *Frequenz*, Herausberger, pp. 111-116 (May-Jun. 1996).

Kaleh, G.K., "A Frequency Diversity Spread Spectrum System for Communication in the Presence of In-band Interference," *1995 IEEE Globecom*, IEEE Communications Society, pp. 66-70 (1995).

Karasawa, Y. et al., "A New Prediction Method for Tropospheric Scintillation on Earth-Space Paths," *IEEE Transactions on Antennas and Propagation*, IEEE Antennas and Propagation Society, vol. 36, No. 11, pp. 1608-1614 (Nov. 1988).

Kirsten, J. and Fleming, J., "Undersampling reduces data-acquisition costs for select applications," *EDN*, Cahners Publishing, vol. 35, No. 13, pp. 217-222, 224, 226-228 (Jun. 21, 1990).

Lam, W.K. et al., "Measurement of the Phase Noise Characteristics of an Unlocked Communications Channel Identifier," *Proceedings Of the 1993 IEEE International Frequency Control Symposium*, IEEE, pp. 283-288 (Jun. 2-4, 1993).

Lam, W.K. et al., "Wideband sounding of 11.6 Ghz transhorizon channel," *Electronics Letters*, IEE, vol. 30, No. 9, pp. 738-739 (Apr. 28, 1994).

Larkin, K.G., "Efficient demodulator for bandpass sampled AM signals," *Electronics Letters*, IEE, vol. 32, No. 2, pp. 101-102 (Jan. 18, 1996).

Lau, W.H. et al., "Analysis of the Time Variant Structure of Microwave Line-of-sight Multipath Phenomena," *IEEE Global Telecommunications Conference & Exhibition*, IEEE, pp. 1707-1711 (Nov. 28-Dec. 1, 1988).

Lau, W.H. et al., "Improved Prony Algorithm to Identify Multipath Components," *Electronics Letters*, IEE, vol. 23, No. 20, pp. 1059-1060 (Sep. 24, 1987).

Lesage, P. and Audoin, C., "Effect of Dead-Time on the Estimation of the Two-Sample Variance," *IEEE Transactions on Instrumentation and Measurement*, IEEE Instrumentation and Measurement Society, vol. IM-28, No. 1, pp. 6-10 (Mar. 1979).

Liechti, C.A., "Performance of Dual-gate GaAs MESFET's as Gain-Controlled Low-Noise Amplifiers and High-Speed Modulators," *IEEE Transactions on Microwave Theory and Techniques*, IEEE Microwave Theory and Techniques Society, vol. MTT-23, No. 6, pp. 461-469 (Jun. 1975).

Linnenbrink, T.E. et al., "A One Gigasample Per Second Transient Recorder," *IEEE Transactions on Nuclear Science*, IEEE Nuclear and Plasma Sciences Society, vol. NS-26, No. 4, pp. 4443-4449 (Aug. 1979).

Liou, M.L., "A Tutorial on Computer-Aided Analysis of Switched-Capacitor Circuits," *Proceedings of the IEEE*, IEEE, vol. 71, No. 8, pp. 987-1005 (Aug. 1983).

Lo, P. et al., "Coherent Automatic Gain Control," *IEE Colloquium on Phase Locked Techniques*, IEE, pp. 2/1-2/6 (Mar. 26, 1980).

Lo, P. et al., "Computation of Rain Induced Scintillations on Satellite Down-Links at Microwave Frequencies," *Third International Conference on Antennas and Propagation (ICAP 83)*, pp. 127-131 (Apr. 12-15, 1983).

Lo, P.S.L.O. et al., "Observations of Amplitude Scintillations on a Low-Elevation Earth-Space Path," *Electronics Letters*, IEE, vol. 20, No. 7, pp. 307-308 (Mar. 29, 1984).

Madani, K. and Aithison, C.S., "A 20 Ghz Microwave Sampler," *IEEE Transactions on Microwave Theory and Techniques*, IEEE Microwave Theory and Techniques Society, vol. 40, No. 10, pp. 1960-1963 (Oct. 1992).

Marsland, R.A. et al., "130 Ghz GaAs monolithic integrated circuit sampling head," *Appl. Phys. Lett.*, American Institute of Physics, vol. 55, No. 6, pp. 592-594 (Aug. 7, 1989).

Martin, K. and Sedra, A.S., "Switched-Capacitor Building Blocks for Adaptive Systems," *IEEE Transactions on Circuits and Systems*, IEEE Circuits and Systems Society, vol. CAS-28, No. 6, pp. 576-584 (Jun. 1981).

Marzano, F.S. and d'Auria, G., "Model-based Prediction of Amplitude Scintillation variance due to Clear-Air Tropospheric Turbulence on Earth-Satellite Microwave Links," *IEEE Transactions on Antennas and Propagation*, IEEE Antennas and Propagation Society, vol. 46, No. 10, pp. 1506-1518 (Oct. 1998).

Matricciani, E., "Prediction of fade durations due to rain in satellite communication systems," *Radio Science*, American Geophysical Union, vol. 32, No. 3, pp. 935-941 (May-Jun. 1997).

McQueen, J.G., "The Monitoring of High-Speed Waveforms," *Electronic Engineering*, Morgan Brothers Limited, vol. XXIV, No. 296, pp. 436-441 (Oct. 1952).

Merkelo, J. and Hall, R.D., "Broad-Band Thin-Film Signal Sampler," *IEEE Journal of Solid-State Circuits*, IEEE, vol. SC-7, No. 1, pp. 50-54 (Feb. 1972).

Merlo, U. et al., "Amplitude Scintillation Cycles in a Sirio Satellite-Earth Link," *Electronics Letters*, IEE, vol. 21, No. 23, pp. 1094-1096 (Nov. 7, 1985).

Morris, D., "Radio-holographic reflector measurement of the 30-m millimeter radio telescope at 22 Ghz with a cosmic signal source," *Astronomy and Astrophysics*, Springer-Verlag, vol. 203, No. 2, pp. 399-406 (Sep. 11, 1988).

Moulsley, T.J. et al., "The efficient acquisition and processing of propagation statistics," *Journal of the Institution of Electronic and Radio Engineers*, IERE, vol. 55, No. 3, pp. 97-103 (Mar. 1985).

Ndzi, D. et al., "Wide-Band Statistical Characterization of an Over-the-Sea Experimental Transhorizon Link," *IEE Colloquium on Radio Communications at Microwave and Millimetre Wave Frequencies*, IEE, pp. 1/1-1/6 (Dec. 16, 1996).

Ndzi, D. et al., "Wideband Statistics of Signal Levels and Doppler Spread on an Over-The-Sea Transhorizon Link," *IEE Colloquium on Propagation Characteristics and Related System Techniques for Beyond Line-of-Sight Radio*, IEE, pp. 9/1-9/6 (Nov. 24, 1997).

"New zero IF chipset from Philips," *Electronic Engineering*, United News & Media, vol. 67, No. 825, p. 10 (Sep. 1995).

Ohara, H. et al., "First monolithic PCM filter cuts cost of telecomm systems," *Electronic Design*, Hayden Publishing Company, vol. 27, No. 8, pp. 130-135 (Apr. 12, 1979).

Oppenheim, A.V. et al., *Signals and Systems*, Prentice-Hall, pp. 527-531 and 561-562 (1983).

Ortgies, G., "Experimental Parameters Affecting Amplitude Scintillation Measurements on Satellite Links." *Electronics Letters*, IEE, vol. 21, No. 17, pp. 771-772 (Aug. 15, 1985).

Pärssinen et al., "A 2-GHz Subharmonic Sampler for Signal Downconversion," *IEEE Transactions on Microwave Theory and Techniques*, IEEE, vol. 45, No. 12, 7 pages (Dec. 1997).

Peeters, G. et al., "Evaluation of Statistical Models for Clear-Air Scintillation Prediction Using Olympus Satellite Measurements." *International Journal of Satellite Communications*, John Wiley and Sons, vol. 15, No. 2, pp. 73-88 (Mar.-Apr. 1997).

Perrey, A.G. and Schoenwetter, H.K., *NBS Technical Note 1121: A Schottky Diode Bridge Sampling Gate*, U.S. Dept. of Commerce, pp. 1-14 (May 1980).

Poulton, K. et al., "A 1-Ghz 6-bit ADC System," *IEEE Journal of Solid-State Circuits*, IEEE, vol. SC-22, No. 6, pp. 962-969 (Dec. 1987).

Press Release, "Parkervision, Inc. Announces Fiscal 1993 Results," Lippert/Heilshorn and Associates, 2 Pages (Apr. 6, 1994).

Press Release, "Parkervision, Inc. Announces the Appointment of Michael Baker to the New Position of National Sales Manager," Lippert/Heilshorn and Associates, 1 Page (Apr. 7, 1994).

Press Release, "Parkervision's Cameraman Well-Received By Distance Learning Market," Lippert/Heilshorn and Associates, 2 Pages (Apr. 8, 1994).

Press Release, "Parkervision, Inc. Announces First Quarter Financial Results," Lippert/Heilshorn and Associates, 2 Pages (Apr. 26, 1994).

Press Release, "Parkervision, Inc. Announces The Retirement of William H. Fletcher, Chief Financial Officer," Lippert/Heilshorn and Associates, 1 Page (May 11, 1994).

Press Release, "Parkervision, Inc. Announces New Cameraman System II™ At Infocomm Trade Show." Lippert/Heilshorn and Associates, 3 Pages (Jun. 9, 1994).

Press Release, "Parkervision, Inc. Announces Appointments to its National Sales Force," Lippert/Heilshorn and Associates, 2 Pages (Jun. 17, 1994).

Press Release, "Parkervision, Inc. Announces Second Quarter and Six Months Financial Results," Lippert/Heishorn and Associates, 3 Pages (Aug. 9, 1994).

Press Release, "Parkervision, Inc. Announces Third Quarter and Nine Months Financial Results," Lippert/Heilshorn and Associates, 3 Pages (Oct. 28, 1994).

Press Release, "Parkervision, Inc. Announces First Significant Dealer Sale of Its Cameraman® System II," Lippert/Heilshorn and Associates, 2 Pages (Nov. 7, 1994).

Press Release, "Parkervision, Inc. Announces Fourth Quarter and Year End Results," Lippert/Heilshorn and Associates, 2 Pages (Mar. 1, 1995).

Press Release, "Parkervision, Inc. Announces Joint Product Developments With VTEL," Lippert/Heilshorn and Associates, 2 Pages (Mar. 21, 1995).

Press Release, "Parkervision, Inc. Announces First Quarter Financial Results," Lippert/Heilshorn and Associates, 3 Pages (Apr. 28, 1995).
Press Release, "Parkervision Wins Top 100 Product Districts' Choice Award," Parkervision Marketing and Manufacturing Headquarters, 1 Page (Jun. 29, 1995).
Press Release, "Parkervision National Sales Manager Next President of USDLA," Parkervision Marketing and Manufacturing Headquarters, 1 Page (Jul. 6, 1995).
Press Release, "Parkervision Granted New Patent," Parkervision Marketing and Manufacturing Headquarters, 1 Page (Jul. 21, 1995).
Press Release, "Parkervision, Inc. Announces Second Quarter and Six Months Financial Results," Parkervision Marketing and Manufacturing Headquarters, 2 Pages (Jul. 31, 1995).
Press Release, "Parkervision, Inc. Expands Its Cameraman System II Product Line," Parkervision Marketing and Manufacturing Headquarters, 2 Pages (Sep. 22, 1995).
Press Release, "Parkervision Announces New Camera Control Technology," Parkervision Marketing and Manufacturing Headquarters, 2 Pages (Oct. 25, 1995).
Press Release, "Parkervision, Inc. Announces Completion of VTEL/ Parkervision Joint Product Line." Parkervision Marketing and Manufacturing Headquarters, 2 Pages (Oct. 30, 1995).
Press Release, "Parkervision, Inc. Announces Third Quarter and Nine Months Financial Results," Parkervision Marketing and Manufacturing Headquarters, 2 Pages (Oct. 30, 1995).
Press Release, "Parkervision's Cameraman Personal Locator Camera System Wins Telecon XV Award," Parkervision Marketing and Manufacturing Headquarters, 2 Pages (Nov. 1, 1995).
Press Release, "Parkervision, Inc. Announces Purchase Commitment From VTEL Corporation," Parkervision Marketing and Manufacturing Headquarters, 1 Page (Feb. 26, 1996).
Press Release, "ParkerVision, Inc. Announces Fourth Quarter and Year End Results," Parkervision Marketing and Manufacturing Headquarters, 2 Pages (Feb. 27, 1996).
Press Release, "ParkerVision, Inc. Expands its Product Line," Parkervision Marketing and Manufacturing Headquarters, 2 Pages (Mar. 7, 1996).
Press Release, "ParkerVision Files Patents for its Research of Wireless Technology," Parkervision Marketing and Manufacturing Headquarters, 1 Page (Mar. 28, 1996).
Press Release, "Parkervision, Inc. Announces First Significant Sale of Its Cameraman® Three-Chip System," Parkervision Marketing and Manufacturing Headquarters, 2 pages (Apr. 12, 1996).
Press Release, "Parkervision, Inc. Introduces New Product Line For Studio Production Market," Parkervision Marketing and Manufacturing Headquarters, 2 Pages (Apr. 15, 1996).
Press Release, "Parkervision, Inc. Announces Private Placement of 800,000 Shares," Parkervision Marketing and Manufacturing Headquarters, 1 Page (Apr. 15, 1996).
Press Release, "Parkervision, Inc. Announces First Quarter Financial Results," Parkervision Marketing and Manufacturing Headquarters, 3 Pages (Apr. 30, 1996).
Press Release, "ParkerVision's New Studio Product Wins Award," Parkervision Marketing and Manufacturing Headquarters, 2 Pages (Jun. 5, 1996).
Press Release, "Parkervision, Inc. Announces Second Quarter and Six Months Financial Results," Parkervision Marketing and Manufacturing Headquarters, 3 Pages (Aug. 1, 1996).
Press Release, "Parkervision, Inc. Announces Third Quarter and Nine Months Financial Results," Parkervision Marketing and Manufacturing Headquarters, 2 Pages (Oct. 29, 1996).
Press Release, "PictureTel and ParkerVision Sign Reseller Agreement," Parkervision Marketing and Manufacturing Headquarters, 2 Pages (Oct. 30, 1995).
Press Release, "CLI and ParkerVision Bring Enhanced Ease-of-Use to Videoconferencing," CLI/Parkervision, 2 Pages (Jan. 20, 1997).
Press Release, "Parkervision, Inc. Announces Fourth Quarter and Year End Results," Parkervision Marketing and Manufacturing Headquarters, 3 Pages (Feb. 27, 1997).
Press Release, "Parkervision, Inc. Announces First Quarter Financial Results," Parkervision Marketing and Manufacturing Headquarters, 3 Pages (Apr. 29, 1997).
Press Release, "NEC and Parkervision Make Distance Learning Closer," NEC America, 2 Pages (Jun. 18, 1997).
Press Release, "Parkervision Supplies JPL with Robotic Cameras, Cameraman Shot Director for Mars Mission," Parkervision Marketing and Manufacturing Headquarters, 2 pages (Jul. 8, 1997).
Press Release, "ParkerVision and IBM Join Forces to Create Wireless Computer Peripherals," Parkervision Marketing and Manufacturing Headquarters, 2 Pages (Jul. 23, 1997).
Press Release, "ParkerVision, Inc. Announces Second Quarter and Six Months Financial Results," Parkervision Marketing and Manufacturing Headquarters, 3 Pages (Jul. 31, 1997).
Press Release, "Parkervision, Inc. Announces Private Placement of 990,000 Shares," Parkervision Marketing and Manufacturing Headquarters, 2 Pages (Sep. 8, 1997).
Press Release, "Wal-Mart Chooses Parkervision for Broadcast Production," Parkervision Marketing and Manufacturing Headquarters, 2 Pages (Oct. 24, 1997).
Press Release, "Parkervision, Inc. Announces Third Quarter Financial Results," Parkervision Marketing and Manufacturing Headquarters, 3 Pages (Oct. 30, 1997).
Press Release, "ParkerVision Announces Breakthrough in Wireless Radio Frequency Technology," Parkervision Marketing and Manufacturing Headquarters, 3 Pages (Dec. 10, 1997).
Press Release, "Parkervision, Inc. Announces the Appointment of Joseph F. Skovron to the Position of Vice President, Licensing—Wireless Technologies," Parkervision Marketing and Manufacturing Headquarters, 2 Pages (Jan. 9, 1998).
Press Release, "Parkervision Announces Existing Agreement with IBM Terminates—Company Continues with Strategic Focus Announced in December," Parkervision Marketing and Manufacturing Headquarters, 2 Pages (Jan. 27, 1998).
Press Release, "Laboratory Tests Verify Parkervision Wireless Technology," Parkervision Marketing and Manufacturing Headquarters, 2 Pages (Mar. 3, 1998).
Press Release, "Parkervision, Inc. Announces Fourth Quarter and Year End Financial Results," Parkervision Marketing and Manufacturing Headquarters, 3 Pages (Mar. 5, 1998).
Press Release, "Parkervision Awarded Editors' Pick of Show for NAB 98," Parkervision Marketing and Manufacturing Headquarters, 2 Pages (Apr. 15, 1998).
Press Release, "Parkervision Announces First Quarter Financial Results," Parkervision Marketing and Manufacturing Headquarters, 3 Pages (May 4, 1996).
Press Release, "Parkervision 'Direct2Data' Introduced in Response to Market Demand," Parkervision Marketing and Manufacturing Headquarters, 3 Pages (Jul. 9, 1998).
Press Release, "Parkervision Expands Senior Management Team," Parkervision Marketing and Manufacturing Headquarters, 2 Pages (Jul. 29, 1998).
Press Release, "Parkervision Announces Second Quarter and Six Month Financial Results," Parkervision Marketing and Manufacturing Headquarters, 4 Pages (Jul. 30, 1998).
Press Release, "Parkervision Announces Third Quarter and Nine Month Financial Results," Parkervision Marketing and Manufacturing Headquarters, 3 Pages (Oct. 30, 1998).
Press Release, "Questar Infocomm, Inc. Invests $5 Million in Parkervision Common Stock," Parkervision Marketing and Manufacturing Headquarters, 3 Pages (Dec. 2, 1998).
Press Release, "Parkervision Adds Two New Directors," Parkervision Marketing and Manufacturing Headquarters, 2 Pages (Mar. 5, 1999).
Press Release, "Parkervision Announces Fourth Quarter and Year End Financial Results," Parkervision Marketing and Manufacturing Headquarters, 3 Pages (Mar. 5, 1999).
Press Release, "Joint Marketing Agreement Offers New Automated Production Solution," Parkervision Marketing and Manufacturing Headquarters, 2 Pages (Apr. 13, 1999).
"Project COST 205: Scintillations in Earth-satellite links," *Alta Frequenza: Scientific Review in Electronics*, AEI, vol. LIV, No. 3, pp. 209-211 (May-Jun. 1985).
Razavi, B., *RF Microelectronics*, Prentice-Hall, pp. 147-149 (1998).

Reeves, R.J.D., "The Recording and Collocation of Waveforms (Part 1)," *Electronic Engineering*, Morgan Brothers Limited, vol. 31, No. 373, pp. 130-137 (Mar. 1959).

Reeves, R.J.D., "The Recording and Collocation of Waveforms (Part 2)," *Electronic Engineering*, Morgan Brothers Limited, vol. 31, No. 374, pp. 204-212 (Apr. 1959).

Rein, H.M. and Zahn, M., "Subnanosecond-Pulse Generator with Variable Pulsewidth Using Avalanche Transistors," *Electronics Letters*, IEE, vol. 11, No. 1, pp. 21-23 (Jan. 9, 1975).

Riad, S.M. and Nahman, N.S., "Modeling of the Feed-through Wideband (DC to 12.4 Ghz) Sampling-Head," *IFFF MTT-S International Microwave Symposium Digest*, IEEE, pp. 267-269 (Jun. 27-29, 1978).

Rizzoli, V. et al., "Computer-Aided Noise Analysis of MESFET and HEMT Mixers," *IEEE Transactions on Microwave Theory and Techniques*, IEEE, vol. 37, No. 9, pp. 1401-1410 (Sep. 1989).

Rowe, H.E., *Signals and Noise in Communication Systems*, D. Van Nostrand Company, Inc., Princeton, New Jersey, including, for example, Chapter V, Pulse Modulation Systems (1965).

Rücker, F. and Dintelmann, F., "Effect of Antenna Size on OTS Signal Scintillations and Their Seasonal Dependence," *Electronics Letters*, IEE, vol. 19, No. 24, pp. 1032-1034 (Nov. 24, 1983).

Russell, R. and Hoare, L., "Millimeter Wave Phase Locked Oscillators," *Military Microwaves '78 Conference Proceedings*, Microwave Exhibitions and Publishers, pp. 238-242 (Oct. 25-27, 1978).

Sabel, L.P., "A DSP Implementation of a Robust Flexible Receiver/ Demultiplexer for Broadcast Data Satellite Communications," *The Institution of Engineers Australia Communications Conference*, Institution of Engineers, Australia, pp. 218-223 (Oct. 16-18, 1990).

Salous, S., "IF digital generation of FMCW waveforms for wideband channel characterization," *IEE Proceedings-I*, IEE, vol. 139, No. 3, pp. 281-288 (Jun. 1992).

"Sampling Loops Lock Sources to 23 Ghz," *Microwaves & RF*, Penton Publishing, p. 212 (Sep. 1990).

Sasikumar, M. et al., "Active Compensation in the Switched-Capacitor Biquad," *Proceedings of the IEEE*, IEEE, vol. 71, No. 8, pp. 1008-1009 (Aug. 1983).

Saul, P.H.. "A GaAs MESFET Sample and Hold Switch," *Fifth European Solid State Circuits Conference-ESSCIRC 79*, IEE, pp. 5-7 (1979).

Shen, D.H. et al., "A 900-MHZ RF Front-End with Integrated Discrete-Time Filtering," *IEEE Journal of Solid-State Circuits*, IEEE Solid-State Circuits Council, vol. 31, No. 12, pp. 1945-1954 (Dec. 1996).

Shen, X.D. and Vilar, E., "Anomalous transhorizon propagation and meteorological processes of a multilink path," *Radio Science*, American Geophysical Union, vol. 30, No. 5, pp. 1467-1479 (Sep.-Oct. 1995).

Shen, X. and Tawfik, A.N., "Dynamic Behaviour of Radio Channels Due to Trans-Horizon Propagation Mechanisms," *Electronics Letters*, IEE, vol. 29, No. 17, pp. 1582-1583 (Aug. 19, 1993).

Shen, X. et al., "Modeling Enhanced Spherical Diffraction and Troposcattering on a Transhorizon Path with aid of the parabolic Equation and Ray Tracing Methods," *IEE Colloquium on Common modeling techniques for electromagnetic wave and acoustic wave propagation*, IEE, pp. 4/1-4/7 (Mar. 8, 1996).

Shen, X. and Vilar, E., "Path loss statistics and mechanisms of transhorizon propagation over a sea path," *Electronics Letters*, IEE, vol. 32, No. 3, pp. 259-261 (Feb. 1, 1996).

Shen, D. et al., "A 900 MHZ Integrated Discrete Time Filtering RF Front-End," *IEEE International Solid State Circuits Conference*, IEEE, vol. 39, pp. 54-55 and 417 (Feb. 1996).

Spillard, C. et al., "X-Band Tropospheric Transhorizon Propagation Under Differing Meteorological Conditions," *Sixth International Conference on Antennas and Propagation (ICAP 89) Part 2: Propagation*, IEE, pp. 451-455 (Apr. 4-7, 1989).

Stafford, K.R. et al., "A Complete Monolithic Sample/Hold Amplifier," *IEEE Journal of Solid-State Circuits*, IEEE, vol. SC-9, No. 6, pp. 381-387 (Dec. 1974).

Staruk, W. Jr. et al., "Pushing HF Data Rates," *Defense Electronics*, EW Communications, vol. 17, No. 5, pp. 211, 213, 215, 217, 220 and 222 (May 1985).

Stephenson, A.G., "Digitizing multiple RF signals requires an optimum sampling rate," *Electronics*, McGraw-Hill, pp. 106-110 (Mar. 27, 1972).

Sugarman, R., "Sampling Oscilloscope for Statistically Varying Pulses," *The Review of Scientific Instruments*, American Institute of Physics, vol. 28, No. 11, pp. 933-938 (Nov. 1957).

Sylvain, M., "Experimental probing of multipath microwave channels," *Radio Science*, American Geophysical Union, vol. 24, No. 2, pp. 160-178 (Mar.-Apr. 1989).

Takano, T., "Novel GaAs Pet Phase Detector Operable To Ka Band," *IEEE MT-S Digest*, IEEE, pp. 381-383 (1984).

Tan, M.A., "Biquadratic Transconductance Switched-Capacitor Filters," *IEEE Transactions on Circuits and Systems- I: Fundamental Theory and Applications*, IEEE Circuits and Systems Society, vol. 40, No. 4, pp. 272-275 (Apr. 1993).

Tanaka, K. et al., "Single Chip Multisystem AM Stereo Decoder IC," *IEEE Transactions on Consumer Electronics*, IEEE Consumer Electronics Society, vol. CE-32, No. 3, pp. 482-496 (Aug. 1986).

Tawfik, A.N., "Amplitude, Duration and Predictability of Long Hop Trans-Horizon X-band Signals Over the Sea," *Electronics Letters*, IEE, vol. 28, No. 6, pp. 571-572 (Mar. 12, 1992).

Tawfik, A.N. and Vilar, E., "Correlation of Transhorizon Signal Level Strength with Localized Surface Meteorological Parameters." *Eighth International Conference on Antennas and Propagation*, Electronics Division of the IEE, pp. 335-339 (Mar. 30-Apr. 2, 1993).

Tawfik, A.N. and Vilar, E., "Dynamic Structure of a Transhorizon Signal at X-band Over a Sea Path," *Sixth International Conference on Antennas and Propagation (ICAP 89) Part 2: Propagation*, IEE, pp. 446-450 (Apr. 4-7, 1989).

Tawfik, A.N. and Vilar, E., "Statistics of Duration and Intensity of Path Loss in a Microwave Transhorizon Sea-Path," *Electronics Letters*, IEE, vol. 26, No. 7, pp. 474-476 (Mar. 29, 1990).

Tawfik, A.N. and Vilar, E., "X-Band Transhorizon Measurements of CW Transmissions Over the Sea—Part 1: Path Loss, Duration of Events, and Their Modeling," *IEEE Transactions on Antennas and Propagation*, IEEE Antennas and Propagation Society, vol. 41, No. 11, pp. 1491-1500 (Nov. 1993).

Temes, G.C. and Tsividis, T., "The Special Section on Switched-Capacitor Circuits," *Proceedings of the IEEE*, IEEE, vol. 71, No. 8, pp. 915-916 (Aug. 1983).

Thomas, G.B., *Calculus and Analytic Geometry*, Third Edition, Addison-Wesley Publishing, pp. 119-133 (1960).

Tomassetti, Q., "An Unusual Microwave Mixer," 16th *European Microwave Conference*, Microwave Exhibitons and Publishers, pp. 754-759 (Sep. 8-12, 1986).

Tortoli, P. et al., "Bidirectional Doppler Signal Analysis Based on a Single RF Sampling Channel," *IEEE Transactions on Ultrasonics, Ferroelectrics, and Frequency Control*, IEEE Ultrasonics, Ferroelectrics, and Frequency Control Society, vol. 41, No. 1, pp. 1-3 (Jan. 1984).

Tsividis, Y. and Antognetti, P. (Ed.), *Design of MOS VLSI Circuits for Telecommunications*, Prentice-Hall, p. 304 (1985).

Tsividis, Y., "Principles of Operation and Analysis of Switched-Capacitor Circuits," *Proceedings of the IEEE*, IEEE, vol. 71, No. 8, pp. 926-940 (Aug. 1983).

Tsurumi, H. and Maeda, T., "Design Study on a Direct Conversion Receiver Front-End for 280 MHZ, 900 MHZ, and 2.6 Ghz Band Radio Communication Systems," 41st *IEEE Vehicular Technology Conference*, IEEE Vehicular Technology Society, pp. 457-462 (May 19-22, 1991).

Valdmanis, J.A. et al., "Picosecond and Subpicosend Optoelectronics for Measurements of Future High Speed Electronic Devices," *IEDM Technical Digest*, IEEE, pp. 597-600 (Dec. 5-7, 1983).

van de Kamp, M.M.J.L., "Asymmetric signal level distribution due to tropospheric scintillation," *Electronics Letters*, IEE, vol. 34, No. 11, pp. 1145-1146 (May 28, 1998).

Vasseur, H. and Vanhoenacker, D., "Characterization of tropospheric turbulent layers from radiosonde data," *Electronics Letters*, IEE, vol. 34, No. 4, pp. 318-319 (Feb. 19, 1998).

Verdone, R., "Outage Probability Analysis for Short-Range Communication Systems at 60 Ghz in ATT Urban Environments," *IEEE Transactions on Vehicular Technology*, IEEE Vehicular Technology Society, vol. 46, No. 4, pp. 1027-1039 (Nov. 1997).

Vierira-Ribeiro, S.A., *Single-IF DECT Receiver Architecture using a Quadrature Sub-Sampling Band-Pass Sigma-Delta Modulator*, Thesis for Degree of Master's of Engineering, Carleton University, UMI Dissertation Services, pp. 1-180 (Apr. 1995).

Vilar, E. et al., "A Comprehensive/Selective MM-Wave Satellite Downlink Experiment on Fade Dynamics," *Tenth International Conference on Antennas and Propagation*, Electronics Division of the IEE, pp. 2.98-2.101 (Apr. 14-17, 1997).

Vilar, E. et al., "A System to Measure LOS Atmospheric Transmittance at 19 Ghz," *AGARD Conference Proceedings No. 346: Characteristics of the Lower Atmosphere Influencing Radio Wave Propagation*, AGARD, pp. 8-1-8-16 (Oct. 4-7, 1983).

Vilar, E. and Smith, H., "A Theoretical and Experimental Study of Angular Scintillations in Earth Space Paths," *IEEE Transactions on Antennas and Propagation*, IEEE, vol. AP-34, No. 1, pp. 2-10 (Jan. 1986).

Vilar, E. et al., "A Wide Band Transhorizon Experiment at 11.6 Ghz," *Eighth International Conference on Antennas and Propagation*, Electronics Division of the IEE, pp. 441-445 (Mar. 30-Apr. 2, 1993).

Vilar, E. and Matthews, P.A., "Amplitude Dependence of Frequency in Oscillators," *Electronics Letters*, IEE, vol. 8, No. 20, pp. 509-511 (Oct. 5, 1972).

Vilar, F. et al., "An experimental mm-wave receiver system for measuring phase noise due to atmospheric turbulence," *Proceedings of the 25th European Microwave Conference*, Nexus House, pp. 114-119 (1995).

Vilar, E. and Burgueño, A., "Analysis and Modeling of Time Intervals Between Rain Rate Exceedances in the Context of Fade Dynamics," *IEEE Transactions on Communications*, IEEE Communications Society, vol. 39, No. 9, pp. 1306-1312 (Sep. 1991).

Vilar, E. et al., "Angle of Arrival Fluctuations in High and Low Elevation Earth Space Paths," *Fourth International Conference on Antennas and Propagation (ICAP 85)*, Electronics Division of the IEE, pp. 83-88 (Apr. 16-19, 1985).

Vilar, E., "Antennas and Propagation: A Telecommunications Systems Subject," *Electronics Division Colloquium on Teaching Antennas and Propagation to Undergraduates*, IEE, pp. 7/1-7/6 (Mar. 8, 1988).

Vilar, E. et al., "CERS*. Millimetre-Wave Beacon Package and Related Payload Doppler Correction Strategies," *Electronics Division Colloquium on CERS—Communications Engineering Research Satellite*, IEE, pp. 10/1-10/10 (Apr. 10, 1984).

Vilar, E. and Moulsley, T.J., "Comment and Reply. Probability Density Function of Amplitude Scintillations," *Electronics Letters*, IEE, vol. 21, No. 14, pp. 620-622 (Jul. 4, 1985).

Vilar, E. et al., "Comparison of Rainfall Rate Duration Distributions for ILE-IFE and Barcelona," *Electronics Letters*, IEE, vol. 28, No. 20, pp. 1922-1924 (Sep. 24, 1992).

Vilar, E., "Depolarization and Field Transmittances in Indoor Communications," *Electronics Letters*, IEE, vol. 27, No. 9, pp. 732-733 (Apr. 25, 1991).

Vilar, E. and Larsen, J.R., "Elevation Dependence of Amplitude Scintillations on Low Elevation Earth Space Paths," *Sixth International Conference on Antennas and Propagation (ICAP 89) Part 2: Propagation*, IEE, pp. 150-154 (Apr. 4-7, 1989).

Vilar, E. et al., "Experimental System and Measurements of Transhorizon Signal Levels at 11 Ghz," *18th European Microwave Conference, Microwave Exhibitions and Publishers Ltd.*, pp. 429-435 (Sep. 12-15, 1988).

Vilar, E. and Matthews, P.A., "Importance of Amplitude Scintillations in Millimetric Radio Links," *Proceedings of the 4th European Microwave Conference*, Microwave Exhibitions and Publishers, pp. 202-206 (Sep. 10-13, 1974).

Vilar, E. and Haddon, J., "Measurement and Modeling of Scintillation Intensity to Estimate Turbulence Parameters in an Earth-Space Path," *IEEE Transactions on Antennas and Propagation*, IEEE Antennas and Propagation Society, vol. AP-32, No. 4, pp. 340-346 (Apr. 1984).

Vilar, E. and Matthews, P.A., "Measurement of Phase Fluctuations on Millimetric Radiowave Propagation," *Electronics Letters*, IEE, vol. 7, No. 18, pp. 566-568 (Sep. 9, 1971).

Vilar, E. and Wan, K.W., "Narrow and Wide Band Estimates of Field Strength for Indoor Communications in the Millimetre Band," *Electronics Division Colloquium on Radiocommunications in the Range 30-60 Ghz*, IEE, pp. 5/1-5/8 (Jan. 17, 1991).

Vilar, E. and Faulkner, N.D., "Phase Noise and Frequency Stability Measurements. Numerical Techniques and Limitations." *Electronics Division Colloquium on Low Noise Oscillators and Synthesizer*, IEE, 5 pages (Jan. 23, 1986).

Vilar, E. and Senin, S., "Propagation phase noise identified using 40 Ghz satellite downlink," *Electronics Letters*, IEE, vol. 33, No. 22, pp. 1901-1902 (Oct. 23, 1997).

Vilar, E. et al., "Scattering and Extinction: Dependence Upon Raindrop Size Distribution in Temperate (Barcelona) and Tropical (Belem) Regions," *Tenth International Conference on Antennas and Propagation*, Electronics Division of the IEE, pp. 2.230-2.233 (Apr. 14-17, 1997).

Vilar, E. and Haddon, J., "Scintillation Modeling and Measurement—A Tool for Remote-Sensing Slant Paths," *AGARD Conference Proceedings No. 332: Propagation Aspects of Frequency Sharing, Interference And System Diversity*, AGARD, pp. 27-1-27-13 (Oct. 18-22, 1982).

Vilar, E., "Some Limitations on Digital Transmission Through Turbulent Atmosphere," *International Conference on Satellite Communication Systems Technology*, Electronics Division of the IEE, pp. 169-187 (Apr. 7-10, 1975).

Vilar, E. and Matthews, P.A., "Summary of Scintillation Observations in a 36 Ghz Link Across London," *International Conference on Antennas and Propagation Part 2: Propagation*, IEE, pp. 36-40 (Nov. 28-30, 1978).

Vilar, E. et al., "Wideband Characterization of Scattering Channels," *Tenth International Conference on Antennas and Propagation*, Electronics Division of the IEE, pp. 2.353-2.358 (Apr. 14-17, 1997).

Vollmer, A., "Complete GPS Receiver Fits on Two Chips," *Electronic Design*, Penton Publishing, pp. 50, 52, 54 and 56 (Jul. 6, 1998).

*Voltage and Time Resolution in Digitizing Oscilloscopes: Application Note 348*, Hewlett Packard, pp. 1-11 (Nov. 1986).

Wan, K.W. et al., "A Novel Approach to the Simultaneous Measurement of Phase and Amplitude Noises in Oscillator," *Proceedings of the 19th European Microwave Conference*, Microwave Exhibitions and Publishers Ltd., pp. 809-813 (Sep. 4-7, 1989).

Wan, K.W. et al., "Extended Variances and Autoregressive/Moving Average Algorithm for the Measurement and Synthesis of Oscillator Phase Noise," *Proceedings Of the 43rd Annual Symposium on Frequency Control*, IEEE, pp. 331-335 (1989).

Wan, K.W. et al., "Wideband Transhorizon Channel Sounder at 11 Ghz," *Electronics Division Colloquium on High Bit Rate UHF/SHF Channel Sounders—Technology and Measurement*, IEE, pp. 3/1-3/5 (Dec. 3, 1993).

Wang, H., "A 1-V Multigigahertz RF Mixer Core in 0.5—μm CMOS," *IEEE Journal of Solid-State Circuits*, IEEE Solid-State Circuits Society, vol. 33, No. 12, pp. 2265-2267 (Dec. 1998).

Watson, A.W.D. et al., "Digital Conversion and Signal Processing for High Performance Communications Receivers," *Digital Processing of Signals in Communications*, Institution of Electronic and Radio Engineers, pp. 367-373 (Apr. 22-26, 1985).

Weast, R.C. et al. (Ed.), *Handbook of Mathematical Tables*, Second Edition, The Chemical Rubber Co., pp. 480-485 (1964).

Wiley, R.G., "Approximate FM Demodulation Using Zero Crossings," *IEEE Transactions on Communications*, IEEE, vol. COM-29, No. 7, pp. 1061-1065 (Jul. 1981).

Worthman, W., "Convergence . . . Again," *RF Design*, Primedia, p. 102 (Mar. 1999).

Young, I.A. and Hodges, D.A., "MOS Switched-Capacitor Analog Sampled-Data Direct-Form Recursive Filters," *IEEE Journal of Solid State Circuits*, IEEE, vol. SC-14, No. 6, pp. 1020-1033 (Dec. 1979).

Translation of Specification and Claims of FR Patent No. 2245130, 3 pages (Apr. 18, 1975- Date of publication of application).

Fest, Jean-Pierre, "Le Convertisseur A/N Revolutionne Le Recepteur Radio," *Electronique*, JMJ (Publisher), No. 54, pp. 40-42 (Dec. 1995).

Translation of DE Patent No. 35 41 031 A1, 22 pages (May 22, 1986- Date of publication of application).

Translation of EP Patent No. 0 732 803 A1, 9 pages (Sep. 18, 1996- Date of publication of application).

Fest, Jean-Pierre, "The A/D Converter Revolutionizes the Radio Receiver," *Electronique*, JMJ (Publisher), No. 54, 3 pages (Dec. 1995). (Translation of Doc. AQ50).

Translation of German Patent No. DE 197 35 798 C1, 8 pages (Jul. 16, 1998- Date of publication of application).

Miki, S. and Nagahama, R., *Modulation System II*, Common Edition 7, Kyoritsu Publishing Co., Ltd., pp. 146-154 (Apr. 30, 1956).

Miki, S. and Nagahama, R., *Modulation System II*, Common Edition 7, Kyoritsu Publishing Co., Ltd., pp. 146-149 (Apr. 30, 1956). (Partial Translation of Doc. AQ51).

Rabiner, L.R. and Gold, B., *Theory And Application Of Digital Signal Processing*, Prentice Hall, Inc., pp. v-xii and 40-46 (1975).

English-language Abstract of Japanese Patent Publication No. 08-032556, from http://www1.ipdl.jpo.go.jp, 2 Pages (Feb. 2, 1996—Date of publication of application).

English-language Abstract of Japanese Patent Publication No. 08-139524, from http://www1.ipdl.jpo.go.jp, 2 Pages (May 31, 1996—Date of publication of application).

English-language Abstract of Japanese Patent Publication No. 59-144249, from http://www1.ipdl.jpo.go.jp, 2 Pages (Aug. 18, 1984—Date of publication of application).

English-language Abstract of Japanese Patent Publication No. 63-054002, from http://www1.ipdl.jpo.go.jp, 2 Pages (Mar. 8, 1988—Date of publication of application).

English-language Abstract of Japanese Patent Publication No. 06-237276, from http://www1.ipdl.jpo.go.jp, 2 Pages (Aug. 23, 1994—Date of publication of application).

English-language Abstract of Japanese Patent Publication No. 08-023359, from http://www1.ipdl.jpo.go.jp, 2 Pages (Jan. 23, 1996—Date of publication of application).

Translation of Japanese Patent Publication No. 47-2314, 7 pages (Feb. 4, 1972- Date of publication of application).

Partial Translation of Japanese Patent Publication No. 58-7903, 3 pages (Jan. 17, 1983- Date of publication of application).

English-language Abstract of Japanese Patent Publication No. 58-133004, from http://www1.ipdl.jpo.go.jp, 2 Pages (Aug. 8, 1993—Date of publication of application).

English-language Abstract of Japanese Patent Publication No. 60-058705, from http://www1.ipdl.jpo.go.jp, 2 Pages (Apr. 4, 1985—Date of publication of application).

English-language Abstract of Japanese Patent Publication No. 04-123614, from http://www1.ipdl.jpo.go.jp, 2 Pages (Apr. 23, 1992—Date of publication of application).

English-language Abstract of Japanese Patent Publication No. 04-127601, from http://www1.ipdl.jpo.go.jp, 2 Pages (Apr. 28, 1992—Date of publication of application).

English-language Abstract of Japanese Patent Publication No. 05-175730, from http://www1.ipdl.jpo.go.jp, 2 Pages (Jul. 13, 1993—Date of publication of application).

English-language Abstract of Japanese Patent Publication No. 05-175734, from http://www1.ipdl.jpo.go.jp, 2 Pages (Jul. 13, 1993—Date of publication of application).

English-language Abstract of Japanese Patent Publication No. 07-154344, from http://www1.ipdl.jpo.go.jp, 2 Pages (Jun. 16, 1995—Date of publication of application).

English-language Abstract of Japanese Patent Publication No. 07-307620, from http://www1.ipdl.jpo.go.jp, 2 Pages (Nov. 21, 1995—Date of publication of application).

Oppenheim, A.V. and Schafer, R.W., *Digital Signal Processing*, Prentice-Hall, pp. vii-x, 6-35, 45-78, 87-121 and 136-165 (1975).

English-language Abstract of Japanese Patent Publication No. 55-066057, from http://www1.ipdl.jpo.go.jp, 2 Pages (May 19, 1980—Date of publication of application).

English-language Abstract of Japanese Patent Publication No. 63-065587, from http://www1.ipdl.jpo.go.jp, 2 Pages (Mar. 24, 1988—Date of publication of application).

English-language Abstract of Japanese Patent Publication No. 63-153691, from http://www1.ipdl.jpo.go.jp, 2 Pages (Jun. 27, 1988—Date of publication of application).

Translation of Japanese Patent Publication No. 60-130203, 3 pages (Jul. 11, 1985- Date of publication of application).

Razavi, B., "A 900-MHz/1.8Ghz CMOS Transmitter for Dual-Band Applications," *Symposium on VLSI Circuits Digest of Technical Papers*, IEEE, pp. 128-131 (1998).

Ritter, G.M., "SDA, A New Solution for Transceivers," *16th European Microwave Conference*, Microwave Exhibitions and Publishers, pp. 729-733 (Sep. 8, 1986).

Dialog File 351 (Derwent WPI) English Language Patent Abstract for FR 2 669 787, 1 page (May 29, 1992- Date of publication of application).

Akos, D.M. et al., "Direct Bandpass Sampling of Multiple Distinct RF Signals," *IEEE Transactions on Communications*, IEEE, vol. 47, No. 7, pp. 983-988 (Jul. 1999).

Patel, M. et al., "Bandpass Sampling for Software Radio Receivers, and the Effect of Oversampling on Aperture Jitter," *VTC 2002*, IEEE, pp. 1901-1905 (2002).

English-language Abstract of Japanese Patent Publication No. 61-030821, from http://www1.ipdl.jpo.go.jp, 2 Pages (Feb. 13, 1986- Date of publication of application).

English-language Abstract of Japanese Patent Publication No. 05-327356, from http://www1.ipdl.jpo.go.jp, 2 Pages (Dec. 10, 1993—Date of publication of application).

Tayloe, D., "A Low-noise, High-performance Zero IF Quadrature Detector/Preamplifier," *RF Design*, Primedia Business Magazine & Media, Inc., pp. 58, 60, 62 and 69 (Mar. 2003).

Dines, J.A.B., "Smart Pixel Optoelectronic Receiver Based on a Charge Sensitive Amplifier Design," *IEEE Journal of Selected Topics in Quantum Electronics*, IEEE, vol. 2, No. 1, pp. 117-120 (Apr. 1996).

Simoni, A. et al., "A Digital Camera for Machine Vision," *20th International Conference on Industrial Electronics, Control and Instrumentation*, IEEE, pp. 879-883 (Sep. 1994).

Stewart, R.W. and Plann, E., "Oversampling and sigma-delta strategies for data conversion," *Electronics & Communication Engineering Journal*, IEEE, pp. 37-47 (Feb. 1998).

Rudell, J.C. et al., "A 1.9-Ghz Wide-Band IF Double Conversion CMOS Receiver for Cordless Telephone Applications," *IEEE Journal of Solid-State Circuits*, IEEE, vol. 32, No. 12, pp. 2071-2088 (Dec. 1997).

English-language Abstract of Japanese Patent Publication No. 09-036664, from http://www1.ipdl.jpo.go.jp, 2 Pages (Feb. 7, 1997—Date of publication of application).

Simoni, A. et al., "A Single-Chip Optical Sensor with Analog Memory for Motion Detection." *IEEE Journal of Solid-State Circtuits*, IEEE, vol. 30, No. 7, pp. 800-806 (Jul. 1995).

\* cited by examiner

NETWORKING METHODS AND SYSTEMS

BACKGROUND OF THE INVENTION

1. Field of the Invention

The present invention is directed to wireless networking devices and, more particularly, to wireless networking devices in compliance with Institute of Electrical and Electronics Engineers (IEEE) 802.11 standards.

2. Related Art

There is a need for greater integration of functions in networking methods and systems. There is also a need for digital interfaces between components in networking systems. There is also a need for improved licensing methodologies to transfer technology between entities in order to increase integration and implement digital interfaces.

BRIEF SUMMARY OF THE INVENTION

The present invention is directed to integrated radio transceivers and digitizers, integrated baseband processors and device controllers, digital interfaces there between, and to licensing methodologies for same.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The present invention will be described with reference to the accompanying drawings. The drawing in which an element first appears is typically indicated by the leftmost digit(s) in the corresponding reference number.

DETAILED DESCRIPTION OF THE INVENTION

| Table of Contents |
|---|
| I. Introduction |
|    A. Wireless Networking Systems |
|    B. Technology Licensing Methodologies |
| II. Wireless Networking Systems |
|    A. Radio Transceiver and Analog Interface |
|    B. Interface Module |
|       1. Digitizer |
|       2. Baseband Processor |
|       3. MAC |
|    C. Controller |
| III. Integrated Radio Transceivers and Digitizers |
| IV. Integrated Baseband Processors, MACs, and Controllers |
| V. Digital Interfaces and Digital Interface Circuitry |
| VI. Additional Applications |
| VII. Technology Licensing Methodologies |
| VIII. Conclusion |

I. Introduction

The present invention is directed to integrated radio transceivers and digitizers, integrated baseband processors and device controllers, digital interfaces there between, architectures and partitions for same, to licensing methodologies for same, and for other products and services.

A. Wireless Networking Systems

Figure 1:
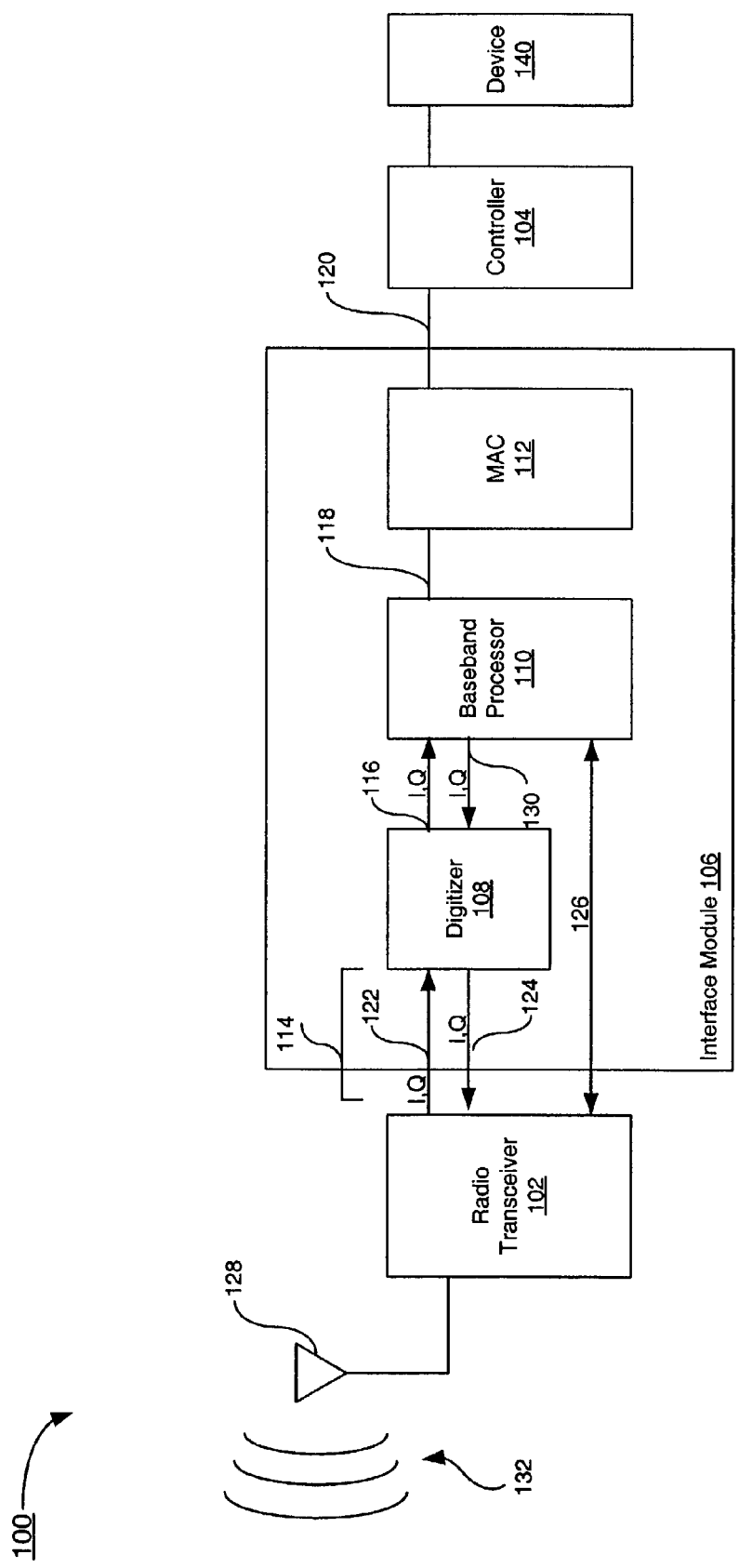
FIG. 1 is a block diagram of a wireless networking system 100 including an antenna system 128, a radio transceiver 102, an interface module 106, and a controller 104.

FIG. 1 is a block diagram of a wireless networking system 100, including an antenna system 128, a radio transceiver ("transceiver") 102, an interface module 106, and a controller 104. The transceiver 102 alternatively represents a combination of receiver(s) and transmitter(s). The wireless networking system 100 interfaces between a shared medium, illustrated here as a radio frequency ("RF") medium, and a device 140. The device 140 can be one or more of a variety of devices, including, without limitation, a computer, a printer, or other electronic devices. The wireless networking system 100 includes a receive path and a transmit path, as described below.

A high level operational description of the networking system 100 is now provided. On the receive side, the transceiver 102 receives an RF signal 132 through the antenna system 128. The RF signal 132 originates from a remote transceiver or other source. The transceiver 102 down-converts the RF signal 132 to baseband analog signals 122, which are provided to the interface module 106. The interface module 106 digitizes and decodes the analog baseband signals 122, and formats the resultant information for the controller 104. The interface module 106 provides the formatted information to the controller 104 through an interface 120. The controller 104 controls and/or enables the device 140 to take appropriate action. On the transmit side, the device 140 communicates to the remote transceiver or other destination through the controller 104, the interface module 106, and the direct-conversion radio transceiver 102, in a similar fashion.

The wireless network system 100 is now described in detail. The transceiver 102 is preferably a direct-conversion radio transceiver. Throughout the remainder of this disclosure, therefore, the transceiver 102 is interchangeably referred to as a direct-conversion radio transceiver 102. The direct-conversion radio transceiver 102 can be any of a variety of direct-conversion radio transceivers, existing now or developed in the future. For example, and without limitation, the direct-conversion radio transceiver 102 can be implemented as a direct-conversion radio transceiver disclosed in one or more of the following:

U.S. Pat. No. 6,061,551, titled, "Method and System for Down-Converting Electromagnetic Signals;"

U.S. Pat. No. 6,091,940, titled, "Method and System for Frequency Up-Conversion;" and U.S. application Ser. No. 09/550,642, titled, "Method and System for Down-Converting an Electromagnetic Signal, and Transforms for Same," filed Apr. 16, 1999.

All of which are incorporated herein by reference in their entireties. Alternatively the radio transceiver 102 is implemented with other direct conversion technology and/or combinations thereof.

The direct-conversion radio transceiver 102 frequency down-converts RF signals 132 from an RF frequency to an intermediate or baseband frequency in essentially a single step or process. The direct-conversion radio transceiver 102 preferably up-converts baseband signals for transmission in essentially a single step or process as well. The direct-conversion radio transceiver 102 optionally demodulates and/or modulates as part of the frequency conversion process. The direct-conversion radio transceiver 102 differs from conventional heterodyne transceivers in that heterodyne transceivers perform frequency conversion incrementally over multiple intermediate frequency ("IF") stages, where each IF stage includes associated filtering and/or amplification.

The transceiver 102 interfaces with the interface module 106 through a combination analog/digital interface 114. More specifically, the transceiver 102 provides analog signals 122 to the interface module 106, and receives analog signals 124 from the interface module 106. The analog signals 122 include down-converted in-phase ("I") and quadrature-phase ("Q") baseband receive signals. Similarly, the analog signals 124 include I and Q baseband transmit signals, which are to be up-converted for transmission through the antenna system 128. The analog signals 122 and/or 124 optionally include one or more analog control signals. The transceiver 102 also sends and/or receives digital signals 126 to/from the interface module 106. The digital signals 126 can include, for example, timing and/or control signals.

The interface module 106 converts between the analog signals 122 and 124 on the transceiver 102 side, and digital packetized data on the controller 104 side. The interface module 106 includes a digitizer 108, a baseband processor 110, and a medium access controller ("MAC") 112. The digitizer 108 receives the analog signals 122, from the radio transceiver 102, and digitizes them. The digitizer provides digitized I and Q receive signals 116 to the baseband processor 110. The digitizer 108 also receives digital I and Q baseband transmit signals 130 from the baseband processor, converts them to the I and Q analog transmit signals 124, and provides them to the transceiver 102.

The baseband processor 110 performs one or more of a variety of processes on the digitized I and Q receive signals 116. The processes can include, without limitation, timing recovery, carrier recovery, filtering, signal conditioning, equalization, gain adjustments, error correction, decoding, demodulation, and the like. Resultant data is provided to the MAC 112 through an interface 118.

The baseband processor 110 receives transmit data from the MAC 112 through the interface 118. The baseband processor 110 performs one or more of a variety of processes on the transmit signals. The processes can include, without limitation, encoding, filtering, and modulation. The baseband processor 110 provides the resultant digital I and Q transmit data 130 to the digitizer 108 for conversion to the I and Q analog transmit signals 124.

The MAC 112 arbitrates access between the shared RF medium and the device 140. The MAC 112 preferably includes one or more devices and/or functions (e.g.; software) in accordance with IEEE 802.11 standards, incorporated herein by reference in their entirety. IEEE 802.11 is described in a number of publicly available documents, such as, for example, O'Hara and Petrick, "802.11 Handbook—A Designer's Companion," Standards Information Network, IEEE Press, 1999, incorporated herein by reference in its entirety. The MAC 112 is commonly known as a link layer device. Functions performed by the MAC 112 can include, without limitation, network management, authentication, queing, data transmission and reception, error detection, and re-transmission.

The MAC 112 receives data from the baseband processor 110 through the interface 118 and formats (e.g., packetizes) the received data in accordance with requirements of the controller 104. The MAC provides the packetized digital data to the controller 104 via the interface 120. Similarly, the MAC 112 receives packetized data from the controller 104, decodes it, and provides the resultant data to the baseband processor 110 through the interface 118.

The analog I and Q signals 122 and 124 communicated between the transceiver 102 and the digitizer 108 tend to be noisy, and tend to have relatively low amplitudes and power levels. As a result, the transceiver 102 and the interface module 106 must typically be located relatively close to one another. This limits design options. It would be useful if the transceiver 102 and the interface module 106 communicated with one another through an all-digital digital interface, or substantially all-digital interface, because it would allow the direct-conversion radio transceiver 102 and the interface module 106 to be located remote to one another (i.e., positioning can be determined independently of one another). Accordingly, the present invention provides a digital interface between the transceiver 102 and the interface module 106.

Figure 2:
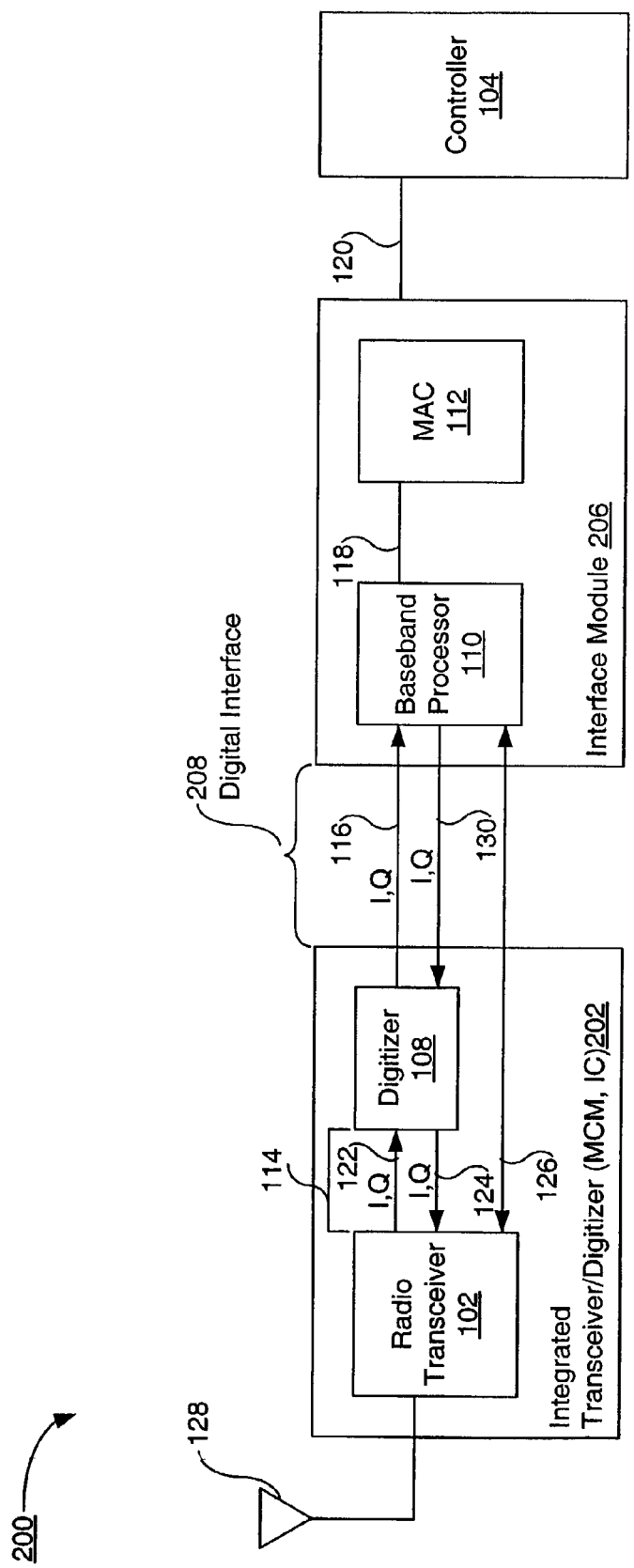
FIG. 2 is a block diagram of a network system 200, wherein the digitizer 108 is integrated with the transceiver 102 in an integrated transceiver/digitizer 202.

FIG. 2 is a block diagram of a network system 200, wherein the digitizer 108 is partitioned or integrated with the transceiver 102 in an integrated transceiver/digitizer 202. The integrated transceiver/digitizer 202 is preferably implemented in a monolithic package such as a multi-chip module ("MCM") or integrated circuit ("IC"). All, or substantially all of the analog signals 122 and 124 are thus contained within the integrated transceiver/digitizer 202. This allows the integrated transceiver/digitizer 202 to interface with the interface module 206 through a digital interface 208. The digital interface 208 can be a serial bus, a multiplexed bus, a parallel bus, a direct connection, and/or combinations thereof. Example implementations of the digital interface 208 are described below with respect to FIGS. 18 and 19, for example.

Figure 7:
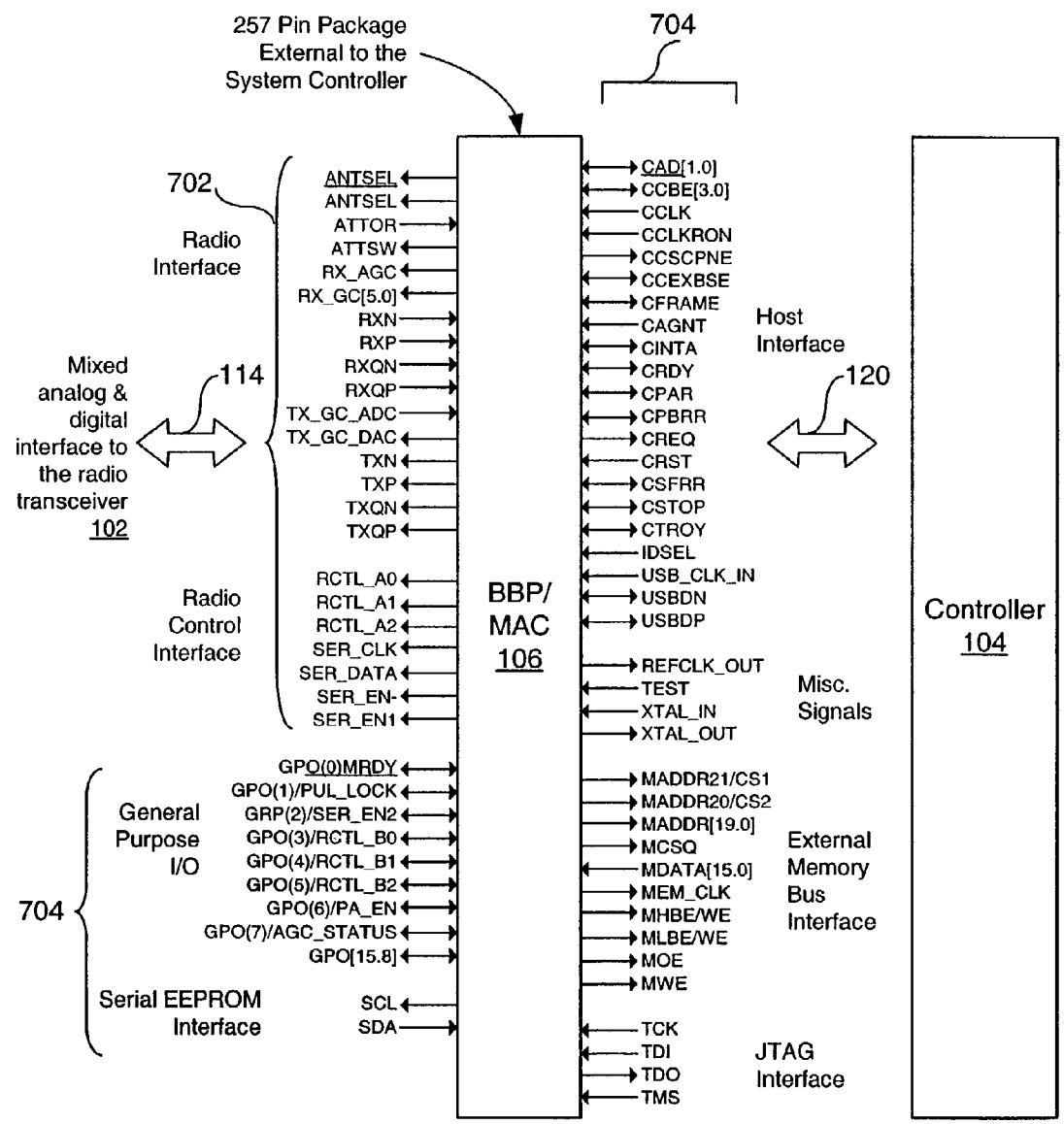
FIG. 7 is an example pin-layout representation of the interface module 106.

The digital interface 208 allows the integrated transceiver/digitizer 202 to be positioned remote (independently) from interface module 206. For example, the integrated transceiver/digitizer 202 can be located near the antenna system 128 and the interface module 206 can be located near the controller 104, and/or in any other convenient location. Additional details of this aspect of the invention are described below It would also be useful to reduce the number of pin interconnections in network systems. Referring back to FIG. 1, the interface module 106 typically includes approximately 300 pins for interfacing between the transceiver 102 and the controller 104. FIG. 7 is an example pin-layout representation of the interface module 106, including approximately 257 pins. A first set of pins 702 interface with the radio transceiver 102. The first set of pins 702 corresponds to the interface 114. A second set of pins 704 interface with the controller 104. The second set of pins 704 corresponds to the interface 120. It would be useful to reduce the number of pins. Accordingly, the present invention provides integration designs that reduce the number of pins. This is described below with respect to FIGS. 3A and 3B.

Figure 3A:
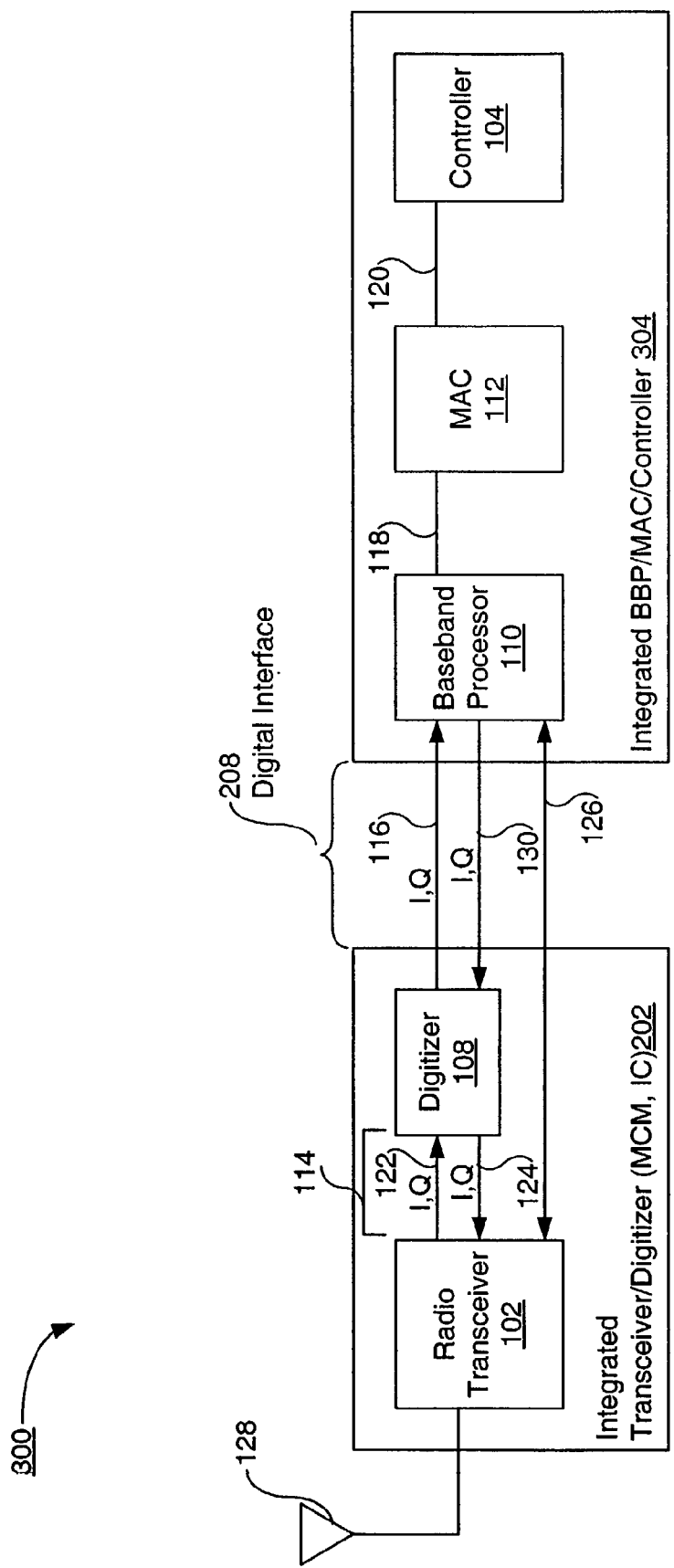
FIG. 3A is a block diagram of a network system 300, wherein the baseband processor 110 and MAC 112 are integrated with the controller 104 in an integrated BBP/MAC/Controller 304.

FIG. 3A is a block diagram of a network system 300, wherein the baseband processor 110 and MAC 112 are partitioned with and/or integrated with the controller 104 in an integrated BBP/MAC/Controller 304. As a result of the integration, the second set of pins 704 that were previously required to couple the interface module 106 to the controller 104 are essentially eliminated. The reduces system-integration effort and thus integration costs, as well as providing other advantages that will be apparent to persons skilled in the art. The integrated BBP/MAC/Controller 304 is preferably implemented within a monolithic package, preferably, but not limited to, a single IC.

In the example of FIG. 3A, the digitizer 108 is integrated with the radio transceiver 102, as described above with respect to FIG. 2. Alternatively, the digitizer 108 is not integrated with the radio transceiver 102.

Another advantage provided by the network system 300 relates to quantity discount pricing. For market-based reasons, controller designers/manufactures typically fabricate, or order the fabrication of relatively large numbers of controllers integrated circuits ("ICs"). The cost per IC typically decreases with increasing order size. Interface module designers/manufactures, on the other hand, typically fabricate, or order the fabrication of relatively small numbers of interface module ICs. Fabrication costs per IC typically decrease with increasing order sizes. As a result, when the baseband processor 110 and the MAC 112 are integrated with the controller 104, quantity pricing associated with the controller 104 can be extended to the baseband processor 110 and the MAC 112.

Figure 3B:
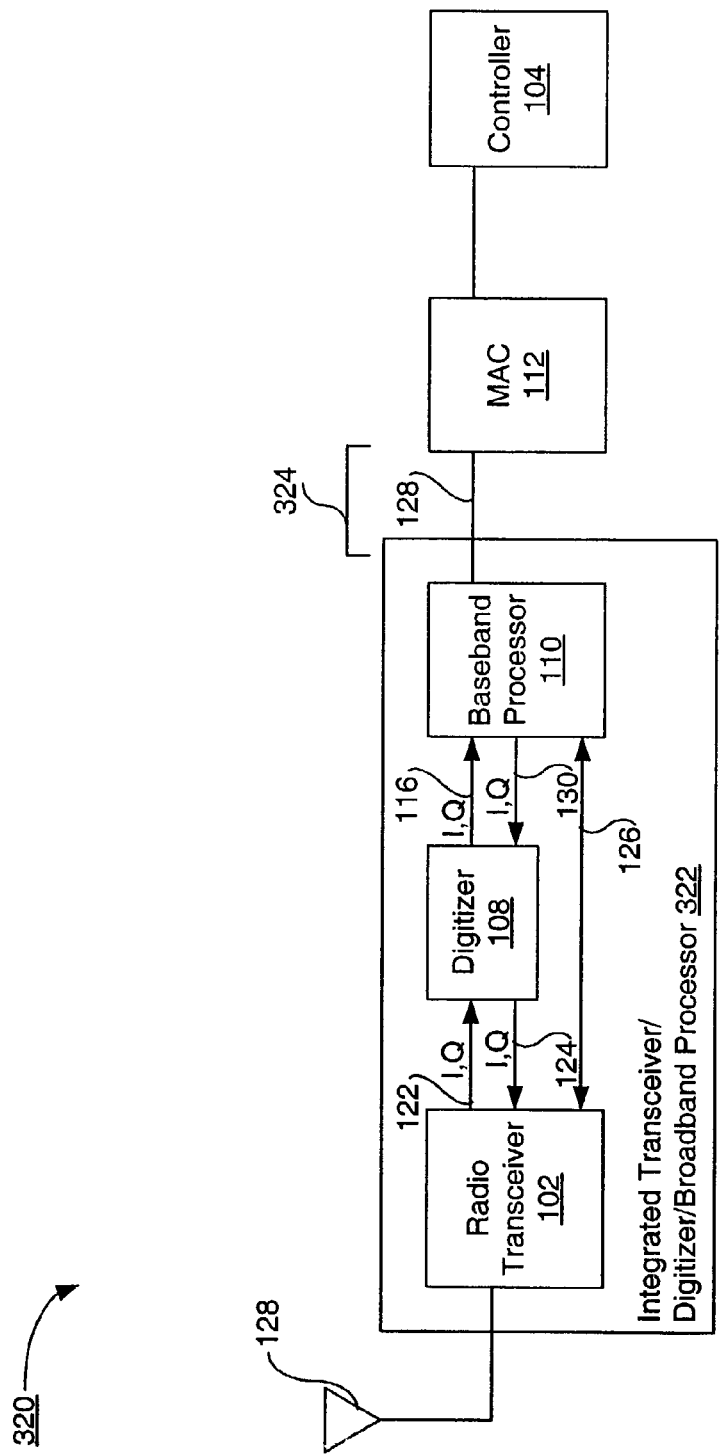
FIG. 3B is a block diagram of a network system 320, wherein the baseband processor 110 is integrated with the transceiver 102 and the digitizer 108, in an integrated transceiver/digitizer/BBP 322.

The present invention includes other partition/integration configurations as well. For example, FIG. 3B is a block diagram of a network system 320, wherein the transceiver 102, the digitizer 108, and the baseband processor 110 are integrated in a transceiver/digitizer/BBP 322. The integrated transceiver/digitizer/BBP 322 is preferably implemented as a multi-chip module or an integrated circuit. The integrated transceiver/digitizer/BBP 322 interfaces with the MAC 112 through a digital interface 324. Other particular options are possible, depending on a number of factors, such as available fabrication technologies, available bill of material cost, allocation, customer preference, etc.

B. Technology Licensing Methodologies

The present invention also relates to methods for licensing technology between designers/manufactures of transceivers, interface modules, and controllers. In practice, transceivers, interface modules, and device controllers are typically designed and/or manufactured by different entities. As a result, there is an inherent inertia that inhibits the type of cooperation needed to identify the problems and implement the technology transfers needed to implement the inventions described herein. The inventors of the present invention are skilled in a number of technology fields. These skills have enabled them to identify and solve technology issues described herein. In order to facilitate technology transfers described herein, the inventors have also devised licensing methodologies as described below with respect to FIGS. 4, and 12-17.

II. Wireless Networking Systems

Details of the networking system 100, illustrated in FIG. 1, are now described.

A. Radio Transceiver and Analog Interface

Figure 5:
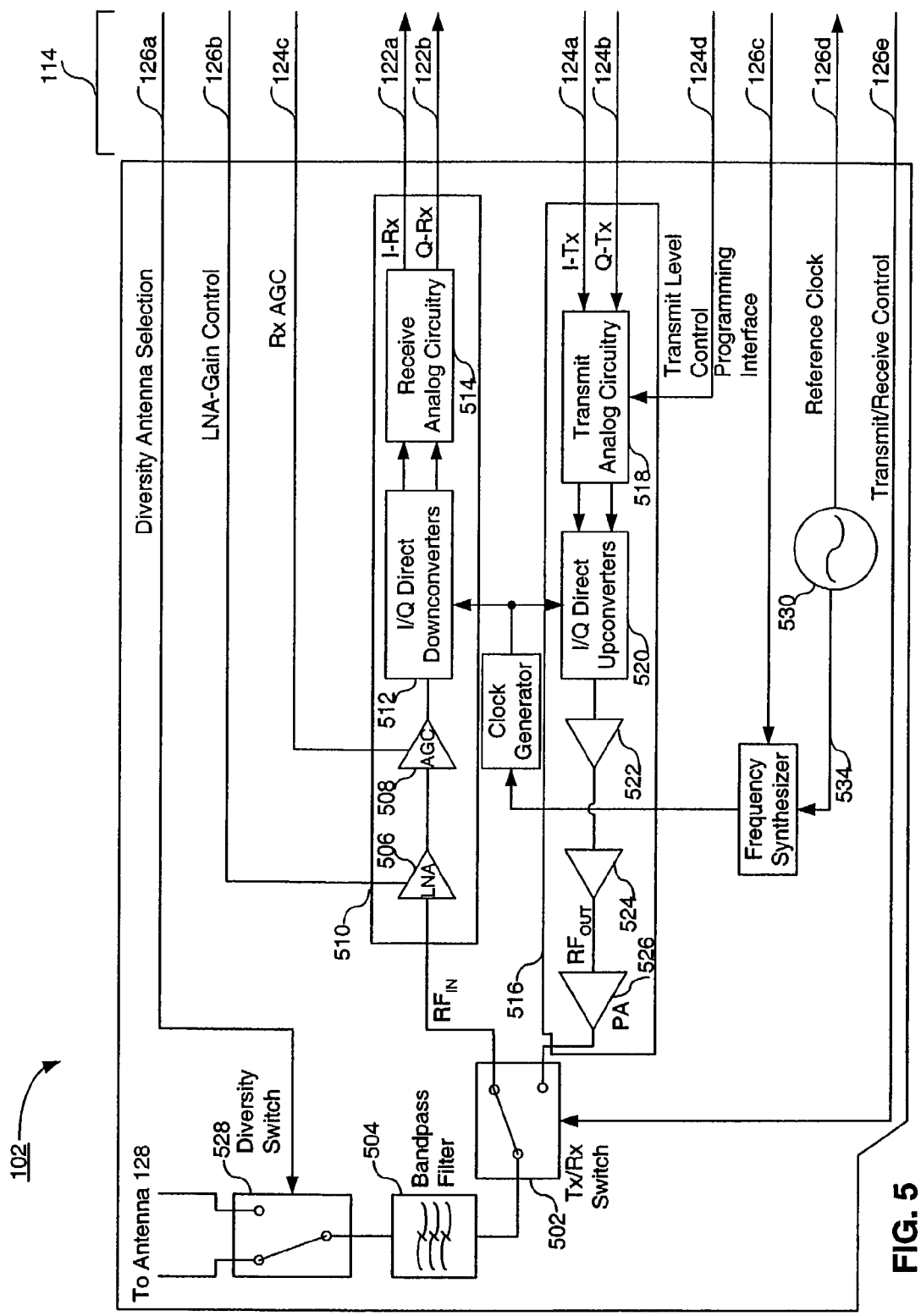
FIG. 5 is an example detailed block diagram of the transceiver 102.

FIG. 5 is an example detailed block diagram of the transceiver 102. The transceiver 102 includes a Tx/Rx switch 502 that selectively operates the transceiver 102 in a receive mode or a transmit mode. The Tx/Rx switch 502 is controlled by a digital transmit/receive control signal 126e. The Tx/Rx switch 502 is illustrated in the receive mode. In the receive mode, the RF signal 132 (FIG. 1) is received by the antenna system 128, filtered in a bandpass filter 504, and down-converted in a receive signal path 510. In the example of FIG. 5, the receive signal path 510 includes a low noise amplifier ("LNA") 506, an automatic gain control ("AGC") module 508, I/Q direct down-converters 512, and receive analog circuitry 514. The LNA 506 is controlled by a LNA gain control signal 126b, which is typically a digital signal. The AGC module 508 is controlled by a Rx-AGC signal 124c, which is typically an analog signal. The receive analog circuitry 514 can include, for example, and without limitation, filters, amplifiers, AGCs, D.C. offset controls, and the like. The receive, signal path 510 outputs baseband analog I and Q signals I-Rx 122a and Q-Rx 122b, respectively, which are provided to the digitizer 108.

In a transmit mode, analog I and Q transmit signals I-Tx 124a and Q-Tx 124b, respectively, are received from the digitizer 108. The I and Q transmit signals I-Tx 124a and Q-Tx 124b are up-converted in a transmit signal path 516, filtered in the bandpass filter 504, and provided to the antenna system 128. In the example of FIG. 5, the transmit signal path 516 includes transmit analog circuitry 518, I/Q direct up-converters 520, one or more filters 522, 524, and a programmable amplifier 526. The transmit analog circuitry 518 receives a transmit level control signal 124d, which, in the example of FIG. 5, is an analog signal. Alternatively, the transmit level control signal 124d is a digital signal.

The transceiver 102 optionally includes a diversity switch 528 controlled by a digital diversity antenna selection signal 126a. The diversity switch selectively activates/deactivates portions of the antenna system 128.

The transceiver 102 further includes one or more frequency synthesizers 532 that receive a reference clock 534 from an oscillator 530, and a programming interface signal 126c. The oscillator 530 also provides one or more reference clocks 126d to the baseband processor 110. Based on the description herein, construction and operation of the components within the transceiver 102 will be understood by those skilled in the relevant art(s).

In summary, in the example of FIG. 5, the interface 114 includes at least the following analog signals:

baseband analog I and Q signals I-Rx 122a and Q-Rx 122b, respectively;

baseband analog I and Q transmit signals I-Tx 124a and Q-Tx 124b;

Rx-AGC signal 124c; and transmit level control signal 124d.

In addition, one or more of tie following nominally digital signals may instead be analog signals:

diversity antenna selection signal 126a;

LNA gain control signal 126b;

programming interface signal 126c;

reference clock 126d; and transmit/receive control signal 126e.

Because of the relatively low signal strength, noise, and other factors associated with analog signals, the transceiver 102 and the interface module 106 must typically be physically positioned relatively close to one another. In practice, transceivers, interface modules, and/or communication networks are typically designed, manufactured, and/or integrated by different entities. The physical positioning requirement between the transceiver 102 and the interface module 106, therefore, requires that the different entities coordinate with one another during design, manufacturing, and/or integration of the network system 100. This is cumbersome and adds additional costs to the network system 100. Accordingly, the present invention provides methods and systems for digitally interfacing between transceivers and interface modules. This reduces the level of coordination required between the different entities and thus, reduces costs associated with network systems.

B. Interface Module

1. Digitizer

Figure 6:
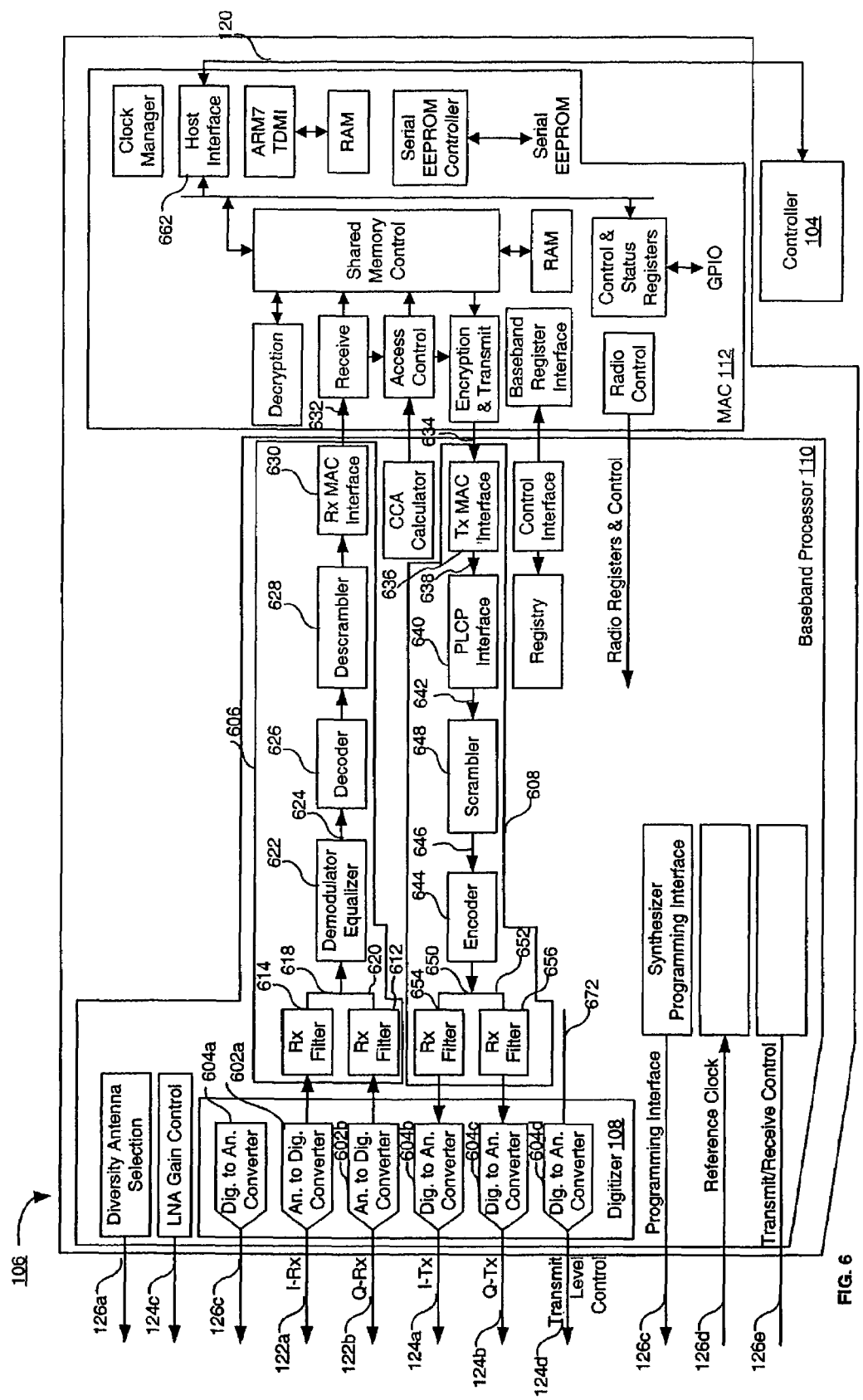
FIG. 6 is an example block diagram of the interface module 106.

FIG. 6 is an example block diagram of the interface module 106, wherein the digitizer 108 receives the baseband analog I and Q signals I-Rx 122a and Q-Rx 122b, respectively, and outputs the baseband analog I and Q transmit signals I-Tx 124a and Q-Tx 124b, respectively, the Rx AGC signal 124c, and the transmit level control signal 124d. The digitizer 108 is illustrated with analog-to-digital converters ("ADCs") 602 and digital-to-analog converters ("DACs") 604. The ADCs 602 and the DACs 604 can be implemented with any of a variety of designs including, without limitation, comparators.

The remaining digital signals, including diversity antenna selection signal 126a, LNA gain control signal 126b, programming interface signal 126c, and reference clock 126d, and transmit/receive control signal 126e, are communicated between the transceiver 102 and the baseband processor 110 without passing through the digitizer 108.

2. Baseband Processor

The baseband processor 110 includes a receive path 606 and a transmit path 608. The receive path 606 receives digitized baseband I and Q signals 610 and 612, respectively, which are filtered by I and Q receive filters 614 and 616, respectively. Filtered I and Q signals 618 and 620 are demodulated and optionally equalized in a demodulator/equalizer 622. A demodulated baseband signal 624 is decoded by a decoder 626, the output of which is provided to a descrambler 628. The output of the descrambler 620 is provided to a receive MAC interface 630, which outputs receive data 632 to the MAC 112.

In the transmit path 608, a transmit MAC interface 636 receives transmit data 634 from the MAC 112. The transmit MAC interface 636 outputs transmit data 638 to a PLCP interface 640, which outputs transmit data 642 to a scrambler 644. The scrambler 644 outputs transmit data 646 to an encoder 648, which outputs I and Q transmit data 650 and 652, respectively, to I and Q transmit filters 654 and 656, respectively. The I and Q transmit filters 654 and 656 output I and Q transmit data 658 and 660, respectively, to DACs 604b and 604c, which convert the I and Q transmit data 658 and 660 to analog I and Q transmit signals 124a and 124b, respectively.

3. MAC

The MAC 112 receives the receive data 632 from the baseband processor 110 and reformats the receive data 632 according to requirements of the controller 104. The MAC 112 typically reformats the receive data 632 into packet-based data for transmission to the controller 104. The MAC 112 provides the reformatted receive data to the controller 104 through a host interface 662 and through the interface 120. An example of the interface 120 is represented by the second set of pins 704 in FIG. 7, as described above.

The MAC 112 receives transmit data from the controller 104 through the host interface 662, and reformats the transmit data according to requirements of the baseband processor 110. The MAC 112 typically de-packetizes the transmit data, and provides the de-packetized data to the baseband processor 110 as the transmit data 634.

C. Controller

Figure 8:
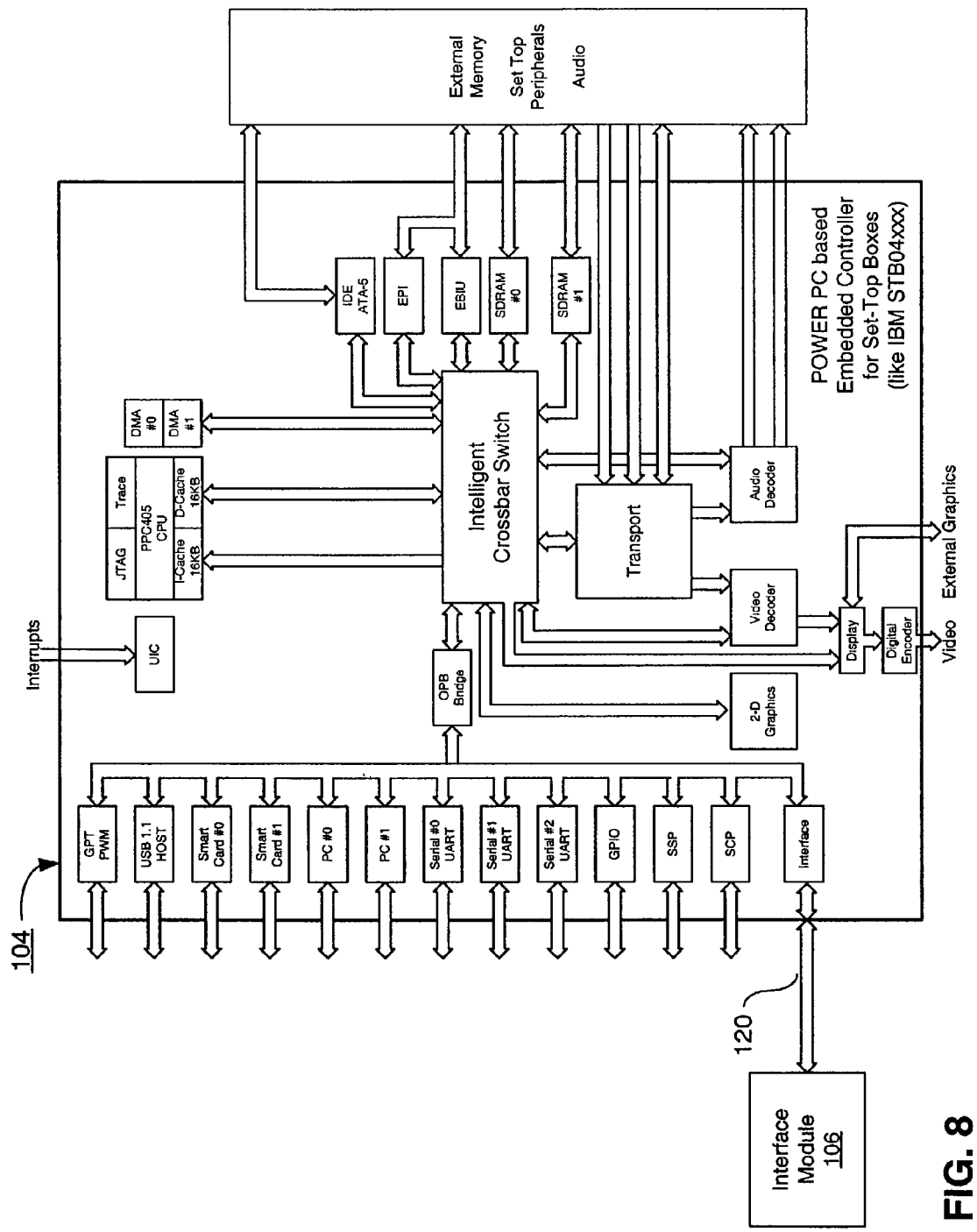
FIG. 8 is an example block diagram of the controller 104.

The controller 104 can be any of a variety of controllers, including, without limitation, printer controllers and the like, or other electronic/data processing devices. FIG. 8 is an example block diagram of the controller 104.

The controller 104 communicates with the interface module 106 through the interface 120, using a packet-based format.

III. Integrated Radio Receivers and Digitizers

Figure 9:
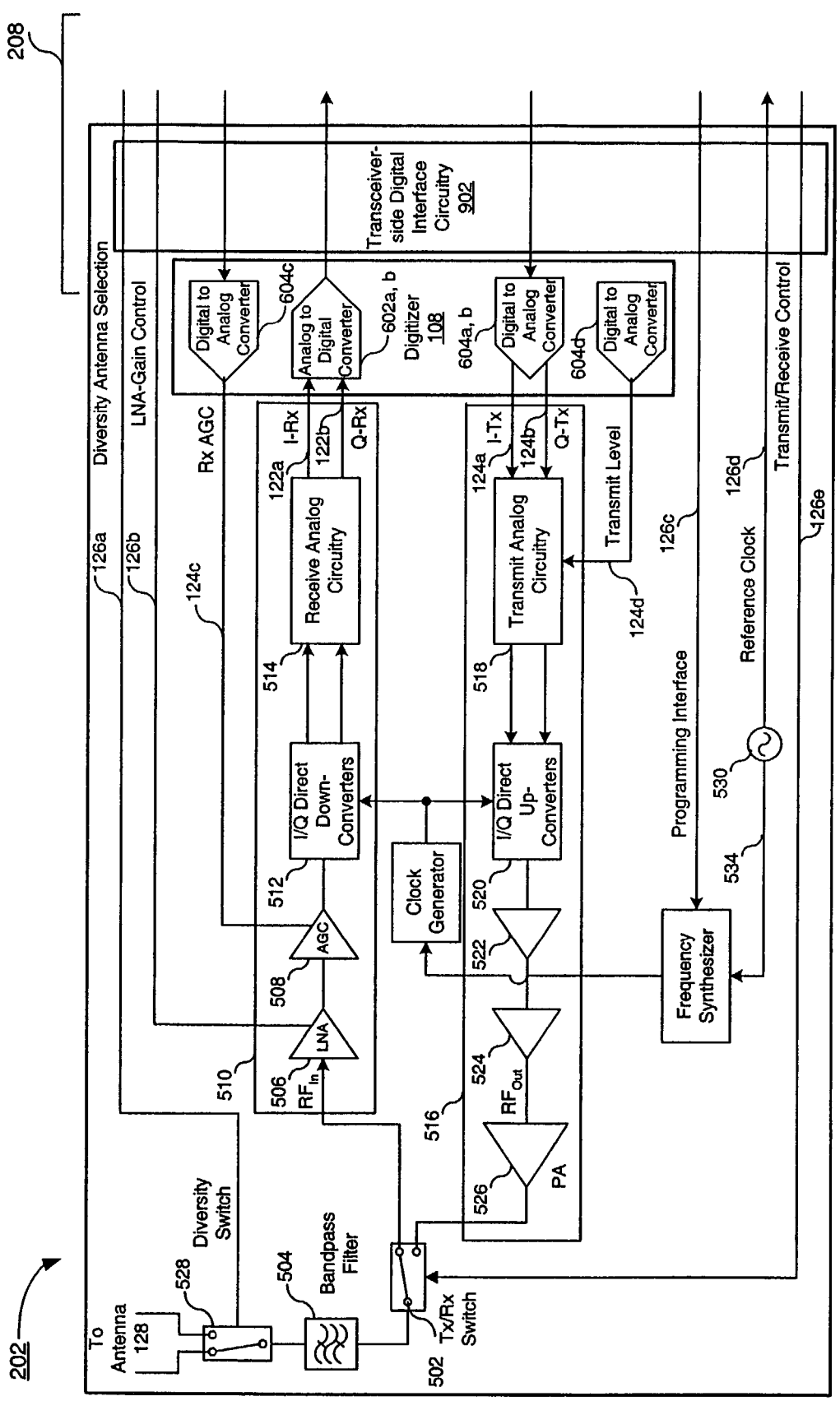
FIG. 9 is a block diagram of the integrated transceiver/digitizer 202.

Integration of the transceiver 102 and the digitizer 108 is now described. FIG. 9 is a block diagram of the integrated transceiver/digitizer 202, wherein the digitizer 108, including the ADCs 602 and the DACs 604, are integrated with the transceiver 102. The transceiver 102 and the digitizer 108, as illustrated in FIG. 9, operate substantially as described above with respect to FIGS. 5 and 6. The integrated transceiver/digitizer 202 interfaces with the baseband processor 108 through the digital interface 208. In the example of FIG. 9, integrated transceiver/digitizer 202 further includes transceiver-side digital interface circuitry 902, which is described below with respect to FIG. 18. The transceiver-side digital interface circuitry 902 can be considered part of the digital interface 208. It is noted that, in embodiments, the digital interface 208 and the transceiver-side digital interface circuitry 902 are substantially all-digital, but not necessarily all digital.

IV. Integrated Baseband Processors, MACs, and Controllers

Figure 10:
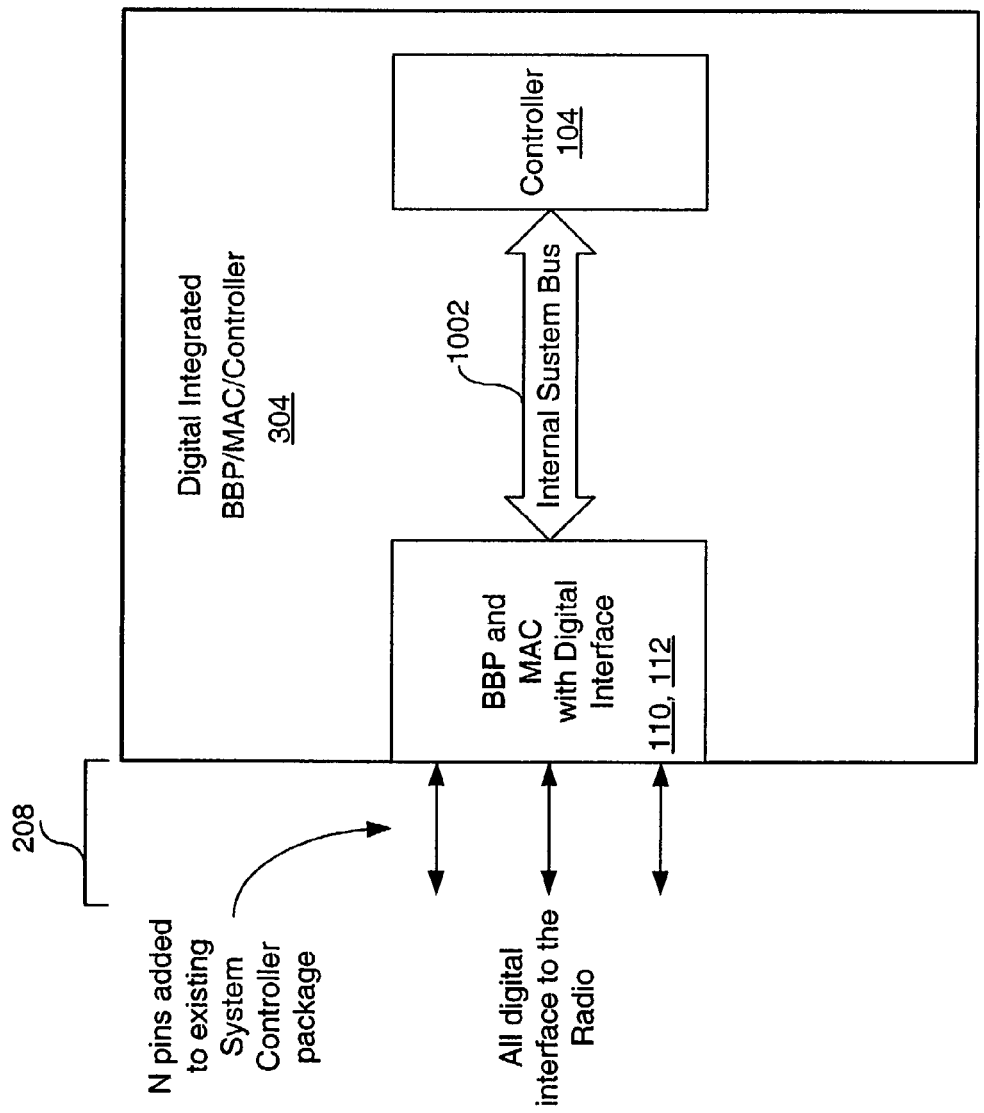
FIG. 10 is a block diagram of the integrated BBP/MAC/controller 304

Integration of the baseband processor 108, the MAC 112, and the controller 104 is now described. FIG. 10 is a block diagram of the integrated BBP/MAC/controller 304 (FIG. 3A). In FIG. 10, the baseband processor 108 and the MAC 112 interface with the controller 104 via an internal system bus 1002.

Figure 11:
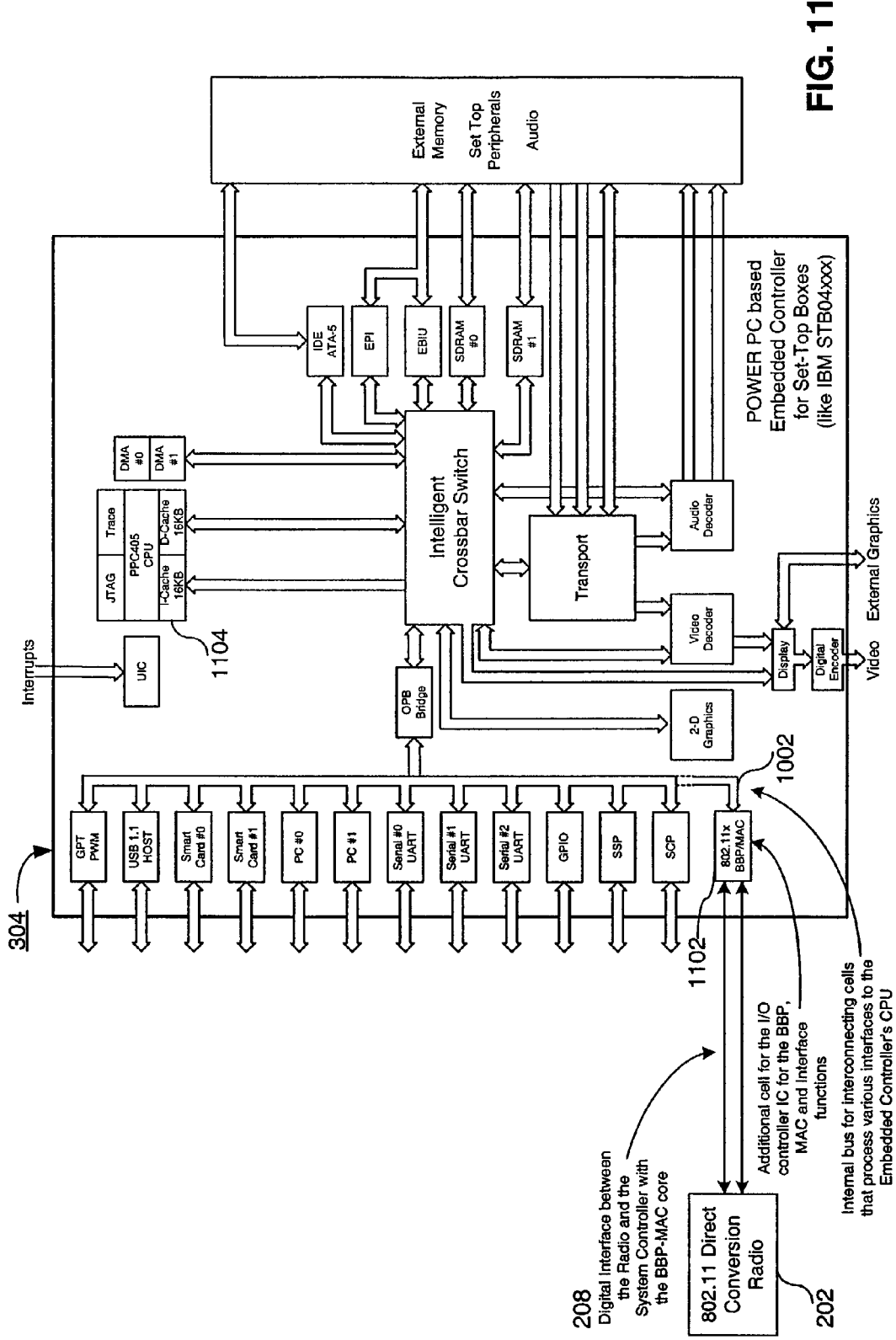
FIG. 11 is an example detailed block diagram of the integrated BBP/MAC/controller 304.
Figure 12:
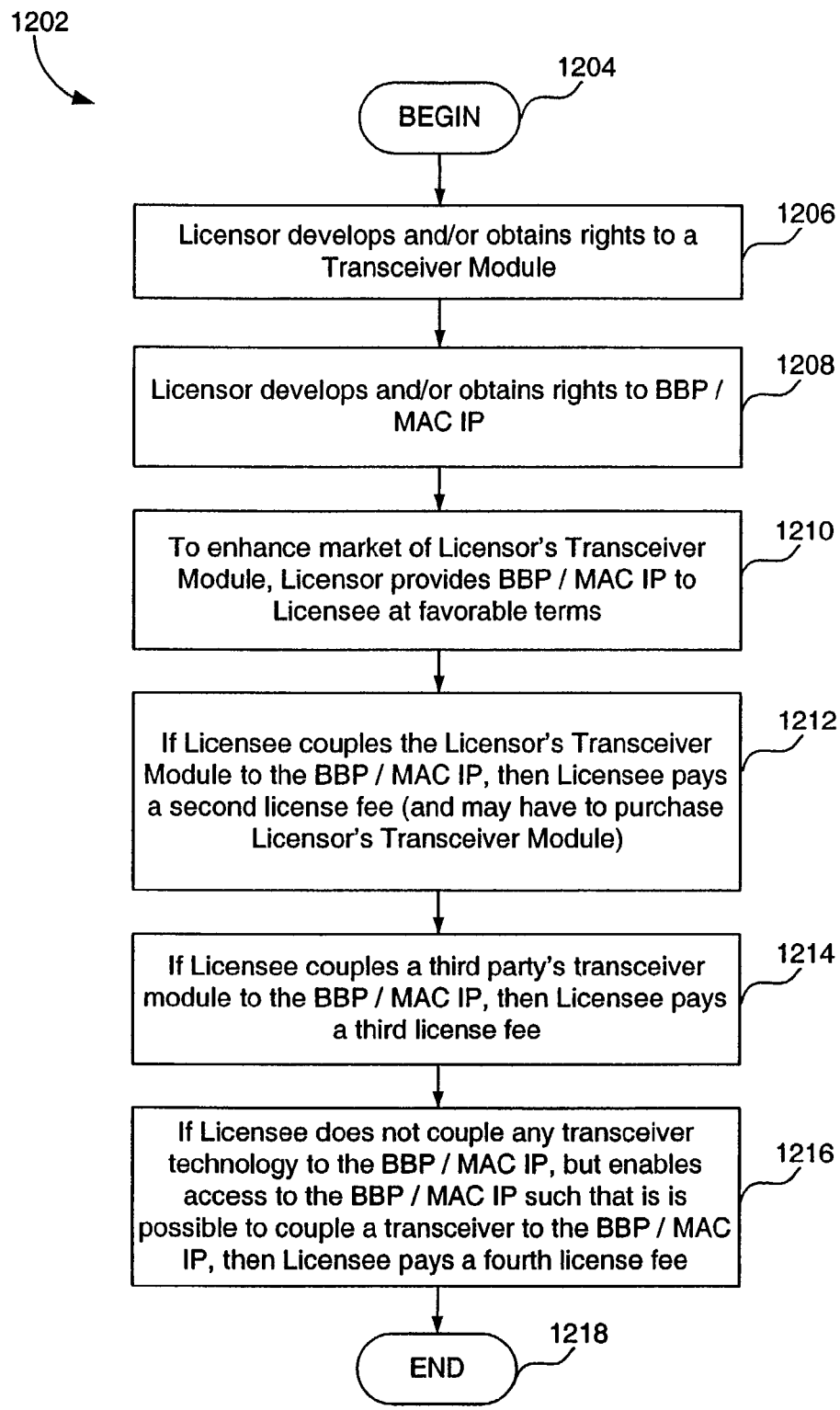
FIG. 12 illustrates another licensing methodology according to an embodiment of the present invention.

FIG. 11 is an example detailed block diagram of the integrated BBP/MAC/controller 304. In FIG. 11, the BBP/MAC/controller 304 of FIG. 8 is modified to include an internal cell 1102, which includes the baseband processor 110, the MAC 112, and internal I/O circuitry. The internal I/O circuitry can include, for example, controller-side digital interface circuitry associated with the digital interface 208, as described below with respect to FIG. 18. The internal bus 1002 interfaces the cell 1102, and other interface cells, with a central processing unit 1104. The integrated BBP/MAC/controller 304 interfaces with the digitizer 108, which is preferably, but not necessarily, integrated with the transceiver 102, through the digital interface 208.

V. Digital Interfaces and Digital Interface Circuitry

The digital interface 208 (FIGS. 2, 3A, 9, 10, and 11), can include one or more of a serial bus, a multiplexed bus, a parallel bus, a direct connection, and/or combinations thereof. A multiplexed bus digital interface 208 can be synchronous or non-synchronous. The digital interface 208 can also include digital interface circuitry, as now described.

Figure 17:
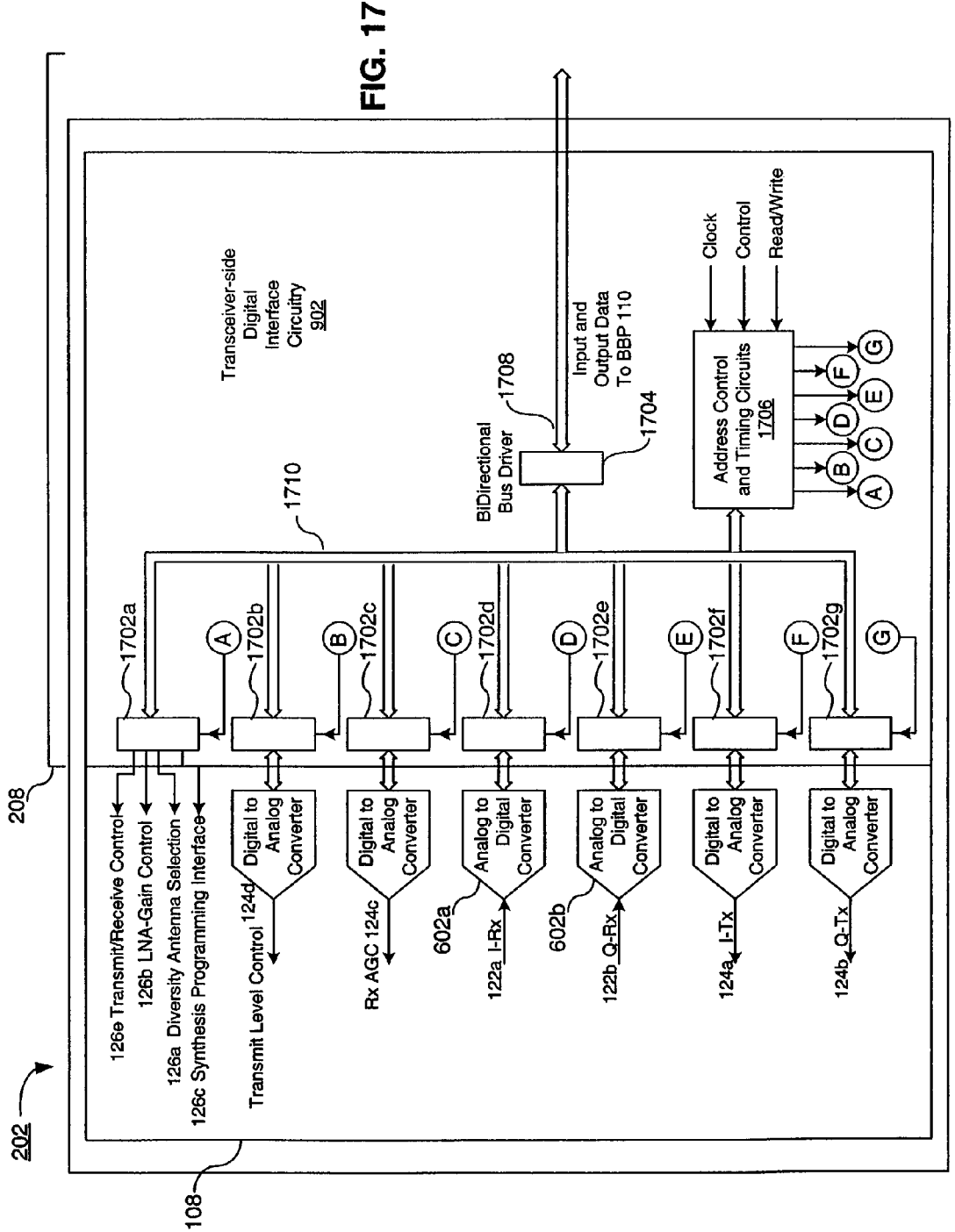
FIG. 17 is an example block diagram of a bi-directional implementation of a digital interface in accordance with an aspect of the invention.
Figure 18:
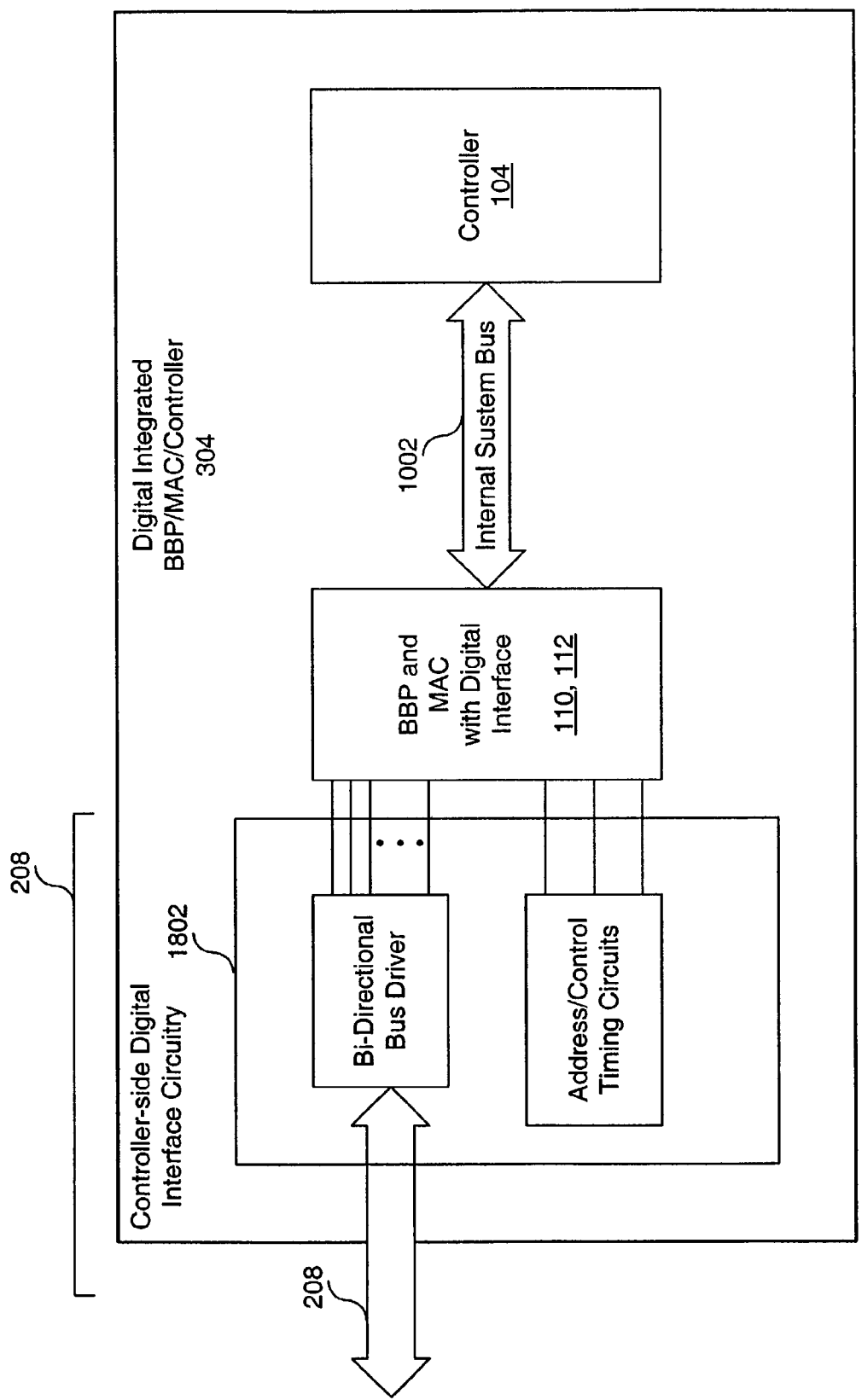
FIG. 18 is another example block diagram of a bi-directional implementation of a digital interface in accordance with an aspect of the invention.

FIGS. 17 and 18 are example block diagrams of a bi-directional implementation of digital interface 208. More specifically, FIG. 17 is an example block diagram of a bi-directional implementation of digital interface 208, including the transceiver-side digital circuitry 902 from FIG. 9. FIG. 18 is an example block diagram of a bi-directional implementation of the digital interface 208, including controller-side digital interface circuitry 1802 within the internal cell 1102 of FIG. 11.

In FIG. 17, the transceiver-side digital interface circuitry 902 includes a plurality of latches 1702, a bi-directional bus driver 1704, and an address control and timing circuit 1706. The transceiver-side digital interface circuitry 902 can be considered as part of the digital interface 208. The digital interface 208 further includes a bus 1708. The bus 1708 can be designed with a bandwidth that is suitable for a sample rate and/or symbol rate associated with the transceiver 102.

In operation, in the transmit path, digital data from the baseband processor 110 is presented to the bi-directional bus driver 1704 from the bus 1708. At an appropriate time, the address control and timing circuits 1706 control the bi-directional bus driver 1704 to present the digital data to an essentially parallel bus 1710, which presents the digital data to each of the latches 1702. The address control and timing circuits 1706 then control a selected one of the latches 1702 to pass the digital data through the selected latch.

Similarly, in the receive path, digital receive data is presented to the latches 1702d and 1702e from the analog-to-digital converters 602a and 602b, respectively. The address control and timing circuits 1706 control a selected one of the latches 1702d and 1702e to pass the digital data through the selected latch and onto the parallel bus 1710. The address control and timing circuits 1806 then control the bidirectional bus driver 1704 to pass the digital receive data through to the bus 1708.

In FIG. 18, the controller-side digital interface circuitry 1802 operates in a fashion similar to that of the digital interface circuitry 902, as will be apparent to one skilled in the relevant art(s), based on the description herein.

In an embodiment, the controller-side digital interface circuitry 1802 includes similar components as digital interface circuitry 902, including a plurality of latches, a bi-directional bus driver, and an address control and timing circuit. In an embodiment, a plurality of latches are coupled between the bi-directional bus driver and the baseband processor (BBP) and medium access controller (MAC).

VI. Additional Applications

Based on the description herein, one skilled in the relevant art(s) will understand that the present invention can be implemented in a variety of radio applications. For example, and without limitation, the present invention can be implemented with telephones, telephone base stations, positioning units, communication networks, pagers, security systems, repeaters, mobile radios, cellular telephones, satellite communications, computer, computer peripherals, home devices, automobiles, such as automobile radio receivers and/or transceivers, aircraft, boats, radio controlled devices, and the like.

The present invention can be implemented in applications described in U.S. patent application Ser. No. 10/086,250, titled, "Applications of Universal Frequency Translation," filed Mar. 4, 2002, incorporated herein by reference in its entirety.

The controller 104 can represent digital circuitry other than packet-based circuitry. For example, and without limitation, the controller 104 can represent a digital controller for an automobile radio, or the like.

VII. Technology Licensing Methodologies

Figure 4A:
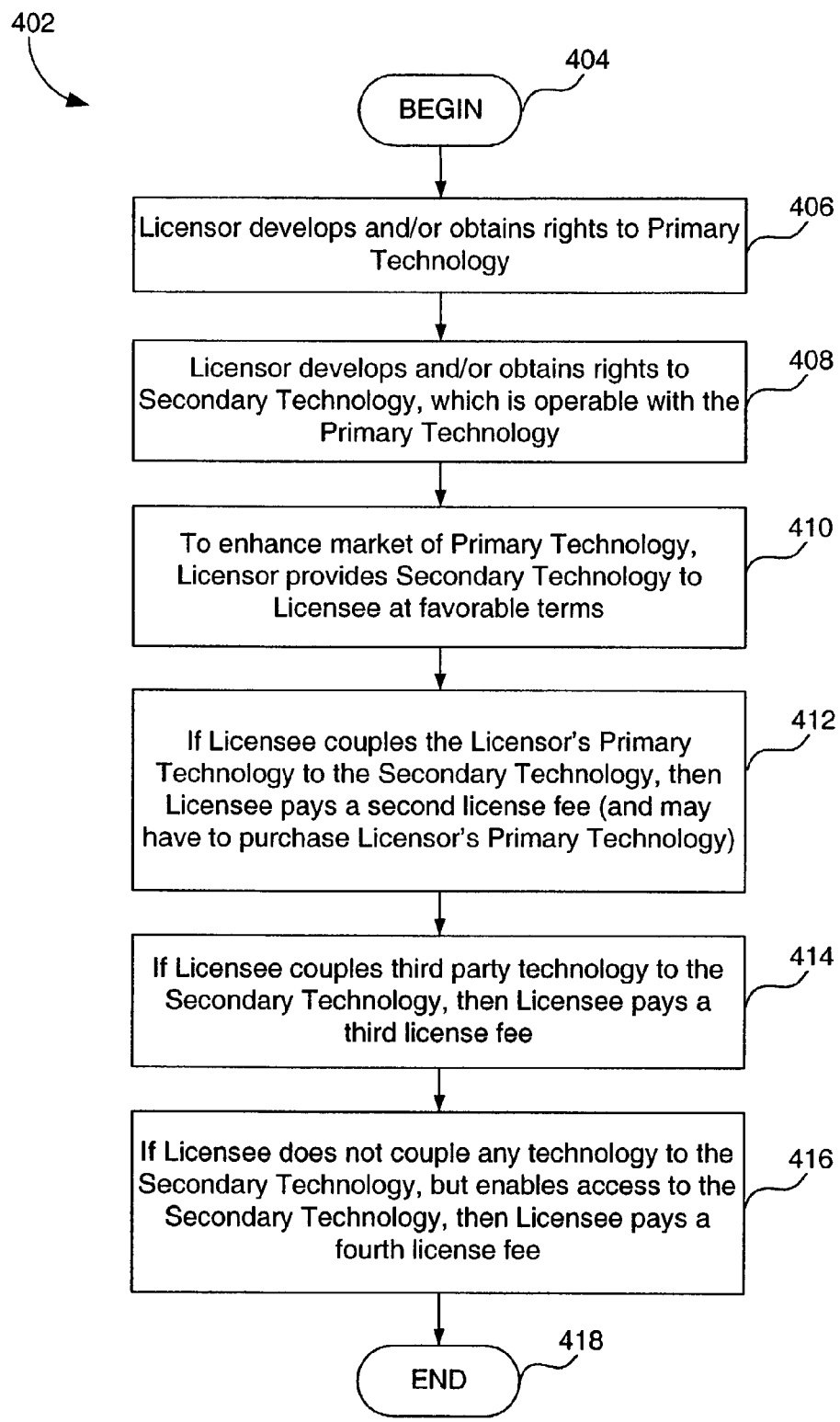
FIGS. 4A illustrates a licensing methodology according to an embodiment of the present invention.

Flowchart 402 of FIG. 4A depicts a licensing methodology in accordance with an embodiment of the present invention. Flowchart 402 shall be described with reference to an example licensing scenario 420 shown in FIG. 4B. Flowchart 402 begins with step 404, where control immediately passes to step 406.

In step 406, a licensor 422 develops and/or obtains the rights to a primary technology 434. The primary technology 434 can represent any intangible or tangible technology-related object, including but not limited to any know-how, trade secret, product, apparatus, component, system, schematic, layout, plan, architecture, mathematical model, data, formulae, algorithm, method, guideline, practice, prototype, cell library, core, semiconductor topography, report as well as any tool, software, firmware and/or hardware, and/or any portion(s) or combinations portions thereof, and/or any intellectual property right relating thereto. The primary technology 434 may or may not be subject to one or more patents and/or patent applications. The licensor 422 has rights to license and/or otherwise grant access to the primary technology 434 to third parties, although the licensor 422 may or may not own the primary technology 434, and may or may not have developed the primary technology 434.

In step 408, the licensor 422 develops and/or obtains rights to secondary technology 424. The secondary technology 424 can represent any intangible or tangible object, including but not limited to any know-how, trade secret, product, apparatus, component, system, schematic, layout, plan, architecture, mathematical model, data, formulae, algorithm, method, guideline, practice, prototype, cell library, semiconductor topography, report as well as any tool, software, firmware and/or hardware, and/or any portion(s) or combinations portions thereof, and/or any intellectual property right relating thereto. The secondary technology 424 may or may not be subject to one or more patents and/or patent applications. The licensor 422 has rights to license and/or otherwise grant access to the secondary technology 424 to third parties, although the licensor 422 may or may not own the secondary technology 424, and may or may not have developed the secondary technology 424. In the example FIG. 4B, the secondary technology 424 is operable with the primary technology 434.

Figure 4B:
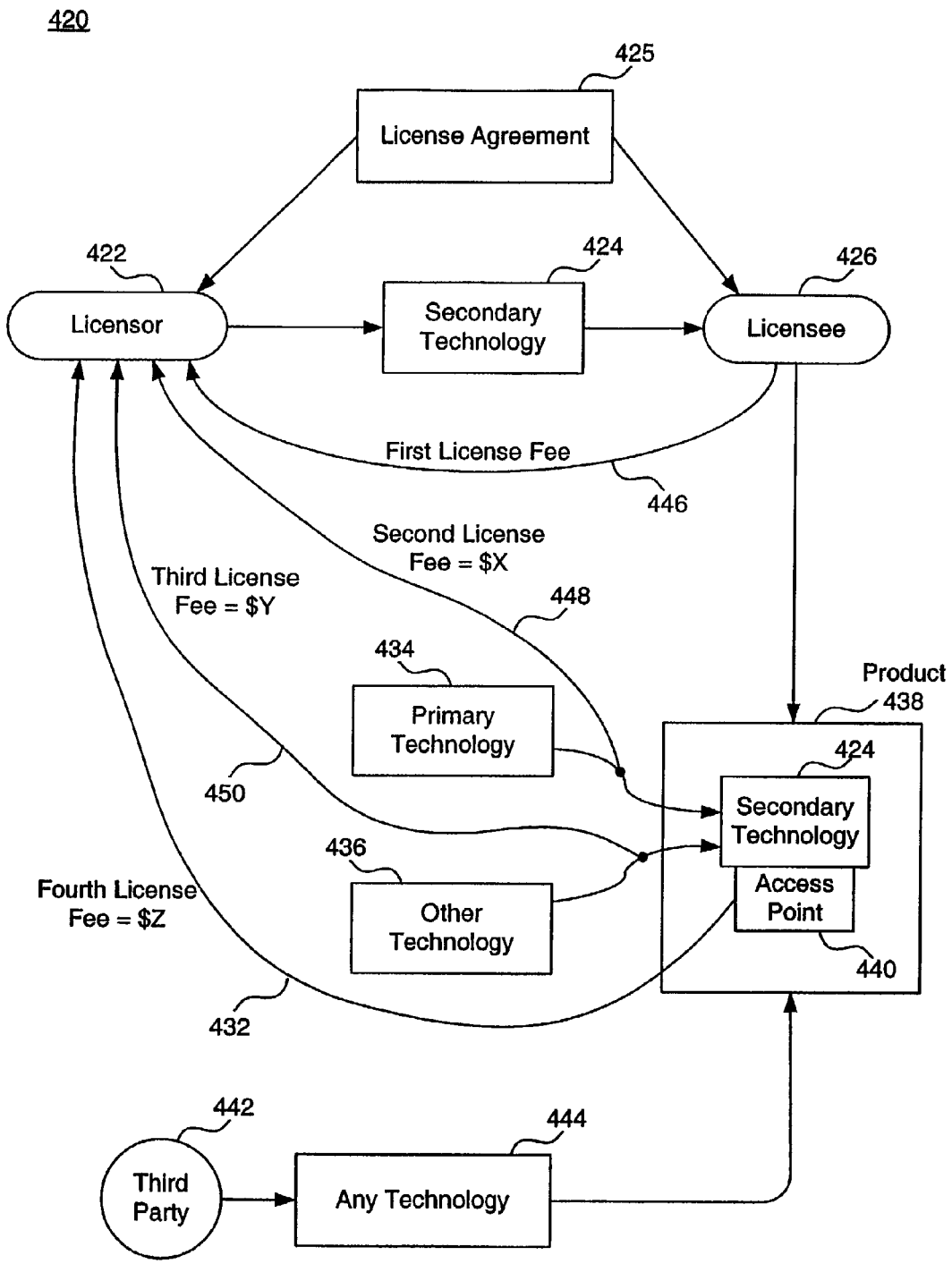
FIGS. 4B illustrates an example licensing scenario according to an embodiment of the present invention.

With reference to FIG. 4B, consider an example scenario where the licensor 422 is trying to introduce the primary technology 434 (and possibly the secondary technology 424) into a market where competing technologies exist. (It is noted that reference is made to this example for illustrative purposes only, and is not limiting.) Such competing technologies may have already been adopted by customers to some extent. Some of these customers may have incorporated these competing technologies into their products, or may be in the process of doing so. Accordingly, there is inertia with such customers to continue to use the competing technologies. Such inertia makes it difficult for the licensor 422 to convince customers to use the primary technology 434, because doing so would involve some expense on the part of customers to transition to the primary technology.

In the licensing methodology of FIG. 4A, according to an embodiment of the invention, the licensor 422 uses the secondary technology 424 to help overcome such inertia.

In particular, in step 410, the licensor 422 uses the secondary technology 424 to help enhance and promote the market for the primary technology 434. In an embodiment, in step 410, the licensor 422 provides the secondary technology 424 to licensee 426 via a license agreement 425 containing terms favorable to the licensee 426. By doing so, the licensee 426 is more likely to use secondary technology 424 in its applications. Once the licensee 426 has adopted secondary technology 424 for its applications, licensee 426 is also more likely to use primary technology 434 for its applications, since primary technology 434 is operable with secondary technology 424. Also, once licensee 426 begins using the secondary technology 424, there may be a number of additional advantages for also using primary technology 434. Thus, in step 410, by encouraging the licensee 426 to use the secondary technology 424 in its applications, licensor 422 is also able to encourage the licensee 426 to use the primary technology 434 for the licensee 426's applications.

There are any number of ways for the licensor 422 to provide favorable terms in the license agreement 425 to the licensee 426 in step 410. For example, the licensor 422 may license the secondary technology 424 to the licensee 426 in accordance with a payment structure favorable to the licensee 426. In the example of FIG. 4B, the licensee 426 is shown as paying a first licensee fee 446 to the licensor 422 in exchange for access to secondary technology 424. In an embodiment, the first license fee 446 could be relatively low (given the market). For example, the first license fee 446 may comprise an access fee coupled with periodic royalty payments. In an embodiment, the access fee is set at a relatively low level (relative to the market for comparable intellectual property), and may be payable over time, and the periodic royalty payments are also set at a low level, or are waived altogether. Other favorable payment structures will be apparent to persons skilled in the relevant art(s).

There are other ways for the licensor 422 to provide favorable terms in the license agreement 425 to the licensee 426 in step 410. For example, the licensor 422 can structure the license agreement 425 so that options to access other fields of use, or options to access other geographical areas, or volume discounts, may vest at relatively low thresholds. Other ways that favorable license terms can be provided to licensee 426 in step 410 will be apparent to persons skilled in the relevant art(s).

As described above, the license agreement 425 includes a first license fee 446 that is paid by the licensee 426 to enable the licensee 426 to access and have rights to the secondary technology 424. In an embodiment, the licensee agreement 425 also provides for other license fees that are a function of the manner in which the licensee 426 bundles the secondary technology 424 with other technology, or are a function of the manner in which the licensee 426 enables access to the secondary technology 424 by third parties 442. The licensor 422 can further encourage the licensee 426 to purchase and utilize the primary technology 434 by structuring the license agreement 425 so that such additional licensee fees are lower if the licensor 422 uses the primary technology 434, as opposed to other competing technologies 436. This is represented by steps 412, 414, and 416 in flowchart 402.

Accordingly, in step 412, if licensee 426 uses the licensor 422's primary technology 434 with the secondary technology 424, then the licensee 426 pays to the licensor 422 a second license fee 448. For example, the licensee 426 may use the secondary technology 424 to produce a product 438. Prior to selling the product 438, the licensee 426 may bundle, integrate, or otherwise couple the product 438 with the licensor 422's primary technology 434, such that the primary technology 434 operates with the secondary technology 434. In this case, the licensee 426 pays to the licensor 422 a second license fee 448 in step 412.

If, instead, the licensee 426 uses other technology 436 with the secondary technology 424 in the product 438, then the licensee pays a third license fee 450 to the licensor 422. The third license fee 450 is greater than the second license fee 448. For example, the licensee 426 may use the secondary technology 424 to produce a product 438. Prior to selling the product 438, the licensee 426 may bundle, integrate, or otherwise couple the product 438 with other technology 436, such that the primary technology 434 operates with the other technology 436. In this case, the licensee 426 pays to the licensor 422 the third license fee 450 in step 414.

There may be cases where the licensee 426 chooses not to couple either the primary technology 434 or other technology 436 to the secondary technology 424 in the product 438. However, the licensee 426 may enable access to the secondary technology 424 (via an access point 440, for example), such that a third party 442 can bundle, connect, integrate, or otherwise couple some technology 444 with the secondary technology 424. The technology 444 could include any technology, including the primary technology 434 and/or other technology 436. If the licensee 426 enables such access to the secondary technology 424 in the product 438, then the licensee 426 is obligated in step 416 to pay a fourth license fee 432 to the licensor 422. The fourth license fee 432 is greater than the second license fee 448. The relationship of the third license fee 450 to the fourth license fee 432 (i.e., which is greater) is implementation dependent.

Accordingly, the licensee 426 pays the lowest license fee (i.e., the second license fee 448) by using the licensor 422's primary technology 434 with the secondary product 424. Through structuring the license agreement 425 in the manner just described, the licensor 422 can provide additional motivation and incentive for the licensee 426 to adopt the licensor 422's primary technology 434 and secondary technology 424.

Figure 15:
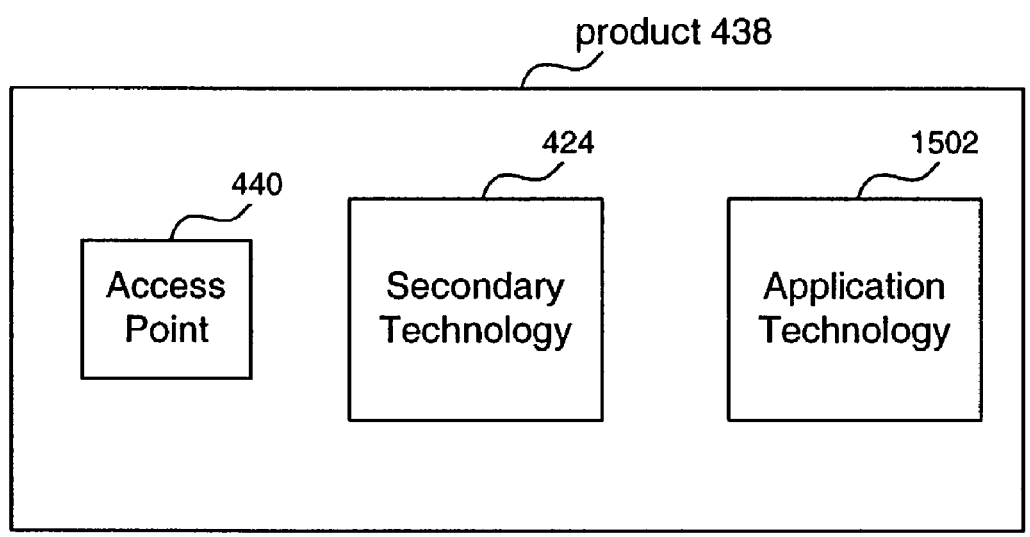
FIGS. 15 illustrates example products generated in the course of performance of the licensing methodologies of FIGS. 4A, 12, and/or 13.

As discussed above, the licensee 426 uses the secondary technology 424 to produce a product 438. FIG. 15 illustrates an example product 438. The product 438 includes secondary technology 424 and application technology 1502. The product 438 may also include an access point 440, as discussed above.

The application technology 1502 represents any intangible or tangible technology-related object (as defined above). The application technology 1502 includes functionality that is specific to the particular application of the product 438. For example, in the case where the product 438 is a printer (or component thereof), the application technology 1502 is a printer component, such as but not limited to a printer controller. In the case where the product 438 is a computer, the application technology 1502 is a computer component, such as but not limited to a computer controller (such as a microprocessor).

In an embodiment, in step 410 of FIG. 4A, the secondary technology 424 licensed by the licensor 422 to the licensee 426 comprises a synthesizable or compilable core software product representing one or more integrated circuit functions in one or more descriptor languages (such as, but not limited to, Verilog, VHDL, C, etc.). The secondary technology 424 can be synthesized or compiled using design tools, and can be instantiated in an integrated circuit design, in whole or in part, or used as machine instructions to a processor (hardware or software). The secondary technology 424 may also include other components, such as for example, associated design files and/or know-how.

Also, in an embodiment, the application technology 1502 similarly comprises a synthesizable or compilable core software product.

In an embodiment, the licensee 426 instantiates the application technology 1502 and the secondary technology 424 in an integrated circuit design, such that the application technology 1502 and the secondary technology 424 are embedded in one or more integrated circuits. This embodiment is referred to as an integrated solution, and is applicable in any integrated circuit operation or initiative. This embodiment is advantageous because it enables the licensee 426 to more efficiently and economically achieve high volumes of products 438, particularly when compared to non-integrated solutions. Accordingly, this integrated embodiment of the invention provides further incentive and motivation for the adoption of the licensor 422's primary technology 434 and the secondary technology 424, particularly in the context of the licensing methodology 402 of FIG. 4A.

The licensing methodology of the invention shall now be further described with reference to an example embodiment involving wireless products. The operation of this wireless licensing embodiment is illustrated in flowchart 1202 of FIG. 12. Reference in flowchart 1202 to wireless technology is for illustrative purposes only, and is not limiting. The invention is applicable to any technology, as will be apparent to persons skilled in the relevant art(s) based on the teachings contained herein.

Flowchart 1202 shall be described with reference to the example licensing scenario 420 shown in FIG. 4B, wherein primary technology 434 represents a wireless transceiver module, and the secondary technology 424 represents a baseband processor (BBP) and/or a media access controller (MAC). The transceiver module, baseband processor, and media access controller may be those described elsewhere herein, or may be others that are commercially available now or in the future.

In step 1206, the licensor 422 obtains rights to a transceiver module 434 (step 1206 corresponds to step 406 in FIG. 4A). In an embodiment, the transceiver module 434 is based on heterodyne communication technology. In an alternative embodiment, the transceiver module 434 is based on direct conversion technology. In an embodiment, the transceiver module 434 is implemented using D2D direct conversion technology from ParkerVision, Inc., of Jacksonville, Fla. D2D receivers, transmitters, and transceivers are described, for example, in the patents and patent applications referenced above, which are herein incorporated by reference in their entireties.

In step 1208, the licensor 422 obtains rights to BBP and/or MAC IP 424 (step 1208 is similar to step 408 in FIG. 4A). The BBP/MAC IP 424 is operable with the transceiver module 434.

In step 1210, to enhance the market of the licensor 422's transceiver module 434, the licensor 422 provides the BBP/MAC IP 424 to the licensee 426 at favorable-terms. Step 1210 corresponds to step 410 in FIG. 4A.

The licensee 426 uses the BBP/MAC IP 424 to produce a product 438. For example, the licensee 426 may instantiate the BBP/MAC IP 424 into a BBP/MAC module(s) in the product 438, in a manner that the BBP/MAC module(s) operates with other components in the product 438 (see, for example, FIG. 15 and the associated discussion above). Such design, development, and fabrication of the product 438 will be apparent to persons skilled in the relevant arts.

In step 1212, if the licensee 426 uses the licensor 422's transceiver module 434 with the BBP/MAC module 424 in the product 438, then the licensee 426 pays a second license fee 448 to the licensor 422. For example, if the licensee 426 integrates, combines, connects, couples, or otherwise provides the licensor 422's transceiver module 434 with the BBP/MAC module 424 in the product 438, then the licensee 426 pays a second license fee 448 to the licensor 422. Step 1212 corresponds to step 412 in FIG. 4A.

In step 1214, if the licensee 426 uses some other transceiver module 436 with the BBP/MAC module 424 in the product 438, then the licensee 426 pays a third license fee 450 to the licensor 422. For example, if the licensee 426 integrates, combines, connects, couples, or otherwise provides some other transceiver module 436 with the BBP/MAC module 424 in the product 438, then the licensee 426 pays a third license fee 450 to the licensor 422. Preferably, the third license fee 450 is lower than the second license fee 448. Step 1214 corresponds to step 414 in FIG. 4A.

If the licensee 426 does not couple any transceiver technology to the BBP/MAC module 424 in the product 438, but enables access to the BBP/MAC module 424 in the product 438 such that a third party 442 could couple a transceiver 444 or other device to the BBP/MAC module 424, perhaps via an access point 440, then in step 1216 the licensee 426 pays a fourth license fee 432 to the licensor 422. Preferably, the fourth license fee 432 is lower than the second license fee 448. Step 1216 corresponds to step 416 in FIG. 4A.

Figure 13:
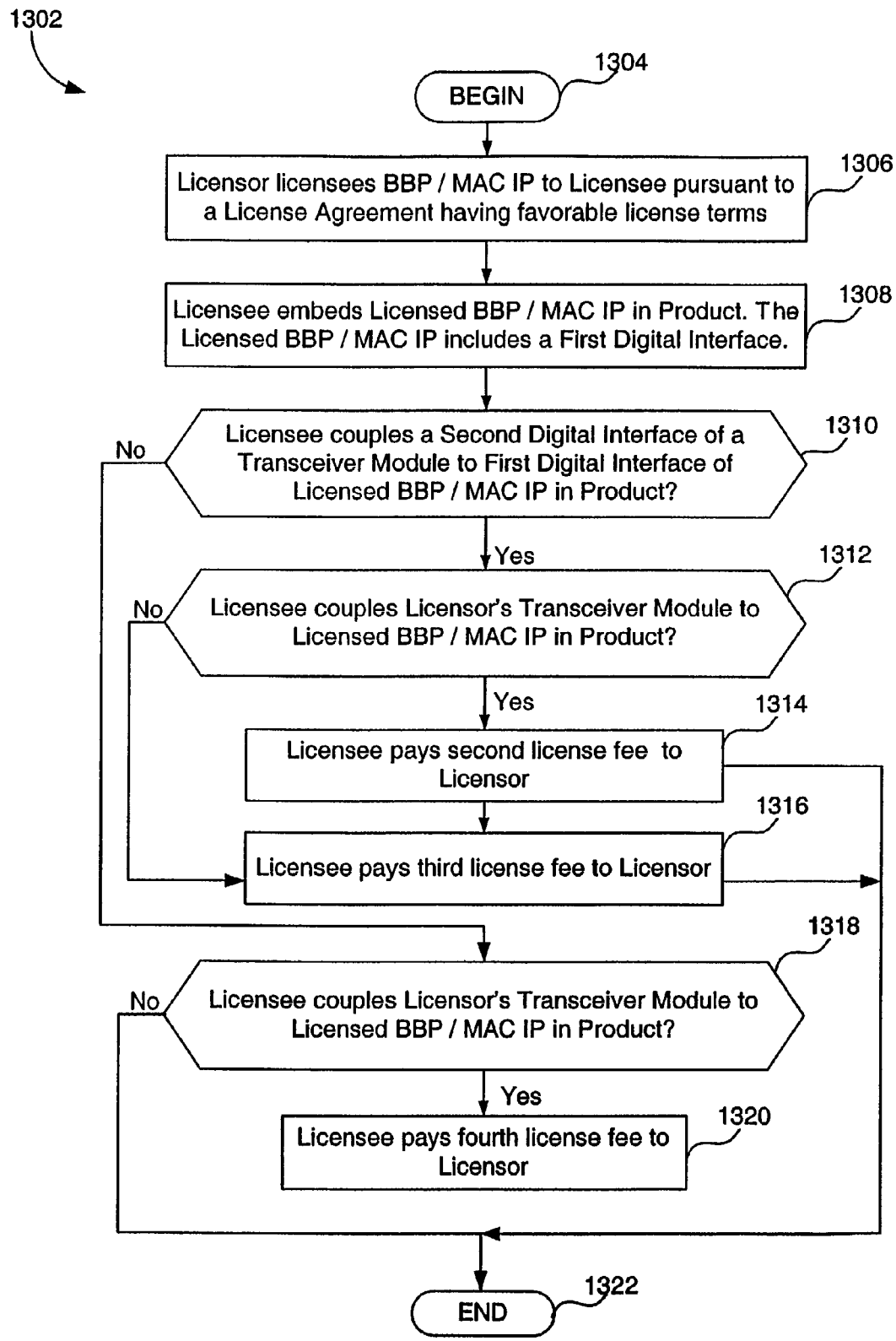
FIG. 13 illustrates another licensing methodology according to an embodiment of the present invention.
Figure 14:
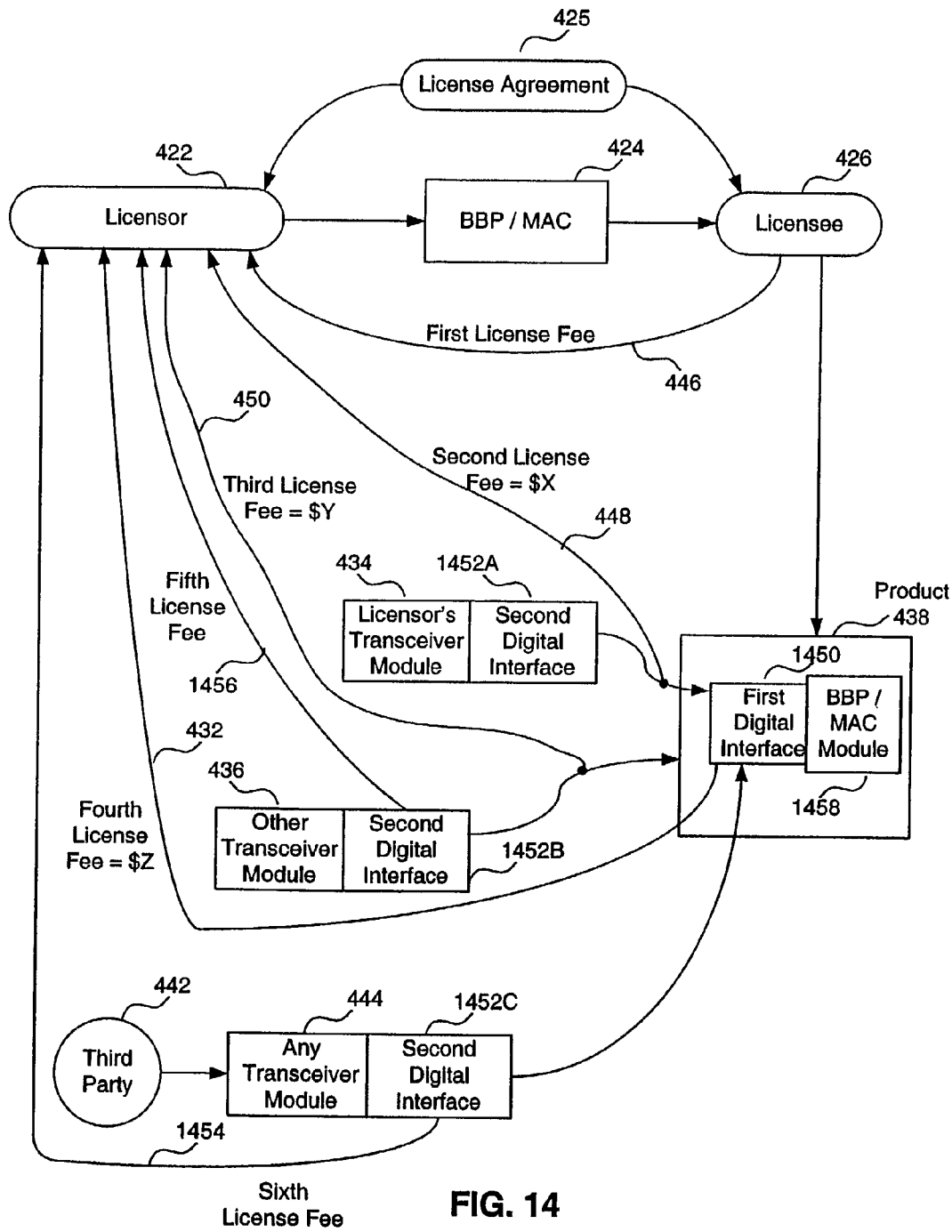
FIG. 14 illustrates another example licensing scenario according to an embodiment of the present invention.

The wireless technology licensing example of the invention shall now be further described with reference to flowchart 1302 shown in FIG. 13. Flowchart 1302-shall be described with reference to the example licensing scenario 1402 shown in FIG. 14.

In step 1306, to enhance the market of the licensor 422's transceiver module 434, the licensor 422 licenses the BBP/MAC IP 424 to the licensee 426 at favorable terms. Step 1306 is similar to step 410 in FIG. 4A. In the example scenario 1402 of FIG. 14, the transceiver module 434 includes a second digital interface 1452A, an example of which is described elsewhere herein. It is noted that the interfaces 1450, 1452 are preferably digital interfaces, but may also comprise analog or hybrid (combinations of digital and analog) interfaces.

Figure 16:
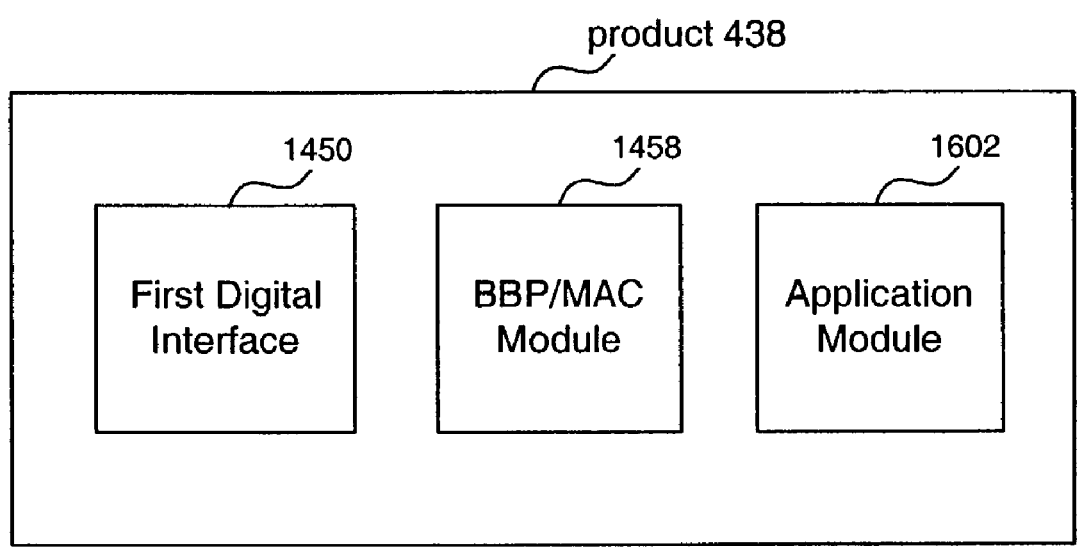
FIG. 16 also illustrates example products generated in the course of performance of the licensing methodologies of FIGS. 4A, 12, and/or 13.

In step 1308, the licensee 426 uses the BBP/MAC IP 424 to produce a product 438. For example, the licensee 426 may instantiate, embed, integrate, install, couple, etc., the BBP/MAC IP 424 into a BBP/MAC module 1458 in the product 438, in a manner that the BBP/MAC module 1458 operates with other components in the product 438. FIG. 16 illustrates an example product 438 (reference is also made to FIG. 15 and the associated discussion above). Such design, development, and fabrication of the product 438 will be apparent to persons skilled in the relevant arts. The product 438 includes a first digital interface 1450 for enabling access to the BBP/MAC module 1458 from outside the product 438. An example of first digital interface 1450 is described elsewhere herein.

In step 1310, it is determined whether the licensee 426 has coupled a transceiver to the BBP/MAC module 1458 in the product 438 via the first digital interface 1450. More generally, it is determined whether the licensee 426 has coupled a second interface 1452 to the first digital interface 1450 in the product 438. If the licensee 426 has coupled some device to the BBP/MAC module 1458 in the product 438 via the first digital interface 1450, then step 1312 is performed.

In step 1312, it is determined whether the licensee 426 has coupled the licensor 422's transceiver module 434 to the BBP/MAC module 1458 in the product 438. Such coupling would have been achieved by coupling the second digital interface 1452A of the transceiver module 434 to the first digital interface 1450 of the BBP/MAC module 1458. If the licensee 426 has coupled the licensor 422's transceiver module 434 to the BBP/MAC module 1458 in the product 438, then step 1314 is performed. In step 1314, the licensee 426 pays a second license fee 448 to the licensor 422.

If, in step 1312, it is determined that the licensee 426 has coupled some other transceiver module 436 to the BBP/MAC module 1458 in the product 438, then step 1316 is performed. Such coupling would have been achieved by coupling the second digital interface 1452B of the transceiver module 436 to the first digital interface 1450 of the BBP/MAC module 1458. In step 1316, the licensee 426 pays a third license fee 450 to the licensor 422.

If, in step 1310, it is determined that the licensee 426 has not coupled a transceiver to the BBP/MAC module 1458 in the product 438 (or, more generally, has not coupled a second digital interface 1452 to the first digital interface 1450), then step 1318 is performed. In step 1318, it is determined whether the licensee 426 has enabled access to the BBP/MAC module 1458. Such access may be enabled, for example, by including and activating the first digital interface 1450 in the product 438. If the licensee 426 has enabled access to the BBP/MAC module 1458, then step 1320 is performed. In step 1320, the licensee 426 pays a fourth license fee 432 to the licensor 422.

Preferably, both the third license fee 450 and the fourth license fee 432 are greater than the second license fee 448. There are embodiments, however, when the second license fee 448 is equal to or greater than the third license fee 450 and/or the fourth license fee 432. For example, this may be the case where the licensor 422's transceiver module 434 is superior to other technologies, and/or has gained commercial success.

The discussion so far has focused on the license fees paid by the licensee 426 to the licensor 422. In some embodiments, however, the licensor 422 receives licensing revenue from other sources. For example, the licensor 422 may receive a fifth license fee 1456 and/or a sixth license fee 1454 from the parties who produce the other transceiver modules 436, 444 having the second digital interfaces 1452B, 1452C. This may be the case, for example, where the licensor 422 exerts control over the intellectual property related to the pertinent transceiver, BBP/MAC, and/or interface technologies through the use of patents, trade secrets, trademarks, or other vehicles or combinations thereof.

The use of the first digital interface 1450 and the second digital interface 1452 provides the present invention with additional advantages. For example, by using a digital interface, the transceiver 434, 436, or 444 can be positioned independent of the position of the BBP/MAC module 1458. This is described elsewhere herein in greater detail. Because of this advantage, there is additional incentive and motivation for the adoption of the licensor 422's BBP/MAC 424 and transceiver module 434.

In the example scenarios described above, the licensor 422 has access to at least two technologies, the primary technology 434 and the secondary technology 424 (see FIG. 4B). For example, with reference to FIG. 14, the licensor 422 has access to the transceiver module 434 and the BBP/MAC 424.

This illustrates another advantage of the invention. It is often the case that customers must interact with multiple suppliers to gain access to the technologies needed to design and implement a given product. Such suppliers may not cooperate with one another, and/or may not design their respective technologies for use with the technologies of others. Accordingly, customers are faced with the sometimes difficult tasks of acquiring the technologies, and then integrating the technologies for use with each other.

In contrast, according to the invention, the licensor 422 is a single source for the primary technology 434 and the secondary technology 424. Accordingly, it is much easier for customers to gain access to the primary technology 434 and the secondary technology 424, since they need only interface with the licensor 422. Also, in embodiments, the primary technology 434 is designed for easy and/or enhanced operation with the secondary technology 424. Thus, integration of the primary technology 434 with the secondary technology 424 is simplified. Also, performance advantages are gained by using the primary technology 434 with the secondary technology 424.

Thus, embodiments of the invention exhibit additional advantages to further encourage adoption of the licensor 422's primary technology 434 and secondary technology 424.

VIII. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software, and the like, and/or combinations thereof.

When used herein, the terms "connected" and/or "coupled" are generally used to refer to electrical connections. Such electrical connections can be direct electrical connections with no intervening components, and/or indirect electrical connections through one or more components.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A network system, comprising:
   a direct conversion radio transceiver coupled to a digitizer, integrated within a first integrated device;
   a medium access controller coupled between a baseband processor and digital control circuitry, integrated within a second integrated device; and
   a digital interface that couples said first integrated device to said second integrated device;
   wherein said digitizer comprises:
   a in-phase receive path analog-to-digital converter;
   a quadrature-phase receive path analog-to-digital converter;

a in-phase transmit path digital-to-analog converter; and
a quadrature-phase transmit path digital-to-analog converter;
wherein said digital interface comprises transceiver-side digital interface circuitry, including:
a plurality of latches coupled to said digital-to-analog converters and to said analog-to-digital converters;
a bi-directional bus driver coupled between said plurality of latches and a bi-directional bus; and
address control and timing circuitry coupled to said latches; and
wherein said digital interface further comprises controller-side digital interface circuitry, including:
a second bi-directional bus driver coupled to said bi-directional bus;
a second plurality of latches coupled between said second bi-directional bus driver and said baseband processor; and
second address control and timing circuitry coupled to said second plurality of latches.

2. The network system according to claim 1, wherein said first integrated device comprises a multi-chip module.

3. The network system according to claim 1, wherein said first integrated device comprises an integrated circuit.

4. The network system according to claim 1, wherein said second integrated device comprises an integrated circuit.

5. The network system according to claim 1, wherein said digital interface comprises a serial bus.

6. The network system according to claim 1, wherein said digital interface comprises a parallel bus.

7. The network system according to claim 1, wherein said digital interface comprises a hybrid serial/parallel bus.

8. The network system according to claim 1, wherein said digital interface comprises a multiplexed bus.

9. The network system according to claim 1, wherein said digital interface comprises a direct connection between said first and second integrated devices.

10. The network system according to claim 1, wherein said digital interface is an all-digital interface.

11. The network system according to claim 1, wherein said direct conversion radio transceiver comprises a receive path coupled between said digitizer and an antenna system, said receive path including:
a low noise amplifier coupled to said antenna system;
an automatic gain control module coupled to said low noise amplifier;
in-phase and quadrature-phase direct down-converters coupled to said automatic gain control module; and
receive analog circuitry coupled between said in-phase and quadrature-phase direct down-converters and said digitizer.

12. The network system according to claim 1, wherein said direct conversion radio transceiver comprises a transmit path coupled between said digitizer and an antenna system, said transmit path including:
transmit analog circuitry coupled to said digitizer;
in-phase and quadrature-phase direct up-converters coupled to said transmit analog circuitry; and
power amplifier circuitry coupled between outputs of said in-phase and quadrature-phase direct up-converters and said antenna system.

13. The network system according to claim 11, wherein said direct conversion radio transceiver further comprises a transmit path coupled between said digitizer and said antenna system, said transmit path including:
transmit analog circuitry coupled to said digitizer;
in-phase and quadrature-phase direct up-converters coupled to said transmit analog circuitry; and
power amplifier circuitry coupled between outputs of said in-phase and quadrature-phase direct up-converters and said antenna system.

14. The network system according to claim 13, wherein said direct conversion radio transceiver further comprises:
a clock generator coupled to said in-phase and quadrature-phase direct down-converters and to said in-phase and quadrature-phase direct up-converters; and
a frequency synthesizer coupled to said clock generator.

15. The network system according to claim 1, wherein said digitizer further comprises an automatic gain control digital-to-analog converter.

16. The network system according to claim 1, wherein said second integrated device comprises an internal system bus coupled between said medium access controller and said controller.

17. A network system, comprising:
a direct conversion radio transceiver;
a baseband processor;
a digitizer coupled between said direct conversion radio transceiver and said baseband processor; and
a digital interface coupled to said baseband processor, said digital interface configured to couple to a medium access controller;
wherein said direct conversion radio transceiver, said baseband processor, and said digitizer are integrated in an integrated device;
wherein said digitizer comprises:
a in-phase receive path analog-to-digital converter;
a quadrature-phase receive path analog-to-digital converter;
a in-phase transmit path digital-to-analog converter; and
a quadrature-phase transmit path digital-to-analog converter;
wherein said digital interface comprises transceiver-side digital interface circuitry, including:
a plurality of latches coupled to said baseband processor;
a bi-directional bus driver coupled between said plurality of latches and a bi-directional bus; and
address control and timing circuitry coupled to said latches; and
wherein said digital interface further comprises controller-side digital interface circuitry, including:
a second bi-directional bus driver coupled to said bi-directional bus;
a second plurality of latches coupled between said second bi-directional bus driver and said medium access controller; and
second address control and timing circuitry coupled to said second plurality of latches.

18. The network system according to claim 17, wherein said integrated device comprises a multi-chip module.

19. The network system according to claim 17, wherein said integrated device comprises an integrated circuit.

20. The network system according to claim 17, wherein said digital interface comprises a serial bus.

21. The network system according to claim 17, wherein said digital interface comprises a parallel bus.

22. The network system according to claim 17, wherein said digital interface comprises a hybrid serial/parallel bus.

23. The network system according to claim 17, wherein said digital interface comprises a multiplexed bus.

24. The network system according to claim 17, wherein said digital interface comprises a direct connection between said baseband processor and said medium access controller.

25. The network system according to claim 17, wherein said digital interface is an all-digital interface.

26. The network system according to claim 17, wherein said direct conversion radio transceiver comprises a receive path coupled between said digitizer and an antenna system, said receive path including:
    a low noise amplifier coupled to said antenna system;
    an automatic gain control module coupled to said low noise amplifier;
    in-phase and quadrature-phase direct down-converters coupled to said automatic gain control module; and
    receive analog circuitry coupled between said in-phase and quadrature-phase direct down-converters and said digitizer.

27. The network system according to claim 17, wherein said direct conversion radio transceiver comprises a transmit path coupled between said digitizer and an antenna system, said transmit path including:
    transmit analog circuitry coupled to said digitizer;
    in-phase and quadrature-phase direct up-converters coupled to said transmit analog circuitry; and
    power amplifier circuitry coupled between outputs of said in-phase and quadrature-phase direct up-converters and said antenna system.

28. The network system according to claim 26, wherein said direct conversion radio transceiver further comprises a transmit path coupled between said digitizer and said antenna system, said transmit path including:
    transmit analog circuitry coupled to said digitizer;
    in-phase and quadrature-phase direct up-converters coupled to said transmit analog circuitry; and
    power amplifier circuitry coupled between outputs of said in-phase and quadrature-phase direct up-converters and said antenna system.

29. The network system according to claim 28, wherein said direct conversion radio transceiver further comprises:
    a clock generator coupled to said in-phase and quadrature-phase direct down-converters and to said in-phase and quadrature-phase direct up-converters; and
    a frequency synthesizer coupled to said clock generator.

30. The network system according to claim 17, wherein said digitizer further comprises an automatic gain control digital-to-analog converter.

31. The network system according to claim 17, wherein said second integrated device comprises an internal system bus coupled between said medium access controller and said controller.

32. The network system according to claim 1, wherein said first integrated device is positioned independently from said second integrated device.

33. The network system according to claim 1, wherein said first integrated device is implemented within a single integrated circuit.

34. The network system according to claim 1, wherein said second integrated device is implemented within a single integrated circuit.

35. The network system according to claim 1, wherein said digital control circuitry communicates with said medium access controller using a packet-based format.

36. The network system according to claim 17, wherein said integrated device is implemented within a single integrated circuit.

* * * * *